US012686136B2

(12) United States Patent
Ragusila et al.

(10) Patent No.: US 12,686,136 B2
(45) Date of Patent: Jul. 21, 2026

(54) HUMANOID ROBOT DATA COLLECTION SYSTEM

(71) Applicant: Figure AI Inc., San Jose, CA (US)

(72) Inventors: Victor Ragusila, San Jose, CA (US);
Nathan Jenest, San Jose, CA (US);
Vadim Chernyak, San Jose, CA (US);
Corey Lynch, San Jose, CA (US); Toki Migimatsu, San Jose, CA (US)

(73) Assignee: FIGURE AI, San Jose, CA (US)

( * ) Notice: Subject to any disclaimer, the term of this patent is extended or adjusted under 35 U.S.C. 154(b) by 0 days.

(21) Appl. No.: 19/347,994

(22) Filed: Oct. 2, 2025

(65) Prior Publication Data

US 2026/0091507 A1 Apr. 2, 2026

Related U.S. Application Data

(60) Provisional application No. 63/860,580, filed on Aug. 8, 2025, provisional application No. 63/845,821, filed on Jul. 17, 2025, provisional application No. 63/839,517, filed on Jul. 7, 2025, provisional application No. 63/808,832, filed on May 20, 2025,
(Continued)

(51) Int. Cl.
*B25J 13/02* (2006.01)
*B25J 9/16* (2006.01)

(52) U.S. Cl.
CPC ........... *B25J 13/025* (2013.01); *B25J 9/1689* (2013.01)

(58) Field of Classification Search
CPC .................... A61F 5/028; A61F 5/0102; A61F 2005/0167; B25J 9/162; B25J 9/1689;
B25J 9/1671; B25J 9/0006; B25J 13/025;
B25J 9/10; B25J 9/0003; G06N 20/00;
G06N 3/0455; G05B 19/00; G05D 1/0044;
(Continued)

(56) References Cited

U.S. PATENT DOCUMENTS 9,789,612 B2 10/2017 Hoffman
9,796,078 B2 10/2017 Angle
(Continued)

FOREIGN PATENT DOCUMENTS

WO 2025227025 10/2025

OTHER PUBLICATIONS

Darvish, Kourosh, et al. "Teleoperation of humanoid robots: A survey." IEEE Transactions on Robotics 39.3 (2023): 1706-1727.
(Continued)

*Primary Examiner* — Antony M Paul

(57) ABSTRACT

The humanoid robot data collection system may include a wearable data collection apparatus, a computer, and a humanoid robot in data communication via a network. The wearable data collection apparatus worn by a human operator to control a robot for the purpose of collecting robot data. The wearable data collection apparatus generates pilot movement data based on various sensors contain in the wearable data collection apparatus, where the pilot movement data is used to generate robot control data and sends this control data to the robot in real-time. The wearable data collection apparatus includes a base mount, articulated arms extending from the base mount, sensors coupled to articulated arms, gloves with sensors coupled to the articulated arms, and a piloting control system operatively connected to the plurality of sensors.

10 Claims, 18 Drawing Sheets

Related U.S. Application Data provisional application No. 63/801,451, filed on May 7, 2025, provisional application No. 63/795,722, filed on Apr. 28, 2025, provisional application No. 63/792,998, filed on Apr. 23, 2025, provisional application No. 63/792,722, filed on Apr. 22, 2025, provisional application No. 63/753,670, filed on Feb. 4, 2025, provisional application No. 63/715,117, filed on Nov. 1, 2024, provisional application No. 63/702,185, filed on Oct. 2, 2024.

(58) Field of Classification Search
CPC .......... G05D 1/2245; G05D 1/46; G06T 9/00; H04N 19/00; B62D 57/032; G01P 3/487
USPC ........... 901/8, 9, 14, 15, 29, 31; 318/568.11, 318/568.12, 568.21
See application file for complete search history.

(56) References Cited

U.S. PATENT DOCUMENTS

| | | | |
|---|---|---|---|
| 11,247,738 | B2 | 2/2022 | Lavalley |
| 12,172,327 | B2 | 12/2024 | Gildert |
| 12,263,591 | B1 | 4/2025 | Clerc |
| 2014/0265401 | A1 | 9/2014 | Allen Demers |
| 2016/0008988 | A1 | 1/2016 | Kennedy |
| 2017/0106738 | A1 | 4/2017 | Gillett |
| 2022/0410380 | A1 | 12/2022 | Lu |
| 2023/0072317 | A1* | 3/2023 | Jarvis ..................... B25J 9/1656 |
| 2023/0126906 | A1 | 4/2023 | Kranski |
| 2023/0333593 | A1 | 10/2023 | Meier |
| 2024/0198532 | A1 | 6/2024 | Yan |
| 2024/0294219 | A1 | 9/2024 | Gildert |
| 2024/0294220 | A1 | 9/2024 | Gildert |
| 2024/0299195 | A1 | 9/2024 | Perry |
| 2024/0345660 | A1* | 10/2024 | Daltorio ................ G05D 1/223 |

OTHER PUBLICATIONS

Bertrand, Sylvain, et al. "High-speed and impact resilient teleoperation of humanoid robots." 2024 IEEE-RAS 23rd International Conference on Humanoid Robots (Humanoids). IEEE, 2024.

* cited by examiner 1.2.8

Figures 4, 5:
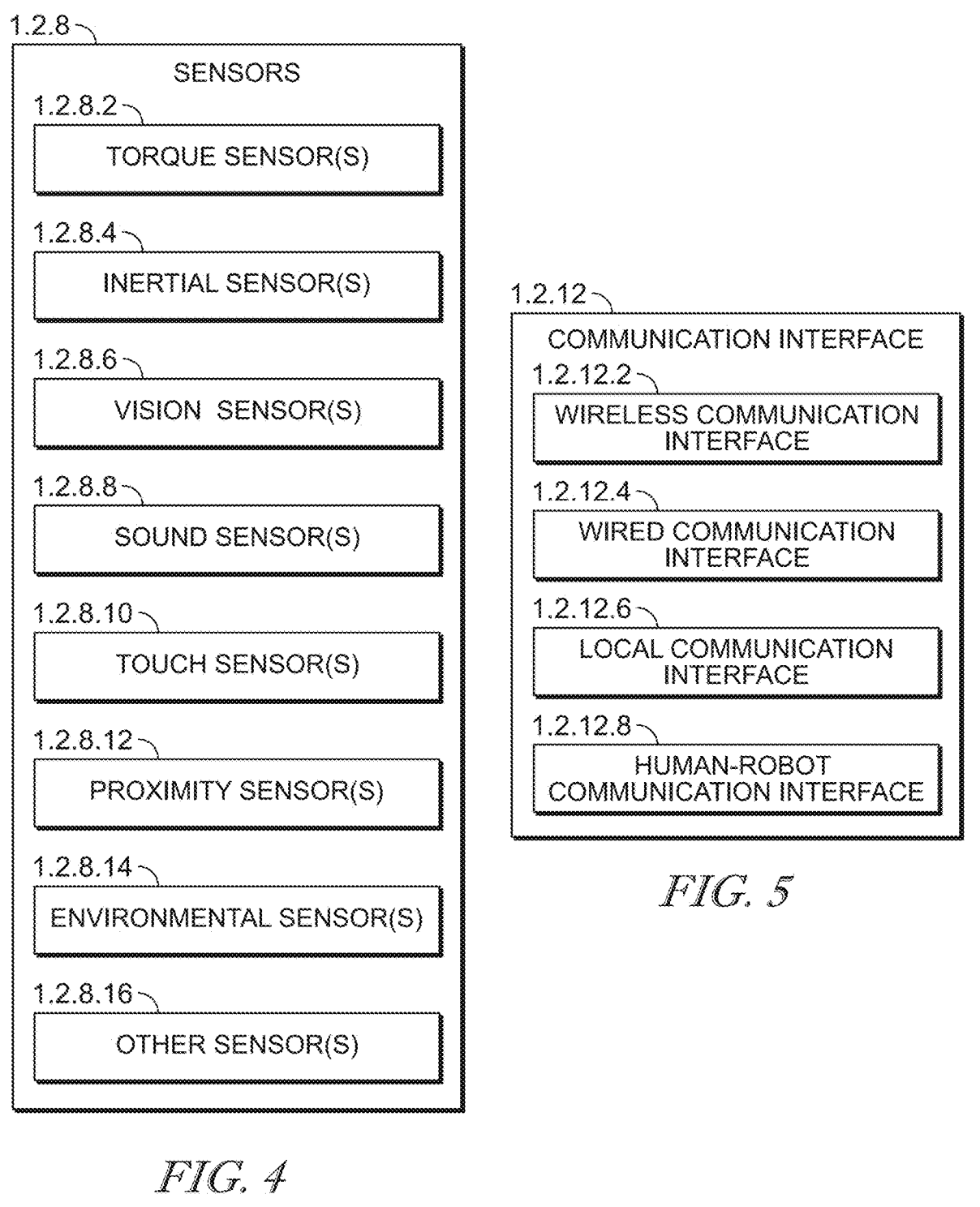

SENSORS

1.2.8.2

TORQUE SENSOR(S)

1.2.8.4

INERTIAL SENSOR(S)

1.2.8.6

VISION  SENSOR(S)

1.2.8.8

SOUND SENSOR(S)

1.2.8.10

TOUCH SENSOR(S)

1.2.8.12

PROXIMITY SENSOR(S)

1.2.8.14

ENVIRONMENTAL SENSOR(S)

1.2.8.16

OTHER SENSOR(S)

COMMUNICATION INTERFACE

1.2.12.2

WIRELESS COMMUNICATION INTERFACE 1.2.12.4

WIRED COMMUNICATION INTERFACE 1.2.12.6

LOCAL COMMUNICATION INTERFACE 1.2.12.8

HUMAN-ROBOT COMMUNICATION INTERFACE

HUMANOID ROBOT DATA COLLECTION SYSTEM

CROSS REFERENCE TO RELATED APPLICATIONS

This application claims the benefit of and priority to U.S. Provisional Patent Application Nos. 63/702,185 filed Oct. 2, 2024, 63/715,117 filed Nov. 1, 2024, 63/753,670 filed Feb. 4, 2025, 63/792,998 filed Apr. 23, 2025, 63/795,722 filed Apr. 28, 2025, 63/801,451 filed May 7, 2025, 63/808,832 filed May 20, 2025, 63/839,517 filed Jul. 7, 2025, 63/845,821 filed Jul. 17, 2025, and 63/860,580 filed Aug. 8, 2025, each of which is expressly incorporated by reference herein in its entirety.

TECHNICAL FIELD

This disclosure relates to a humanoid robot data collection system, assemblies, software, and methods for collecting said robot data.

BACKGROUND

Humanoid robots are increasingly being developed for a wide range of general-purpose tasks in environments such as factories, warehouses, and industrial facilities. The ability of these robots to perform complex tasks often relies on advanced machine learning models, which require large amounts of high-quality motion data for training. The collection of this training data presents significant challenges. Traditional robot training systems are often bulky, expensive, and require complex infrastructure such as dedicated motion capture studios or heavy-duty robotic rigs. Many conventional systems rely on extensive camera setups that demand specific lighting conditions and are susceptible to "black-out spots" caused by occlusion from machines or other structures in the environment. Similarly, systems that use acoustic sensors may be impractical in noisy industrial settings as they require quiet environments to function properly. Furthermore, the operator's mobility is often restricted by external wires or complicated walking bases, making it difficult to capture data for tasks that require movement through a dynamic environment. Therefore, there is a need in the art for an improved robot data collection system that overcomes the foregoing challenges.

SUMMARY

The presently disclosed subject matter is directed to a mobile wearable data collection apparatus for use with a humanoid robot. Particularly, the mobile wearable data collection apparatus comprises a base mount configured to be secured to the torso of a human operator via a harness, wherein the base mount is configured to move with the operator as the operator walks through an environment. The apparatus comprises a piloting control system. The apparatus comprises an articulated arm extending from the base mount, the articulated arm comprising a plurality of rigid frame links pivotably coupled between the base mount and the glove mount via a plurality of joints, wherein each joint of the plurality of joints includes a respective joint sensor configured to obtain joint positional data associated with the respective joint, and wherein each joint sensor is configured to provide joint positional data to the piloting control system. The apparatus comprises a headset device configured to be worn by the operator and that includes (i) a display providing virtual reality and/or augmented reality visual feedback to the operator and (ii) a head position sensor configured to determine a position of a head of the operator and provide to the piloting control system head positional data associated with the position of the head of the operator, wherein the piloting control system is configured to track the pose of an extent of the articulated arm via the provided joint positional data and to track at least one degree of freedom of the operator's head via the provided head positional data.

The presently disclosed subject matter is directed to a mobile wearable data collection apparatus for use with a humanoid robot. Particularly, the mobile wearable data collection apparatus comprises a headset device configured to be worn by the operator and that includes a display providing virtual reality and/or augmented reality visual feedback to the operator. The apparatus comprises a glove having a flexible textile and a finger portion, wherein the glove is configured to be worn by an operator and provide haptic feedback to the operator. The apparatus comprises a rigid housing coupled to a dorsal side of the glove. The apparatus comprises a finger encoder mounted at the rigid housing and configured to detect a finger movement of the operator. The apparatus comprises a first deformable connector pivotably coupled to the finger encoder at a proximal end of the first deformable connector and coupled to a tip of the finger portion of the glove at a distal end of the first deformable connector, wherein the deformable connector is configured to flex in a flexion/extension direction with the finger movement of the operator.

In some embodiments, the apparatus includes a base mount configured to be worn on an operator's torso, for instance, via a main support portion extending along the posterior of the operator. The apparatus is configured to be carried by the operator without external support. An articulated arm, which may be coupled to left or right arm attachment portions on the base mount, extends from the base mount to a glove mount at its distal end. The articulated arm may comprise a plurality of rigid frame links coupled by joints, with at least one link having an adjustable length. Also, in other embodiments, a glove is detachably coupled to the glove mount, for example, at a dorsal side of the glove. The glove is configured to determine finger positional data via a hand position sensor. This sensor may comprise a finger encoder pivotably coupled to a deformable connector, which is in turn coupled to a tip of a finger portion; in other embodiments, the sensor determines finger position by detecting alterations in an electromagnetic field. A thumb's position may be detected by a first and second thumb encoder. The glove can also be configured to provide haptic feedback to the operator, and may include a haptic button on a palmar side.

In some embodiments, a piloting control system and a power source, such as a battery, are carried by the base mount; in other embodiments, one or both may be remotely located. The apparatus may include joint sensors at fixed positions on the articulated arm, a head position sensor, and a torso position sensor located at the base mount. The piloting control system obtains positional data (e.g., joint, finger, head, torso) and stores it in data storage for later retrieval by a remote computer. Further, in other embodiments, each joint of the articulated arm substantially corresponds to a respective actuator of a robot arm. The collected positional data is used for training an artificial intelligence model. The apparatus may also collect robot data from a humanoid robot, relate it to the positional data generated by the apparatus, and provide the combined data for training the artificial intelligence model.

BRIEF DESCRIPTION OF THE DRAWINGS

The drawing figures depict one or more implementations in accordance with the present teachings, by way of example only, not by way of limitation. These figures are intended to illustrate and not to restrict the scope of the disclosure. In the figures, like reference numerals refer to the same or similar elements. This convention is maintained throughout the drawings for consistency.

FIG. 4 is a block diagram of sensors for the humanoid robot of FIGS. 1-3B;

FIG. 5 is a block diagram of a communication interface for the humanoid robot of FIGS. 1-3B;

DETAILED DESCRIPTION

Figure 1:
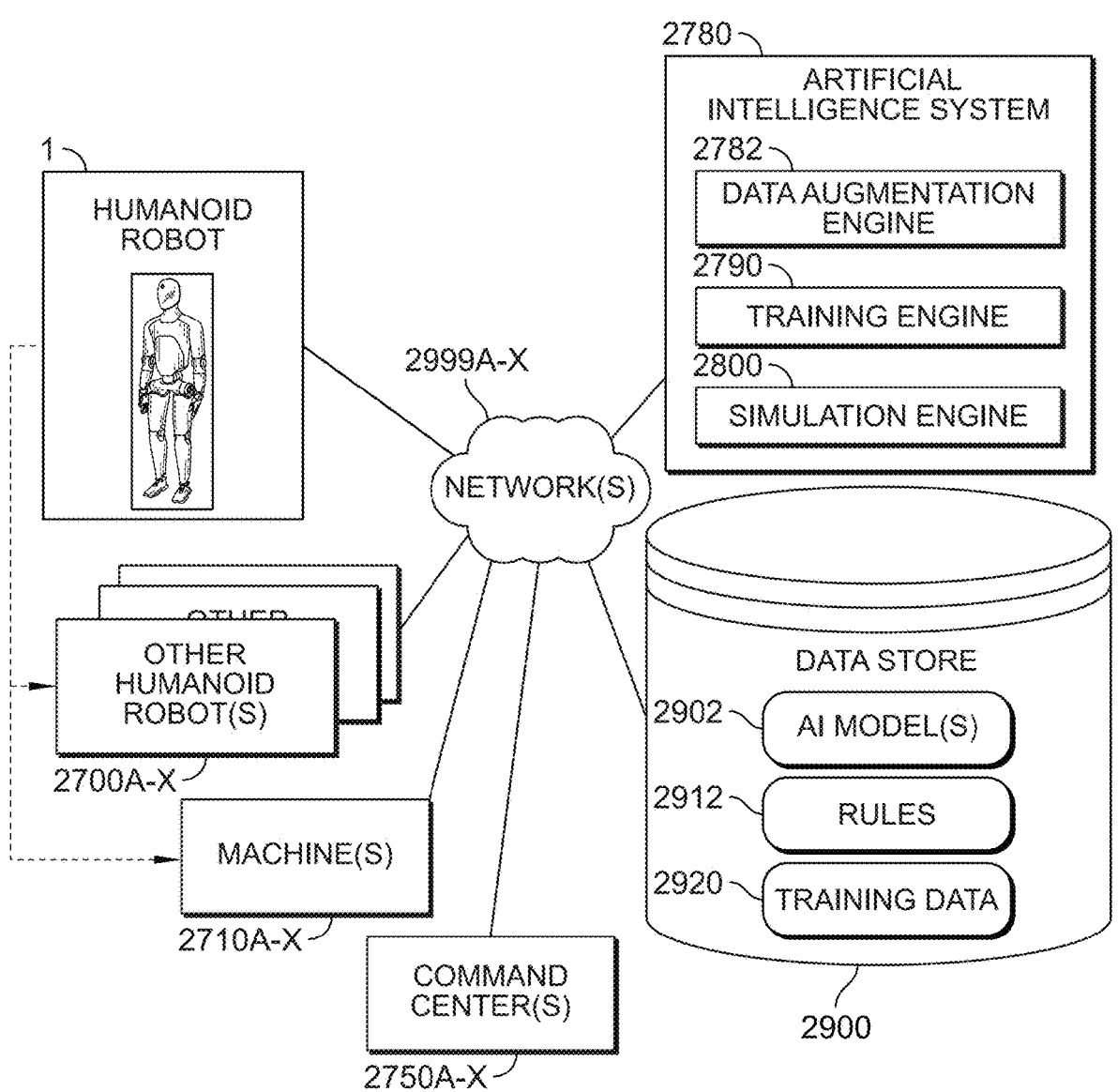
FIG. 1 is a diagram illustrating an environment and a network in which one or more humanoid robots of FIG. 1 may operate, connect, command and/or be commanded by, control and/or be controlled by, and/or interact.

In the following detailed description, numerous specific details are set forth by way of examples in order to provide a thorough understanding of the relevant teachings. These examples are illustrative and not exhaustive. It should be apparent to those skilled in the art that the scope of the teachings is not limited to these specific details. Additionally or alternatively, well-known methods, procedures, components, and/or circuitry have been described at a relatively high-level, without detail, in order to avoid unnecessarily obscuring aspects of the present disclosure.

While this disclosure includes several embodiments, there is shown in the drawings and will herein be described in detail certain embodiments with the understanding that the present disclosure is to be considered as an exemplification of the principles of the disclosed methods and systems and is not intended to limit the broad aspects of the disclosed concepts to the embodiments illustrated. As will be realized, the disclosed methods and systems are capable of other and different configurations, and one or more details are capable of being modified, all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A. Introduction

The humanoid robot data collection system, which includes the wearable data collection apparatus, is configured to capture robot data from a robot that is controlled by the human operator using the wearable data collection apparatus. In an operational scenario where the system is being used to control a robot for the purpose of collecting robot data, the wearable data collection apparatus is configured to transfer pilot movement data to a computer. The pilot movement may include sensor data and other information related to the position and/or movement of the operator wearing the wearable data collection apparatus. The computer then processes the pilot movement data to generate robot control data and sends this control data to the robot in real-time. Subsequently, a data storage database collects robot data from sensors contained in the robot that relate to the positions and movements of said robot to refine and annotate the robot data into training data.

The wearable data collection apparatus provides substantial benefits over conventional systems because it is portable, lightweight, can be manufactured with speed, and is less expensive than other conventional apparatuses. For example, the wearable data collection apparatus allows the operator to collect pilot movement data while performing actual tasks that the robot may perform. This is achieved by minimizing the footprint of the apparatus and eliminating a complicated walking base, additional wires, or other electrical components, which allows the mobile wearable data collection apparatus to move with the operator as the operator walks through an environment. In some examples, the wearable data collection apparatus may be used in a robot-free configuration, where the pilot movement data collected while the operator is performing a task may be stored for later use or be converted to directed to training data.

Certain embodiments of the wearable data collection apparatus include (i) a base mount having an adjustable harness coupled thereto, (ii) left and right articulated arms that extend from opposing sides of the base mount, (iii) a plurality of encoders coupled within articulated arms and sensors configured to capture pilot movement data associated with movements of the wearable data collection apparatus, and (iv) a piloting control system including a computing device and operatively connected to the encoders of the articulated arms and other sensors. Each articulated arm includes a plurality of rigid frame links and a glove coupled at the distal ends of the links. The plurality of rigid frame links are arranged in a geometry that is similar to arrangement of arm components of the robot, forming joint connections in the articulated arms that correspond to actuator locations in the robot, where encoders are located at said joint connections. This similar configuration reduces post-data collection processing of the collected pilot movement data and, in some cases, enables the wearable data collection apparatus to collect pilot movement data without a robot. The gloves may contain additional sensors to provide additional information positional information related to the hands of the operator.

When worn by the operator, the wearable data collection apparatus: (i) can be secured to the operator via a harness coupled to the base mount, (ii) includes gloves that are designed to receive the operator's hands, and (iii) has articulated arms that extend along the operator's arms between said base mount and gloves. In certain embodiments, the articulated arms are configured to be adjusted to fit the arms of the operator for a more ergonomic fit. This design allows the operator to perform repetitive tasks and collect the significant pilot movement data needed to train the robot without overly straining the operator during the data collection process. In contrast, an alternative embodiment does not allow for adjustment of the linkages or the distances between encoders. Further, other disclosed embodiments may be custom manufactured (e.g., 3D printed) or custom modified for a specific operator based on measurements or a scan (e.g., LiDAR or video).

In some embodiments disclosed herein, the humanoid robot data collection system also includes a clutch coupled to the wearable data collection apparatus to allow the operator to pause the sending of control data from the computer to the robot. The clutch permits the operator to reposition their hands to a more comfortable or natural position before resuming the operation of the wearable data collection apparatus. This functionality prevents the hands of the robot from replicating all of the hand motions of the operator, for example, when the operator is repositioning their hands.

A majority of the robot data that is captured can be added to the training data set without substantial review and multiple manipulations or alterations of the robot data. This simplifies training data collection and data labeling, and it allows for a task to be broken down into sub-steps, where certain aspects of the training data may be reused for other tasks. For example, in a factory environment for assembling automobiles, a task may include moving one piece of sheet metal in a factory line requiring a first set of movements, and then moving a second piece of sheet metal in the factory line requiring a second set of movements, wherein a substantial number (e.g., 80%) of the first and second sets of movements are the same.

The sensors of the wearable data collection apparatus are fixed to components of the wearable data collection apparatus and are not placed by the operator. This design eliminates the potential for misplacement or substantial changes to the location of the sensors between different operators. For example, the sensors may include the encoders positioned at joints in the articulated arm and inertial measurement units (IMUs) coupled to the wearable data collection apparatus at the wrist components and the torso (i.e., at the back frame).

The wearable data collection apparatus is a cost-effective solution that does not require a complex design for training data capture. The wearable data collection apparatus simplifies the collection of training data and does not require a substantial number of additional external sensors or detection devices. The wearable data collection apparatus does not require an extensive camera setup with the proper lighting that is typically required by conventional camera-based systems. Because the pilot movement data is collected by the operator wearing the wearable data collection apparatus, there are no black-out spots that are created due to machines or other structures found in a training environment. For similar reasons, the wearable data collection apparatus does not require the quiet environment needed for an acoustic sensor system.

In some embodiments, the disclosed data collection system enables a single individual to operate and train a robot using the described wearable data collection apparatus that is both portable and easily integrated into existing systems. The apparatus is designed to be intuitive and efficient, allowing a human operator to control the robot's movements in real-time while collecting high-quality training data. Furthermore, the apparatus is designed with interoperability in mind, making it compliant with existing robotic platforms and infrastructure, thereby streamlining adoption without the need for significant modification, additional hardware, or additional safety features to be put in place.

As described above, the disclosed techniques and systems provide advantages, including improvements over traditional robot training systems with respect to real-time, low-latency motion capture and its translation to robot control. Traditional robot training systems are often bulky, expensive, and require direct control and constant access to physical robots, making data collection difficult, unsafe, or inefficient. The disclosed techniques and systems provide technical solutions to said technical problems, such as by introducing a portable, lightweight wearable data collection apparatus that allows an operator to control a robot and/or collect training data in a simulated and/or robot-free environment. The disclosed techniques and systems solve problems relating to limited training efficiency and high hardware dependency by enabling remote and passive data capture. As a result, the disclosed technology supports robot-free training and hybrid training regimes, thereby reducing reliance on traditional and costly robot demonstrations or other traditional robot training systems.

Moreover, the disclosed technology provides technical solutions to technical problems in collecting high-quality robot motion data efficiently for training machine learning models. The disclosed technology addresses this technical problem with real-time sensor data transfer, robot control, and robot feedback logging, thereby enabling precise synchronization between human motion and robot behavior. This process leads to more accurate training datasets for learning-based control systems. Existing systems may also require complex infrastructure, such as motion capture studios or heavy-duty robotic rigs. The wearable apparatus described herein, on the other hand, removes the need for external wires, complicated walking bases, and dedicated motion capture hardware, instead allowing for deployment and use in a variety of physical spaces, including constrained or dynamic environments. The hardware components of the disclosed system therefore enable real-time streaming of positional data collected by the apparatus to a computer system that translates the pilot movement data into robot control commands. This translation improves the responsiveness and fidelity of human-robot interaction and ensures the collection of accurate data for use in training the robot to perform actions.

B. Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Although selected human medical terminology is used to describe features and/or relative positions related to the humanoid robot, it should be understood that said medical terminology may not directly correspond to the exact same features of a human. It should be understood that names of various assemblies and components (e.g., including housings and assemblies contained within) may generally relate to a location of similar anatomy of a human body and may not have an exact correlation in dimension, function, or shape. The reference system including three orthogonal reference planes is defined with respect to the robot in a neutral standing position to describe relative positions of components of the robot. Although standard human medical terminology is used to describe the anatomical reference planes (i.e., sagittal, coronal, transverse) of the robot, the planes may be shifted from the typical location on a human to be meaningful for the kinematic layout and features of the robot.

Humanoid Robot: a robot that is capable of bipedal locomotion and includes components (e.g., head, torso, etc.) that generally resemble parts of a human. However, the robot does not need to include every part of a human (e.g., hands with over ten degrees of freedom), nor do its components need to have a shape that exactly or substantially resembles human parts. Furthermore, it should be understood that a humanoid robot is not designed to be primarily quadruped or have a wheeled base.

Neutral State: a state where the robot is standing upright on a horizontal support surface (PG) and facing a forward direction with its torso substantially vertically aligned over its pelvis and legs, where the legs are substantially straight with the knees substantially aligned under the hips and substantially above the ankles, such that the robot's weight is balanced over its feet. In the neutral state, the robot's head is facing forward (i.e., in the forward direction), the arms are located at the sides of the robot, the hands are oriented with the palms facing substantially inward, and the fingers pointing in a substantially downward direction toward the horizontal support surface. An illustrative example of the neutral state for the humanoid robot 1 is shown FIG. 3A.

Figure 3A:
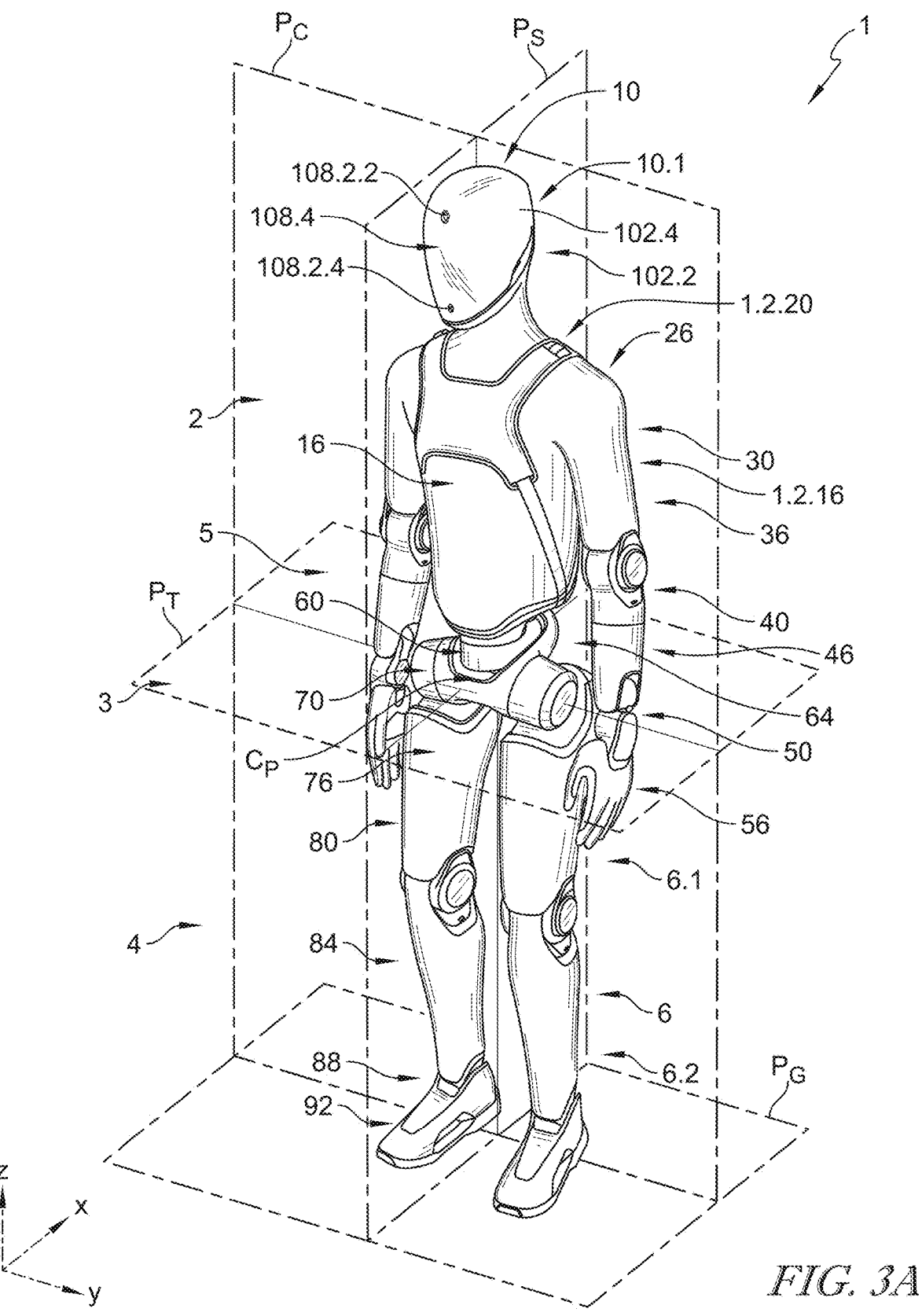
FIG. 3A is a perspective view of the humanoid robot of FIGS. 1-2.
Figure 3B:
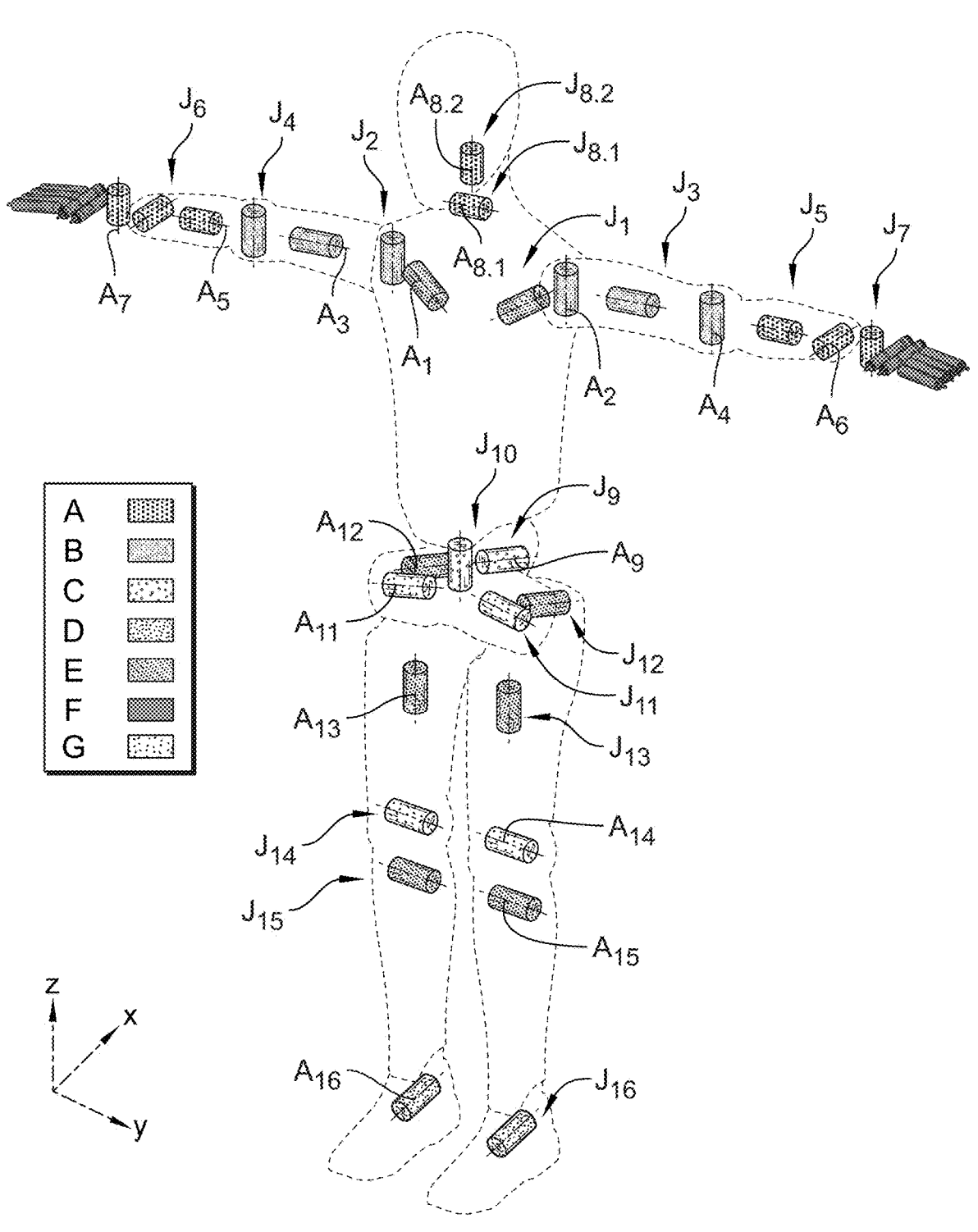
FIG. 3B is a diagram illustrating actuators contained within the humanoid robot of FIG. 13A and the corresponding rotational axes of said actuators.

Extended State: a state of the robot with the arms extended outward laterally at the shoulder (as illustrated in FIG. 3B) and oriented with the palms of the hands substantially facing downward and the fingers pointing in a substantially outward direction, where the central and lower portions of the robot remain in a neutral state.

Sagittal Plane: a vertical plane when the robot is in the neutral state that aids in defining left and right sides of the robot for all states. Accordingly, the sagittal plane may: (i) divide the robot and/or the torso into left and right portions or halves, (ii) extend through an axis of rotation about which the torso twists or rotates relative to the pelvis and legs, (iii) contain an origin point of the robot, and/or (iv) be positioned between the left and right legs, and/or left and right arms. In an illustrative embodiment, the sagittal plane ($P_S$) (e.g., as illustrated in FIG. 3A) is a vertical plane positioned at a midway point between the left and right legs and the left and right arms and contains a rotational axis $A_{10}$ of a torso twist actuator (J10) (e.g., as illustrated in FIG. 3B) located in the spine 60 of the robot 1 and divides the left and right sides of the robot 1 (e.g., as illustrated in FIG. 3A). In other words, in an illustrative embodiment, the sagittal plane ($P_S$) is a plane that is colinear with the rotational axis $A_{10}$ of the torso twist actuator (J10).

Coronal Plane: a vertical plane when the robot is in the neutral state that aids in defining front and back portions of the robot for all states. Accordingly, the coronal plane may: (i) divide the robot and/or the torso into front and back portions or halves, (ii) contain an axis of rotation about which the torso pitches forward or backward from the neutral state, (iii) contain an axis of rotation of a knee joint about which a lower shin pitches forward and backward, and/or (iv) contains an axis of rotation of an elbow joint about which a lower forearm moves forward and backward, when the robot is in the extended state. In various embodiments, said axis of rotation for torso pitch may be two colinear axes, a single centrally located axis, an axis defined by a line connecting the midpoints of two non-collinear actuator axes that provide the torso pitch function, or an axis defined by a line connecting the center of actuator bearings of two actuators that provide the torso pitch function. In the illustrative embodiment (see, e.g., FIGS. 3A and 3B), the coronal plane ($P_C$) is a vertical plane that contains the rotational axes $A_{11}$ of the hip flex actuators (J11) located in the hips 70 (and likewise may contain an axis defined by a line connecting the midpoints of a left hip flex actuator (J11) axis ($A_{11}$) and a right hip flex actuator (J11) axis ($A_{11}$) and rotational axis A10 of torso twist actuator (J10) located in the spine 60 of the robot 1. As shown in these figures, the coronal plane ($P_C$) does not bisect the robot, or torso, into equal front and back halves, as it is offset forward of a majority of the arm actuators in the extended position, and other positional relationships that can be understood from the figures.

Transverse Plane: a horizontal plane that aids in defining the upper and lower portions of the robot. Accordingly, the transverse plane may: (i) divide the robot into upper and lower portions or halves, and/or (ii) contain an axis of rotation about which the torso pitches forward or backward, as discussed above. In the illustrative embodiment, the transverse plane (PT) is a horizontal plane that contains the mid-point of the rotational axes A11 of the hip flex actuators (J11) located in the hips 70 of the robot 1.

Origin Point: an orthogonal intersection point of the sagittal plane, coronal plane, and transverse plane, all of which extend through the humanoid robot disclosed herein. In the illustrative embodiment of the robot 1 shown in FIG. 3A, an origin point ($C_P$) is present and shown.

Reference Axes: consist of: (i) the Z-axis (vertical) is defined pursuant to the intersection of the sagittal plane and coronal plane, (ii) the Y-axis (horizontal) is defined pursuant to the intersection of the coronal plane and transverse plane; and (iii) the X-axis (depth) is defined pursuant to the intersection of the sagittal plane and transverse plane. FIG. 3A illustrates example Z, Y, X reference axes where the sagittal, coronal, and transverse planes share a common origin point.

Kinematic Chain: a representation of an assembly of rigid bodies connected by joints to provide constrained motion. Within this application, e.g., FIG. 3B, a kinematic chain is illustrated by cylindrical bodies, where the respective central axis of each individual cylindrical body represents the position and orientation of the axis of rotation for the individual joints. For example, each rotary actuator has a central rotational axis. Other types of actuators may include linkages that provide rotational movement about one or more rotational axes via linkages, bearing or other rotation features, or other means.

Range of Motion: a range of rotational motion of an actuator about an axis of rotation, where a first and second angle define a rotational limit in opposing rotational directions from a neutral position of the actuator with the limits expressed in Radians.

Degrees of Freedom (DoF): the number of parameters that define the configuration of the kinematic chain and possible movements associated therewith.

Singularities: geometric configurations of the robot's joints in which one or more degrees of freedom are effectively lost due to the alignment or overlap of rotational or translational axes, which in some cases is also affected by interference of extents of components where one or more of the components are moved by the joint.

Actuator Bearing: a specific component of the individual actuator that is generally ring-shaped with parallel edge guides, wherein the rotational axis (An) of the actuator is centered within the actuator bearing and orthogonal to the parallel edge guides. Within this application, the actuator bearings of individual actuators are referenced to further define orientation of the rotational axes and/or relative size of the individual actuator.

Actuator bearing plane ($B_n$): a plane defined mid-width of actuator bearing between parallel edge guides and orthogonal to the rotational axis ($A_n$).

Textile: a flexible (e.g., fabric-like), highly durable cover material that has high elastic stretch capabilities and is resistant to pilling, abrasions, and cuts. A textile includes both common textiles (e.g., traditional woven cloth), engineered textiles, and non-fabric-like materials (e.g., plastics or polymers), and/or a combination of the above.

C. Robot(s) and Environment

FIG. 1 illustrates an exemplary network and/or operational environment in which a humanoid robot (also referred to as a bipedal robot) 1, which is further detailed in additional figures herein, may operate. The environment may include a plurality of interconnected components, such as: (i) the humanoid robot 1, (ii) one or more other humanoid robots 2700A-X which may the same as or different from the robot 1, (iii) one or more machines 2710A-X, (iv) one or more command centers 2750A-X, (v) one or more remote artificial intelligence (AI) system(s) 2780 which are remote from the robot 1, such as a cloud-base AI system, and (vi) one or more data stores 2900. Each component may be interconnected with another component, directly or indirectly, by at least one of: (i) one or more networks 2999A-X, (ii) direct communication systems (not illustrated—e.g., a data store 2900 may have direct communication with a remote AI system 2780) and/or (iii) physical contact with one another (e.g., the humanoid robot 1 may be in direct physical contact when operating a machine 2710A-X).

The one or more networks 2999A-X may include, for example, the Internet, a local area network, a wide area network, a private network, a cloud computing network, or a network based on a wireless communication protocol. The network 2999A-X includes, for example, the Internet, intranets, extranets, wide area networks (WANs), local area networks (LANs), wired networks, and wireless networks. For example, such networks may utilize any one of or any combination of the following technologies: (i) cellular network technologies (e.g., GSM, LTE, 1G to 5G), (ii) Wi-Fi (e.g., IEEE 802.11a, IEEE 802.11ax), (iii) bluetooth (e.g., Bluetooth Classic, Bluetooth Low Energy), (iv) low-power wide-area network (e.g., LoRaWAN, NB-IoT), (v) satellite (e.g., LEO systems like Starlink, GEO systems like Inmarsat), (vi) near-field communication (NFC) (e.g., contactless payment systems), (vii) Zigbee; (viii) Z-Wave, (ix) ultra-wideband, (x) wireless USB (e.g., Wireless USB 2.0), and/or (xi) WiMAX (e.g., WiMAX 2.0). Additionally, it should be understood that the humanoid robot 1 may be interconnected with one or more other humanoid robots 2700A-X through a wireless communication protocol, such as a Bluetooth connection or a connection based on a near-field communication protocol, or through a wired connection.

The humanoid robot 1 may be collocated with one or more of the other humanoid robots 2700A-X to collectively or separately perform a given task or workflow. Such operations may occur, e.g., at a worksite such as a factory, warehouse, industrial facility, or home. Furthermore, the humanoid robot 1 may also be situated in a separate geographical location relative to other humanoid robots 2700A-X. For example, the humanoid robot 1 may be located in a given worksite, while another humanoid robot 2700A-X is located at another worksite in a different geographical location.

The operational environment may generally include machines 2710A-X, which may be embodied as any device, heavy machinery, or object with which a humanoid robot 1 and/or other humanoid robots 2700A-X may interact. For instance, a machine 2710A-X can include, among other things, tools, packaging machinery, forklifts, drilling machines, pallet movers, HVAC equipment, carts, bins, and platform machines.

The command centers 2750A-X may be comprised of one or more physical computing devices or virtual computing instances executing on a local or cloud network. These centers 2750A-X may be utilized for one or more of monitoring, managing, and configuring tasks, as well as for issuing control directives to the humanoid robot 1 and other humanoid robots 2700A-X at one or more worksites. A command center 2750A-X may be collocated with any of the humanoid robot 1 or the other humanoid robots 2700A-X, or it may be located in a different geographical location from the robots 1 and other humanoid robots 2700A-X. The computing devices of the command centers 2750A-X may execute software that is used to monitor (e.g., charge level, task performance, etc.), manage the robots 1 and other humanoid robots 2700A-X, and/or transmit long-horizon goals, tasks, and control directives to the robots 1 and other humanoid robots 2700A-X over the networks 2999A-X. Additionally and as such, the humanoid robots 1 and other humanoid robots 2700A-X may each be configured to: (i) send data to the command centers 2750A-X, (ii) perform a given task based on the transmitted long-horizon goals, tasks, and control directives, and/or (iii) infer a task based on the transmitted long-horizon goals, tasks, and control directives.

The command centers 2750A-X may determine, based on available humanoid robots 1 and the capabilities of each robot, which of the robots may be best suited for a given task. For example, the command centers 2750A-X may identify a humanoid robot 2700A-X to transfer parts to the other room once they are placed in the jig. The command centers 2750A-X may thereafter relay the assignment to the assigned other humanoid robot 2700A-X, which may be identified based on a unique identifier (e.g., serial number) assigned to each of the humanoid robots 1 and 2700A-X, and also to the other humanoid robots 2700A-X to indicate which other humanoid robot 2700A-X has been assigned the task.

The remote AI system 2780 may be comprised of one or more computing devices that are configured to perform global operations related to AI/ML for the entire computing environment. For example, the remote AI system 2780 may store, retrieve, and otherwise manage data within the data store 2900. This data may include one or more AI models 2902, rules 2912, and training data 2920. The AI models 2902 may be embodied as any type of model that: (i) can be run in an environment that is remote from the humanoid robot 1 and 2700A-X, while being in communication with the humanoid robot 1 to enable the humanoid robots 1 and 2700A-X to perform the functions described herein (e.g., observing, reasoning, and performing tasks), (ii) can be sent to the humanoid robot 1 and 2700A-X, where the humanoid robot 1 and 2700A-X runs the model locally to perform the functions described herein, and/or (iii) can be used in the training of any model described herein. For instance, the AI models 2902 may comprise artificial neural networks, convolutional neural networks, recurrent neural networks, generative adversarial networks, variational autoencoders, diffusion models, transformer models, natural language processing models (e.g., speech-to-text and/or text-to-speech), object detection models, image segmentation models, facial recognition models, transfer learning models, autoregressive models, large language models, visual language models, vision-action models, multi-modal language models, graph neural networks, reinforcement learning models, or any other type of model known in the art or disclosed herein. The rules 2912 may be comprised of sets of rules and conditions that are used to enable: (i) deterministic behavior by the humanoid robot 1 and the other humanoid robots 2700A-X, (ii) training the models that enable the humanoid robots 1 and 2700A-X to perform the functions described herein, and/or any other known rule. For example, the rules 2912 may include any combination of finite state machines, reactive control protocols, safety rules, configuration files, task sequencing protocols, safety protocols, and/or protocols for compliance with standards, safety, morals and/or regulations.

The training data 2920 may be embodied as any type of data that is used to train one or more of the AI models 2902. For example, the training data 2920 may include: (i) image data, such as raw image data, annotated image data, or synthetic data comprising computer-generated images used to augment real image datasets, particularly in instances where usable data is scarce; (ii) video data, such as raw video data, annotated video data, or synthetic data; (iii) text data, such as natural language instructions, dialogue data, machine-readable instructions, or natural language mapping data; (iv) depth data, such as map data or point cloud data; (v) robot joint trajectories; (vi) robot joint locations; (vii) robot joint location data, which may be obtained from teleoperation of a robot; (viii) robot joint rotations data, which may also be obtained from teleoperation of a robot; (ix) other robot sensor data, such as inertial measurement unit (IMU) data, force and torque data, or proximity sensor data; (x) simulation data; (xi) human demonstration data, such as first person or third person images or videos of humans performing a task; (xii) robot demonstration data, such as images or videos of other robots performing a task; (xiii) any combination of the aforementioned data types; and/or (xiv) any other known data type. For clarity, it should be understood that any data type that is described above may be either labeled or unlabeled.

The remote AI system 2780 may include a data augmentation engine 2782, a training engine 2790, and a simulation engine 2800. The data augmentation engine 2782 may be embodied as any combination of hardware, software, or circuitry that is configured to increase the size and diversity of the training data 2920, particularly in instances where the training data is limited. For example, the data augmentation engine 2782 may be configured to perform: (i) image augmentation of visual data such as images and video frames (e.g., identifying anatomical point and/or kinematic chains), (ii) sensor data augmentation to simulate real-world inaccuracies like noise, thereby assisting in training the AI models 2902 to account for such inaccuracies, (iii) trajectory augmentation to modify the speed or timing of movements, which assists the AI models 2902 in learning to recognize and adapt to different behaviors, or to alter the trajectories or paths of the robot 1 in simulations, and (iv) domain randomization, which involves altering parameters including textures, lighting, and object positions.

The illustrative training engine 2790 may be embodied as any combination of hardware, software, or circuitry for training the AI models 2902, given a set of rules 2912 and training data 2920. To do so, the training engine 2790 may apply a variety of AI/ML techniques, such as supervised learning techniques (e.g., classification, regression), unsupervised learning techniques (e.g., clustering, dimensionality reduction, anomaly detection), semi-supervised learning techniques (e.g., training with both labeled and unlabeled data), reinforcement learning techniques (e.g., model-free methods, model-based methods), ensemble learning, active learning, and transfer learning techniques (e.g., by leveraging pre-trained models 2902). It should be understood that each of these techniques may be applied online or offline.

The simulation engine 2800 may be embodied as any combination of hardware, software, or circuitry for executing one or more of the AI models 2902 within a virtualized simulation environment. This allows for the simulation and analysis of various aspects of the humanoid robot 1, such as its kinematics, sensor behavior, overall behavior, anomalies, and the like. For example, the simulation engine 2800 may generate the simulation environment based on real-world mapping data that was previously observed and/or generated by the humanoid robot 1 or other humanoid robots 2700A-X, or that was obtained from third-party services. The simulation engine 2800 may also generate a physics-accurate model of the humanoid robot 1, which has a specified configuration (e.g., a physical structure, joints, sensors, actuators, and other components with predefined parameter sets). The data generated from the simulations may then be used by the training engine 2790 to build, train, alter, fine-tune, or modify a previously generated model, a new model, and/or rules. Advantageously, the simulation engine 2800 is designed to improve efficiencies in the manufacture, testing, and deployment of a given humanoid robot 1 for a specified purpose.

The remote AI system 2780 may account for the substantial computing and resource demands required by AI/ML-based techniques by processing at least a portion of data, requests, and/or training. As such, the humanoid robots 1 may be configured with considerably less powerful compute, network, and storage resources. For instance, the humanoid robot 1 may prioritize certain processes, such as those relating to the performance of a presently assigned task, and offload other processes, such as the refining of local AI/ML models, to the remote AI system 2780. The remote AI system 2780 may also periodically update the humanoid robots 1 and 2700A-X with refined AI models 2902 and training data 2920, or it may receive updates and propagate them to the robots 1, for instance, via over-the-air updates or push subscription-based updates. The remote AI system 2780 may also push updated rules 2912 to the robots 1 and 2700A-X. Additionally, the remote AI system 2780 may receive data from each of the humanoid robots 1 and 2700A-X, which may include behavioral information, learning information, model reinforcement data, and the like. The remote AI system 2780 may store such data as training data 2920 and subsequently use this data to refine the AI models 2902.

Although FIG. 1 depicts the data augmentation engine 2782, the training engine 2790, and the simulation engine 2800 as executing on a single remote AI system 2780, one of skill in the art will recognize that each of these engines may execute on separate systems or computing nodes associated with the remote AI system 2780. Such an arrangement may be advantageous in improving the performance and resource management of each of the engines 2782, 2790, and 2800.

D. Humanoid Robot

Figure 2:
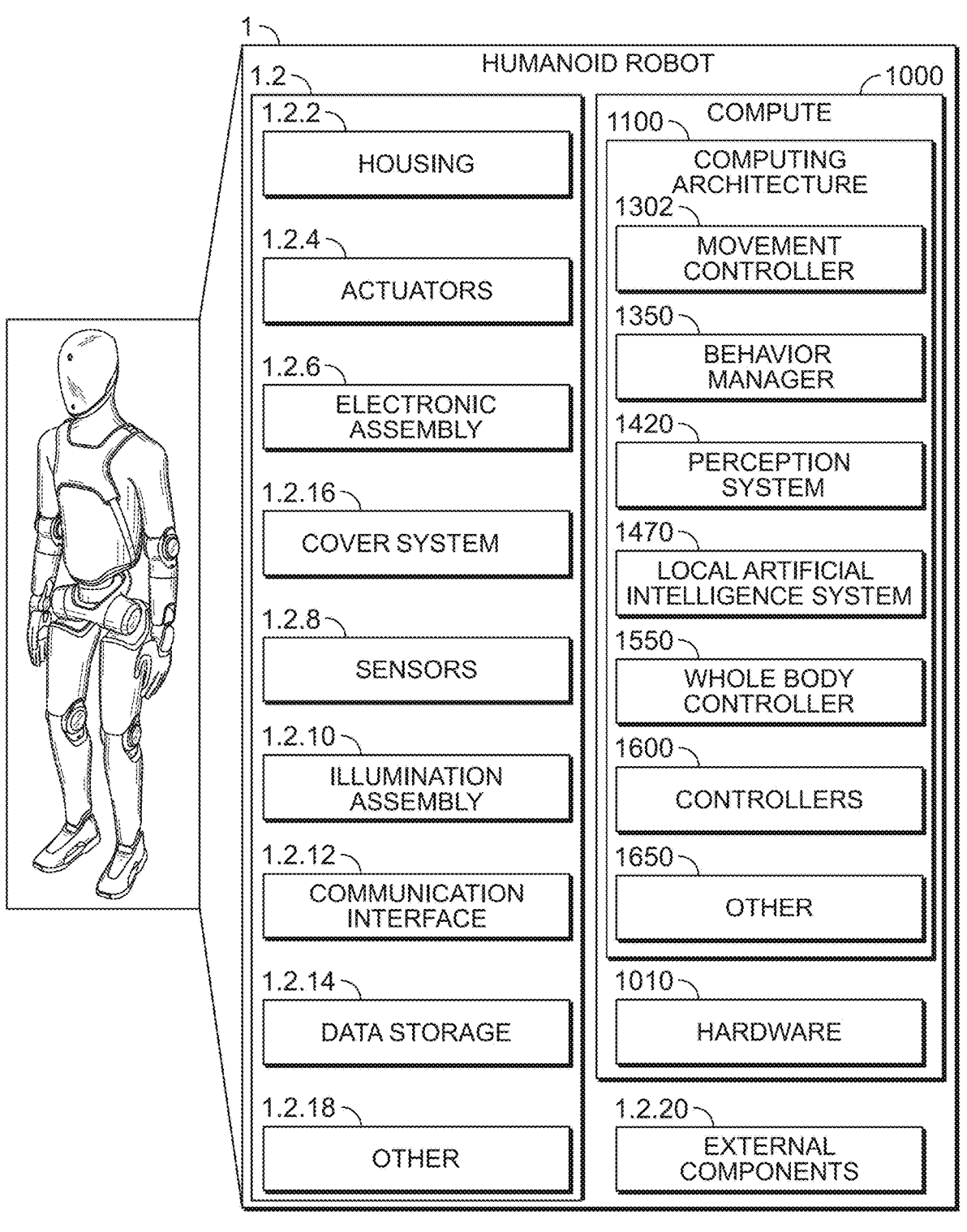
FIG. 2 is a block diagram illustrating components of the humanoid robot of FIG. 1.

FIG. 2 is a block diagram of a humanoid robot 1 that includes a variety of architectures and other components that may include: (i) a mechanical and electrical architecture 1.2 that includes housings 1.2.2, actuators 1.2.4, electronic assembly 1.2.6, sensors 1.2.8, communication interface 1.2.12, illumination assembly 1.2.10, data storage 1.2.14, cover system 1.2.16, external components 1.2.20, other components 1.2.18, and (ii) compute 1000 that includes a computing architecture 1100 including instructions to be executed on computing hardware 1010 comprising at least one processor.

a. Humanoid Robot Configuration

The high-level configuration for the robot 1 includes assemblies that function together to provide the robot with a humanoid shape and enable said robot to perform human-like movements. As such, the structures and kinematic principles that are inherent to non-humanoid systems cannot be simply adopted or implemented into a humanoid robot 1 without undergoing careful analysis and empirical verification against the complex realities of design, testing, and manufacturing. Theoretical designs that attempt such direct modifications are insufficient, and in some instances woefully insufficient, because they amount to mere design exercises that are not tethered to the complex realities of successfully creating a functional, general-purpose humanoid robot.

i. Robot Components

In addition to the general systems, assemblies, components, and parts described above, the humanoid robot 1 in the illustrative embodiment shown in FIG. 3A may include the following systems, assemblies, components, and parts, which can be broadly categorized into three regions. As shown in FIG. 3A, these three regions include: (i) an upper portion 2, which includes a head and neck assembly 10, a torso 16, left and right arm assemblies 5, and left and right hands 56; (ii) a central portion 3, which includes a spine 60, a pelvis 64, and left and right upper leg assemblies 6.1 of left and right leg assemblies 6; and (iii) a lower portion 4, which includes left and right lower leg assemblies 6.2 of leg assemblies 6.

In the illustrative embodiment shown in FIG. 3A, each arm assembly 5 may include a shoulder 26, an upper humerus 30, a lower humerus 36, an upper forearm 40, a lower forearm 46, and a wrist 50. The hand 56 is coupled to the wrist 50. Each leg assembly 6 may include: (i) an upper leg assembly 6.1, which may comprise a hip 70, an upper thigh 76, and a lower thigh 80, and, (ii) a lower leg assembly 6.2, which may comprise a shin 84, a talus 88, and a foot 92. In other embodiments, some of these systems, assemblies, components, or parts may be omitted, combined, or replaced with alternative designs.

1. Head and Neck Assembly

The head and neck assembly 10 of the humanoid robot 1 may be designed to enhance its anthropomorphic characteristics, while also providing functional capabilities that support interaction, perception, and communication. The head and neck assembly 10 is coupled to a torso 16 and possesses an overall shape that generally resembles the general shape of a human head. The head and neck assembly 10 is, however, specifically designed to lack pronounced human facial structures, such as cheeks, eye protrusions, a mouth, or other moving parts, to maintain a non-humanlike appearance. The exterior surface of the head 10.1 is characterized by an absence of large flat surfaces (e.g., the head 10.1 is not a cube or prism) and the head is also not formed with significant cylindrical features or perfect circles. Instead, almost all exterior surfaces of the head 10.1 are curvilinear or contain substantial curvilinear aspects, which presents a generally egg-shaped appearance when viewed from the front or top.

Structurally, the head 10.1 is symmetrical about the sagittal plane PS but is asymmetrical about Z-Y and X-Y planes that intersect the head and are parallel to the coronal plane (PC) and the transverse plane (PT), respectively. The width (parallel to the y-axis) and depth (parallel to the x-axis) of the head 10.1 change constantly from top to bottom, reaching a maximum dimension in the temple region, which is located at approximately 30-50% of the head's height from its top end. The head 10.1 itself may house a range of components, such as high-resolution cameras, microphones, and displays, all of which are contained within an impact-resistant polymer shell 102.2. This shell 102.2 includes a large, freeform (i.e., not conforming to a regular or formal structure or shape) frontal shield 102.4 that covers the frontal and crown regions of the head 10.1. The frontal shield 102.4 is formed as a separate and distinct piece from the displays positioned behind it, thereby protecting the displays and internal electronics from damage. This separation provides a significant advantage during the performance of industrial tasks, as a damaged frontal shield 102.4 is substantially cheaper and easier to replace than a damaged display. The frontal shield 102.4 extends rearward beyond an auricular region into an occipital region and extends down to a chin region, but it does not extend below a jaw line.

Cameras embedded within the head 10.1 may include RGB, depth-sensing, thermal imaging capabilities and/or any other cameras disclosed herein, which are designed to enable the humanoid robot 1 to perform tasks such as object recognition, environmental mapping, and facial expression analysis. For the specific purpose of generating a low-latency Virtual Reality (VR) view, a pair of high-resolution, high-frame-rate RGB cameras with global shutters may be utilized. For example, this pair of cameras may be the vertically arranged cameras 108.2.2 and 108.2.4, or they may be horizontally arranged internal/external cameras. Microphones may be arranged in an array to facilitate directional audio input and noise cancellation, which enhances the ability of the humanoid robot 1 to understand and respond to verbal commands.

Displays integrated into the head 10.1 may serve as user interfaces, providing visual feedback or conveying expressions to improve communication and user engagement. Unlike the heads of conventional robots, the disclosed head 10.1 includes a main display 108.4 that is curved in at least one direction and is positioned at an angle relative to a sagittal plane. This curved design permits the inclusion of a larger display with a greater surface area compared to a flat screen, which increases the amount of information that can be conveyed, such as robot status and sensor data. This information is displayed using generic blocks or shapes rather than anthropomorphic features like eyes or a mouth. In addition to the main display 108.4, two side-facing displays are included to show indicia such as the identification number/serial number, battery life, current task, any required safety indicia, and/or any other information associated with the humanoid robot 1.

Further, an extent of the illumination assembly 1.2.10, which comprises a plurality of light emitters, is positioned adjacent to an edge (e.g., lower) of the frontal shield 102.4. These light emitters may be configured to function as indicator lights to communicate the status of the robot 1 to nearby humans—for instance, by emitting light that appears to humans in different colors (e.g., yellow for working, green for idle, red for an error state, or blue for thinking) or illumination sequences—without relying on the main displays. This method of communication may be more power-efficient than displays, and may relay information more rapidly.

Additionally, the head 10.1 may house: (i) other sensors, such as gyroscopes and accelerometers, (ii) heat management systems (e.g., heat pipes, fans, etc.), (iii) wireless communication modules (e.g., 5G cellular, Wi-Fi, Bluetooth) and antennas. To maximize bandwidth and ensure connectivity, a plurality of 5G cellular radios may be positioned in the torso 16 and wired through the neck to the antennas in the head 10.1. The head and neck assembly 10 may also incorporate advanced materials and shock-absorbing structures to protect the sensitive electronic components housed within, which may improve the overall durability and reliability of the humanoid robot 1.

2. Torso

The torso assembly 16 is a central component within the humanoid robot 1, extending vertically between the waist and the head and neck assembly 10, and horizontally between the shoulders 26. The torso 16 is designed to provide the robot 1 with a generally humanoid shape, offer structural and operable support for the arm assemblies 5 and the head and neck assembly 10, and house and protect internal components, including the arm actuators (J1) 190 and an electronics assembly 1.2.6 housed at least partially within the torso 16.

The electronics assembly 1.2.6 contained primarily within the torso 16 includes various interconnected components that are essential for the operation of the robot 1, including the battery pack, the compute 1000 (which includes CPUs and GPUs), power distribution unit, and a charging system. The components are strategically positioned to optimize space and balance. The battery pack may be rearwardly offset, positioned in a rear section of the torso 16, while the compute 1000 is placed in a forward section. This spatial distribution helps to maintain a balanced posture, allows for efficient cooling, and maximizes the size and power density of the battery pack. A cooling system may be integrated between the battery pack and the compute 1000 to manage their respective thermal loads. The electronics assembly 1.2.6 may be designed with modularity to facilitate easier maintenance, repair, and upgrades. The charging system may support both wired and wireless protocols. A wired system might use a docking station, while a wireless system could utilize inductive charging, with coils that may be embedded in a housing 1.2.2 and/or the feet 92. The charging system may also include safety features such as overcharge protection and temperature monitoring.

The torso 16 may have a total volume of more than 10 liters, preferably more than 15 liters, and most preferably more than 20 liters. However, the torso 16 has a total volume that is less than 40 liters and most preferably less than 30 liters. The torso 16 also has an uninterrupted internal height that is more than 250 mm, and is preferably near to 300 mm, but is less than 350 mm. This substantial internal volume may accommodate a battery pack that exceeds 2 liters, preferably more than 4 liters, and most preferably more than 6 liters in capacity. Consequently, the humanoid robot 1 may incorporate a battery pack with a capacity exceeding 2.5 kWh, which may provide an operational runtime of over 3.5 hours under normal conditions, and preferably more than 4.5 hours, and most preferably more than 6 hours. In some implementations, the torso 16 may adopt a quasi-trapezoidal prism configuration, wherein its front surface is smaller than its back surface, with angled side shrouds connecting these two sections. This geometric design may enhance the range of motion of the robot 1, particularly by improving its ability to reach across its own body.

3. Arm Assemblies

The arm assemblies include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the arm assembly may incorporate features such as hard-stops, cooling channels, heat sinks, or other materials, structures, components, or assemblies described herein. For example, a heat pipe may extend from the hand to the lower forearm. Furthermore, the wrist 50 may include a quick-release mechanism that enables the interchange of different end-effectors or tools. Moreover, the housing of each component may be designed with internal reinforcement structures, may be made from various materials (e.g., metal alloys or advanced materials like carbon-fiber-reinforced polymers).

4. Leg Assemblies

The leg assemblies 6 include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the leg assembly may incorporate features such as hard-stops, cooling channels, heat sinks, or other materials, structures, components, or assemblies described herein. For example, a heat pipe may extend from the knee to the shin 84. Furthermore, the talus 88 may include a quick-release mechanism that enables the interchange of a different foot 92. Moreover, the housing of each component may be designed with internal reinforcement structures, may be made from various materials (e.g., metal alloys or advanced materials like carbon-fiber-reinforced polymers).

To enhance the stability and adaptability of the humanoid robot 1, the leg assemblies 6 may incorporate advanced sensing and control systems, as well as comprehensive protective systems. For instance, force sensors located in the feet 92 and ankles may provide real-time feedback on ground contact forces and pressure distribution. This data may be used by the control system of the humanoid robot 1 to make rapid adjustments in order to maintain balance, especially when moving on uneven or dynamic surfaces. Inertial measurement units (IMUs) positioned in the leg assemblies 6 and the pelvis 64 may also provide crucial information on the orientation and acceleration of each leg segment, thereby allowing for the precise control of leg positioning during movement.

b. Mechanical and Electrical Architecture

The mechanical and electrical architecture 1.2 may be embodied as any combination of hardware, software, and circuitry that enables the humanoid robot 1 to operate and perform physical functions in response to electrical charges or electrical signals. As illustrated comprehensively in additional figures herein, the robot 1 is composed of a plurality of assemblies and components that are specifically arranged to emulate or generally resemble human anatomical structures and their functional characteristics. A humanoid form is advantageous because it enables the robot 1 to execute a wide range of general tasks that are typically performed by humans, such as walking between different locations, handling and moving objects, and retrieving items from various positions and orientations. Non-humanoid forms (e.g., wheeled robots or quadrupeds) typically lack the versatility and effectiveness that are required to perform such a diverse array of generalized tasks.

i. Actuators

The actuators 1.2.4 contained within the robot 1 include thirty actuators (J1)-(J16), excluding the end effectors, that are housed within various components of the robot 1 to actuate movement of said components. An additional aggregate total of twelve actuators are in both hands 56 combined. Below is a summary table showing the actuator 1.2.4 reference names and numbers for the thirty actuators (J1)-(J16), the quantity of each, descriptive actuator names used herein for consistency, common corresponding informal actuator names, and associated rotational axes from the high-level configuration of the illustrative embodiment robot 1. Specific actuators in each hand 56 (e.g., six actuators in each hand) are not individually included in the below table

TABLE 1

| Actuator | Qty | Actuator Name | Informal Actuator Name(s) | Axis |
|---|---|---|---|---|
| (J1) 190 | 2 | arm | primary arm | $A_1$ |
| (J2) 280 | 2 | shoulder | (none) | $A_2$ |
| (J3) 320 | 2 | upper arm twist | upper arm x, upper arm roll | $A_3$ |
| (J4) 374 | 2 | elbow | arm z, arm yaw, lower humerus | $A_4$ |
| (J5) 468 | 2 | lower arm twist | lower arm x, lower arm roll | $A_5$ |
| (J6) 484 | 2 | wrist flex | wrist/hand y, wrist/hand pitch, flick | $A_6$ |
| (J7) 520 | 2 | wrist pivot | wrist/hand z, wrist/hand yaw, wave | $A_7$ |

TABLE 1-continued

| Actuator | Qty | Actuator Name | Informal Actuator Name(s) | Axis |
|---|---|---|---|---|
| (J8.1) 120 | 1 | head twist | head no | $A_{8.1}$ |
| (J8.2) 140 | 1 | head nod | head yes | $A_{8.2}$ |
| (J9) 680 | 1 | torso lean | spine x, torso/spine roll | $A_9$ |
| (J10) 620 | 1 | torso twist | spine z, torso/spine yaw | $A_{10}$ |
| (J11) 720 | 2 | hip flex | hip y, hip/leg pitch, forward kick | $A_{11}$ |
| (J12) 768 | 2 | hip roll | hip x, hip/leg roll, sideways kick | $A_{12}$ |
| (J13) 782 | 2 | leg twist | hip z, hip/leg yaw | $A_{13}$ |
| (J14) 820 | 2 | knee | lower thigh, lower leg y, lower leg pitch, rear kick | $A_{14}$ |
| (J15) 860 | 2 | foot flex | foot y, foot pitch, or first ankle | $A_{15}$ |
| (J16) 900 | 2 | foot roll | talus, foot roll, foot x, second ankle | $A_{16}$ |

It should be understood that in other embodiments, some of these systems, assemblies, components, and/or parts may be omitted, combined, or replaced with alternative systems, assemblies, components, and/or parts. The robot 1 only uses electric actuators, and thereby lacks manual, hydraulic, cable-based, or pneumatic actuators. The exclusive use of electric actuators reduces assembly, maintenance, weight, and cost, and increases durability and safety considerations related to operating the robot 1 within or around other humans.

ii. Communication Interfaces

The communication interfaces 1.2.12 may be embodied as any hardware, software, or circuitry to enable the exchange of data, signals, and other forms of communication between different components within the humanoid robot 1, and between the humanoid robot 1 and other systems (e.g., other humanoid robots 2700A-X, the command centers 2750A-X, the remote AI system 2780), and other components and devices interconnected over the networks 2999A-X. Specifically, FIG. 5 shows that the humanoid robot 1 may be configured with a variety of communication interfaces 1.2.12. The communication interfaces 1.2.12 may be embodied as any combination of a communication circuit, device, or collection thereof, capable of enabling communications over a network (e.g., the networks 2999A-X). The communication interfaces 1.2.12 may be configured to use any one or more communication technology (e.g., wired or wireless communications) and associated protocols to effect such communication.

Referring to FIG. 5, examples of communication interfaces 1.2.12 include a wireless communication interface 1.2.12.2 (e.g., Bluetooth®, Wi-Fi®, WiMAX, Cellular (e.g., 3G, 4G, 5G), Zigbee, LoRa (Long Range) and RF (Radio Frequency)), a wired communication interface 1.2.12.4 (e.g., Ethernet, USB, Serial Communication (e.g., RS-232, RS-485), and Controller Area Network (CAN) interface)), a local communication interface 1.2.12.6 (e.g., an I2C (Inter-Integrated Circuit), SPI (Serial Peripheral Interface)), and a human-robot communication interface 1.2.12.8 (e.g., voice recognition systems to enable communication through spoken commands using speech recognition technology, touch interfaces such as touchscreens or physical buttons for direct human interaction with the humanoid robot 1). Alternatively or additionally, the human-robot communication interface 1.2.12.8 may include gesture recognition systems or gaze tracking, allowing for more intuitive and non-verbal inter-action with human operators. The communication interfaces 1.2.12 may also include a network interface controller (NIC) (not illustrated), which may also be referred to as a host fabric interface (HFI). The NIC may be embodied as one or more add-in-boards, daughtercards, controller chips, chip-sets, or other devices that may be used by the humanoid robot 1 for network communications with remote devices.

c. Compute

As illustrated in FIG. 2, the compute 1000 may comprise any combination of hardware, software, and circuitry to perform various computing functions that enable the human-oid robot 1 to operate semi- or fully-autonomously. Specifically, the compute 1000 includes: (i) compute hardware 1010, and (ii) computing architecture 1100. Such functions may include processing long-horizon goals, coordinating with other humanoid robots 2700A-X, processing sensor information, controlling the humanoid robot 1 based on the sensor information and goals, controlling the activation or deactivation of mechanical components, learning, simulating, refining behavioral models, and policy management.

The compute hardware 1010 may operate as one or more general purpose processors or special purpose processors (e.g., digital signal processors, application specific integrated circuits (ASICs), field programmable gate arrays (FPGAs), etc.) that can be configured to execute computer-readable program instructions stored in the aforementioned data storage devices. The computing architecture 1100 includes: (i) a movement controller 1302, (ii) a behavior manager 1350, (iii) a perception system 1420, (iv) a local AI system 1470, (v) a whole body controller 1550, (vi) one or more controllers 1600, and (vii) other subcomponents 1650. The whole body controller 1550 may be embodied as any combination of hardware, software, or circuitry for receiving information from the behavior manager 1350 or the local AI system 1470. The whole body controller 1550 may thereafter send the information to other components of the compute 1000. For example, the whole body controller 1550 may transmit joint torque data, which is data pertaining to rotational forces exerted at "joints" of the humanoid robot 1, to the controllers 1600. It should be understood that the whole body controller 1550 may be omitted and/or consumed by one or more models (e.g., RL trained models) that are contained within the local AI system 1470.

The controllers 1600 may be embodied as any combination of hardware, software, and/or circuitry for transmitting joint torque data to the actuators 1.2.4, e.g., to extend and retract parts (such as arms, hands, fingers of the humanoid robot 1). The controllers 1600 may also infer joint torque and angle data received from other sensors 1.2.8, such as IMUs mounted on a given "body part." In some embodiments, the joint torque and angle data may be measured using rotary position sensors, optical reflection, or other methods. The whole body controller 1550 may also incorporate advanced control strategies, such as passivity-based control or adaptive control, to ensure stability and robustness in the presence of uncertainties or external disturbances. It should be understood that the controllers 1600 may be omitted and/or consumed by one or more models (e.g., RL trained models) that are contained within the local AI system 1470.

E. Humanoid Robot Data Collection System

Figure 6:
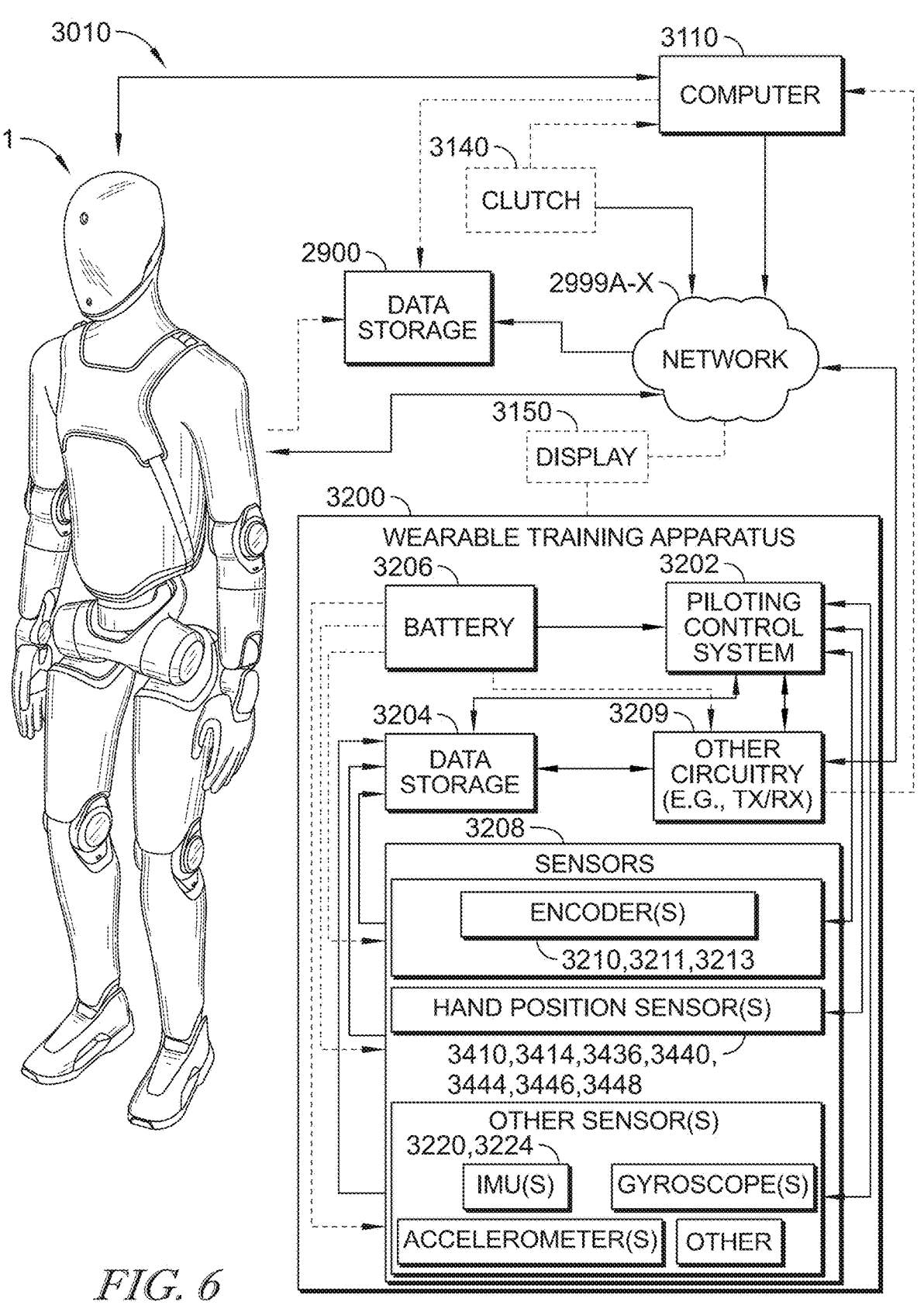
FIG. 6 is a schematic diagram of a humanoid robot data collection system having: (i) a humanoid robot, (ii) a wearable data collection apparatus, (iii) data storage, (iv) a secondary computer, (v) a display, and (vi) a clutch in communication directly or via a network.

As best illustrated in FIG. 6, the humanoid robot data collection system 3010 may include: (i) a wearable data collection apparatus 3200, (ii) a computer 3110, (iii) a data storage database 2900, (iv) a clutch 3140, (v) a display 3150, which may be a headset device, and/or (vi) the robot 1 in data communication via a network 2999A-X. The data collection system 3010 includes a wearable data collection apparatus 3200 to be worn by an operator (H) (also referred to as a pilot, user, teleoperator, data collector, apparatus wearer, or human operator) to collect pilot movement data associated with the operator's (H) movements. This pilot movement data may be utilized by a robot 1 for training models and executing teleoperation tasks. The pilot movement data may be stored locally within data storage 3204 on the apparatus 3200, stored remotely in the data storage database 2900, and/or transmitted in real-time to the robot 1 through the network 2999A-X. This data may be incorporated into training data of the robot 1 to be utilized to perform tasks in the operational environment, including manipulation tasks, locomotion patterns, and complex multi-step procedures.

The data collection system 3010 is designed to collect data derived from the movements of the operator (H) while performing various tasks and activities. Specifically, while wearing the data collection apparatus 3200, the operator (H) generates pilot movement data that may include or relate to: (i) the position and/or movement of the operator (H) in space while performing a task, including translational and rotational components in three-dimensional space, (ii) the relative spatial locations of anatomical joint centers of rotation, including shoulder, hip, elbow, knee, wrist, ankle, and/or finger joints, (iii) the velocity and acceleration profiles of each tracked body segment, and/or (iv) any other data about the operator that is relevant to the control and training process (e.g., grip force patterns, hand orientation trajectories, or movement timing sequences). The pilot movement data may be captured at sampling rates ranging from 1 Hz to 10 kHz.

This pilot movement data may encompass: (a) the position and movement of the operator's torso, including actions such as twisting or bending at the waist with angular measurements in roll, pitch, and yaw axes, and the operator's location within a training environment tracked through both relative and absolute positioning methods, (b) the position and movement of the arms of the operator (H), where such tracking may detail the operator's shoulder motion, elbow flexion and extension, wrist pose (defined by both position and orientation) in six degrees of freedom, and hand or finger gestures, which can be captured via gloves 3400 coupled to the wearable data collection apparatus 3200 or other sensors with sufficient resolution to distinguish individual finger movements of the operator (H), and/or (c) the position and movement of the legs of the operator (H), where such tracking may detail the operator's hip motion, knee flexion and extension, ankle pose (defined by both position and orientation) in six degrees of freedom.

The pilot movement data can be captured by the wearable data collection apparatus 3200 as sensor data, which may then be transferred to another component for further processing or storage through various communication protocols. This recipient component may be: (i) a remote computer (e.g., a command center 2750) connected via wireless or wired networks, (ii) the computer 3110 integrated with or separate from the apparatus 3200, or (iii) another computing system or architecture, such as the whole body controller (WBC) 1550 operating on compute 1000 of the robot 1. This data transfer enables the execution of instructions to generate robot control data or log data for training purposes, such as training the robot 1 itself through supervised learning methods, or training models like Bipedal Action Models (BAMs) for use in controlling the robot 1. The data transfer may occur at various rates depending on the application requirements, ranging from batch transfers for offline training to real-time streaming for teleoperation.

The disclosed data collection system 3010 is a cost-effective solution that may not require an overly complex mechanical design to achieve robust human data capture while maintaining high fidelity in motion tracking. This type of data collection system 3010 simplifies the overall data collection process when compared to some alternatives and may not require a substantial number of additional external sensors or environmental detection devices, such as the external cameras often required for tracking in traditional motion capture systems. For example, the data collection system 3010 does not inherently require an extensive external camera setup that necessitates controlled lighting, which is a common requirement for purely vision-based motion capture systems that rely on optical markers. Because the primary positional data is collected through integrated sensors directly coupled to the operator (H) wearing the wearable data collection apparatus 3200, there are generally no line-of-sight occlusion or "black-out" spots created by machines, furniture, or other structures present in the training environment. This can be a significant problem for external camera-based systems where occlusions may result in data loss or interpolation errors. In addition to avoiding such black-outs, the disclosed system is less expensive than highly complex, large-scale motion capture setups.

The data collection system 3010 includes onboard sensors integrated directly into the wearable structure, and thus generally does not require a quiet acoustic environment. Additionally, the apparatus 3200 is designed to be portable as it is worn by the operator (H), relatively lightweight in comparison to full exoskeletons, and quicker to manufacture due to simpler mechanics than a full force-feedback exoskeleton which may require complex actuator assemblies. Further, the data collection system 3010 minimizes the required infrastructure footprint when compared to fixed base systems and can eliminate the need for a complicated walking base simulator, numerous external wires that may restrict movement, or extensive external tracking components such as ceiling-mounted camera arrays. As a result, a large quantity of pilot movement data can be collected at a relatively low cost per hour, and this data can be used for training the robot control models (e.g., machine learning, BAM models).

a. Wearable Data Collection Apparatus

As best shown in FIGS. 7A, 7B, 8, 10, 12, 21, and 22, the wearable data collection apparatus 3200 includes (i) a base mount 3240, (ii) left and right articulated arms 3300 pivotably attached to the base mount 3240, (iii) a wrist assembly 3370 coupled to each articulated arm 3300, (iv) a glove 3400 coupled to the wrist assembly 3370 via a glove mount 3394, and (v) an apparatus electronics assembly 3201. The apparatus electronics assembly 3201 includes a piloting control system 3202, data storage 3204, a battery 3206, a plurality of sensors 3208, and other circuitry 3209. The wearable data collection apparatus 3200 is configured to be worn by a human operator (H) to perform data collection tasks. The operator (H) wears the wearable data collection apparatus 3200 on the back and secures it in position using the adjustable harness 3270. The operator (H) also wears the gloves 3400 on each hand. The articulated arms 3300 are configured to move with the arms of the operator (H) wearing the wearable data collection apparatus 3200 as the operator (H) performs data collection tasks, where a plurality of sensors 3208 capture the position, orientation, and/or pitch of the operator's wrists and hands.

The sensors 3208 coupled to the wearable data collection apparatus 3200 include encoders 3211, 3212, 3213, IMUs 3220 and 3224, and hand sensors 3410. The encoders 3211-3213 are fixed to respective rigid frame links 3310-3312 to measure the rotational and positional movement of each rigid frame link. A torso IMU 3224 is coupled to the base mount 3240 and wrist IMUs 3220 may be coupled to the glove mount 3394, or optionally the glove 3400, to provide information regarding the pitch and orientation of the operator's wrist. The gloves 3400 provide additional positional information for the fingers and thumbs of the operator. The pilot movement data is collected by the piloting control system 3202 as the operator (H) performs tasks. The collected pilot movement data is processed by the piloting control system 3202 and/or computer 3110 to provide robot control data to the robot 1 via the network 2999A-X to be processed by the WBC 1550 of the robot 1. The WBC 1550 utilizes the robot control data to control the actuators 1.2.4 of the robot 1 to replicate the operator's movements and sensor data from the robot 1 is collected as training data as the robot 1 performs the task.

i. Base Mount

Referring to FIGS. 7A, 7B, 8, 10, and 12, the base mount 3240 of the wearable data collection apparatus 3200 includes a main support portion 3242 and left and right arm attachment portions 3244. The base mount 3240 has a first surface 3254 configured to face the operator (H) and a second surface 3256 configured to face outward from the operator (H). The main support portion 3242 is configured to extend along at least a portion of the operator's (H) back. The main support portion 3242 generally extends vertically along a posterior of the torso of the operator from a first or upper end portion 3258 that has a width configured to span the operator's (H) back at least between a position below the operator's (H) shoulders and a second or lower end portion 3260 that is configured to be positioned at or above the waist of the operator (H), for example in the operator's mid-back region. For example, the adjustable harness 3270 may include a harness component that couples to the main support portion 3242, such that the adjustable harness 3270 may be worn over the torso of the operator (H) and the main support portion 3242 may span the lower back of an operator (H) at the waist. In various embodiments, the adjustable harness 3270 may also couple to an extent of the articulated arms 3300 that extend from the main support portion 3242 and are positioned rearward of the operator (H).

The left and right attachment portions 3244 are coupled to the second surface 3256 or the sides of the main support portion 3242 and are configured to support the articulated arms 3300. The left and right attachment portions 3244 and the second surface 3256 cooperate to define left and right articulated arm-receiving apertures 3250 therebetween. Accordingly, the left and right attachment portions 3244 and the second surface 3256 cooperate to encase portions of the respective left and right articulated arms 3300. The base mount 3240 is sized to generally match the size of an average human operator (H) that may train the robot 1, extending from just below the shoulder to the mid-back or waist. For example, a human user may be between 5.5 and 6.5 feet tall with one or more standard sizes of the base mount 3240. In some examples, the main support portion 3242 and the attachment portions 3244 may be formed in one piece. The base mount 3240 may also include additional cut-outs to provide attachment features 3262 for the adjustable harness 3270 and to reduce the weight of the wearable data collection apparatus 3200 without compromising the structural integrity of the base mount 3240 support structure.

Additionally, the base mount 3240 is configured to mount and/or support one or more components of the apparatus electronics assembly 3201. For example, a torso IMU 3224 may be coupled to the main support portion 3242 as a sensor configured to obtain torso positional data, such as the orientation of the operator's torso, while the operator (H) is performing tasks. In various embodiments, the piloting control system 3202, data storage 3204, and battery 3206 may be contained in a housing and/or coupled to the second surface 3256 of the main support portion 3242. In some embodiments, the piloting control system 3202, data storage 3204, and battery 3206 may be coupled to or contained within the adjustable harness 3270.

ii. Articulated Arms

Figure 7A:
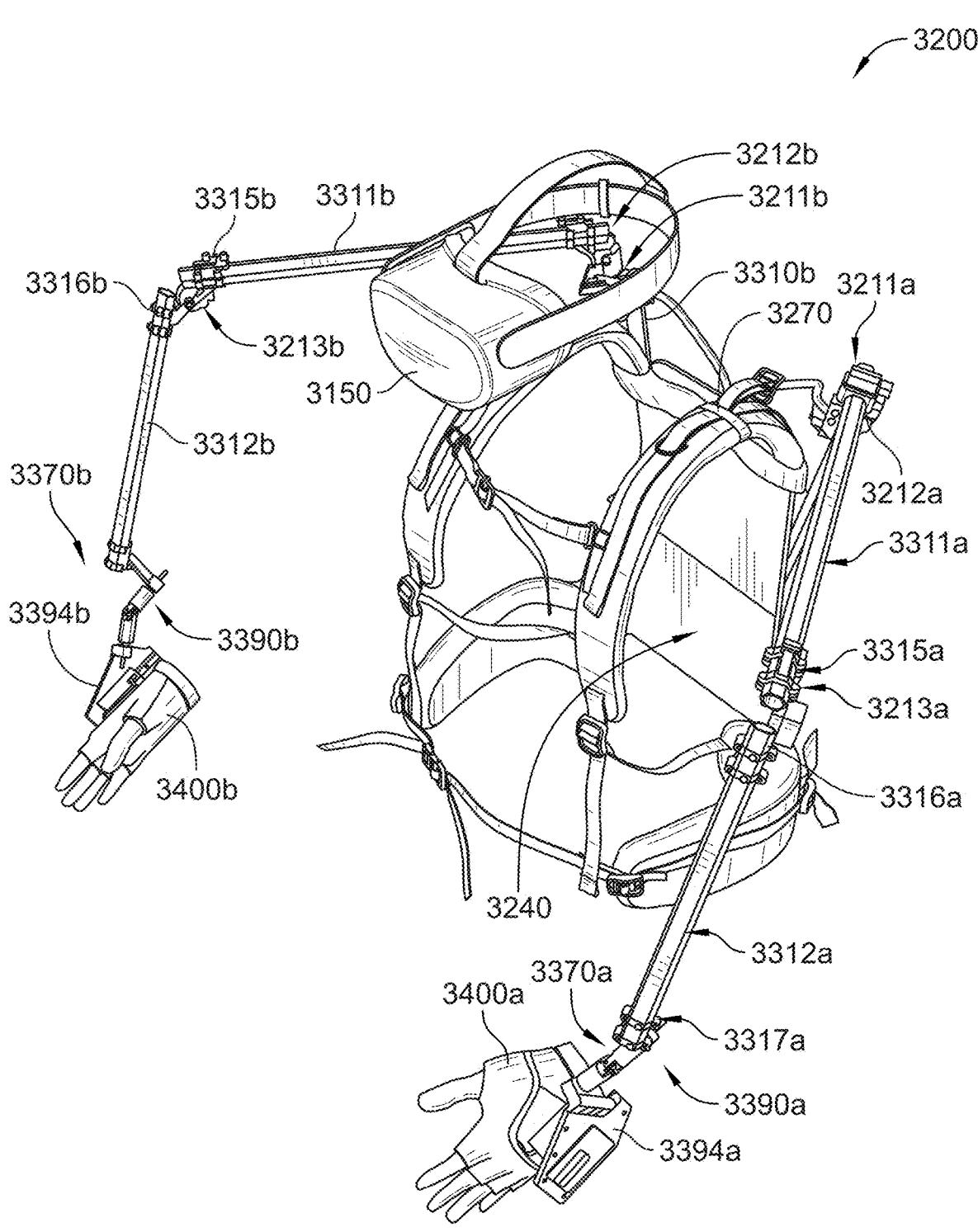
FIG. 7A is a perspective view of the wearable data collection apparatus of FIG. 6, wherein the display is shown as a headset.
Figure 7B:
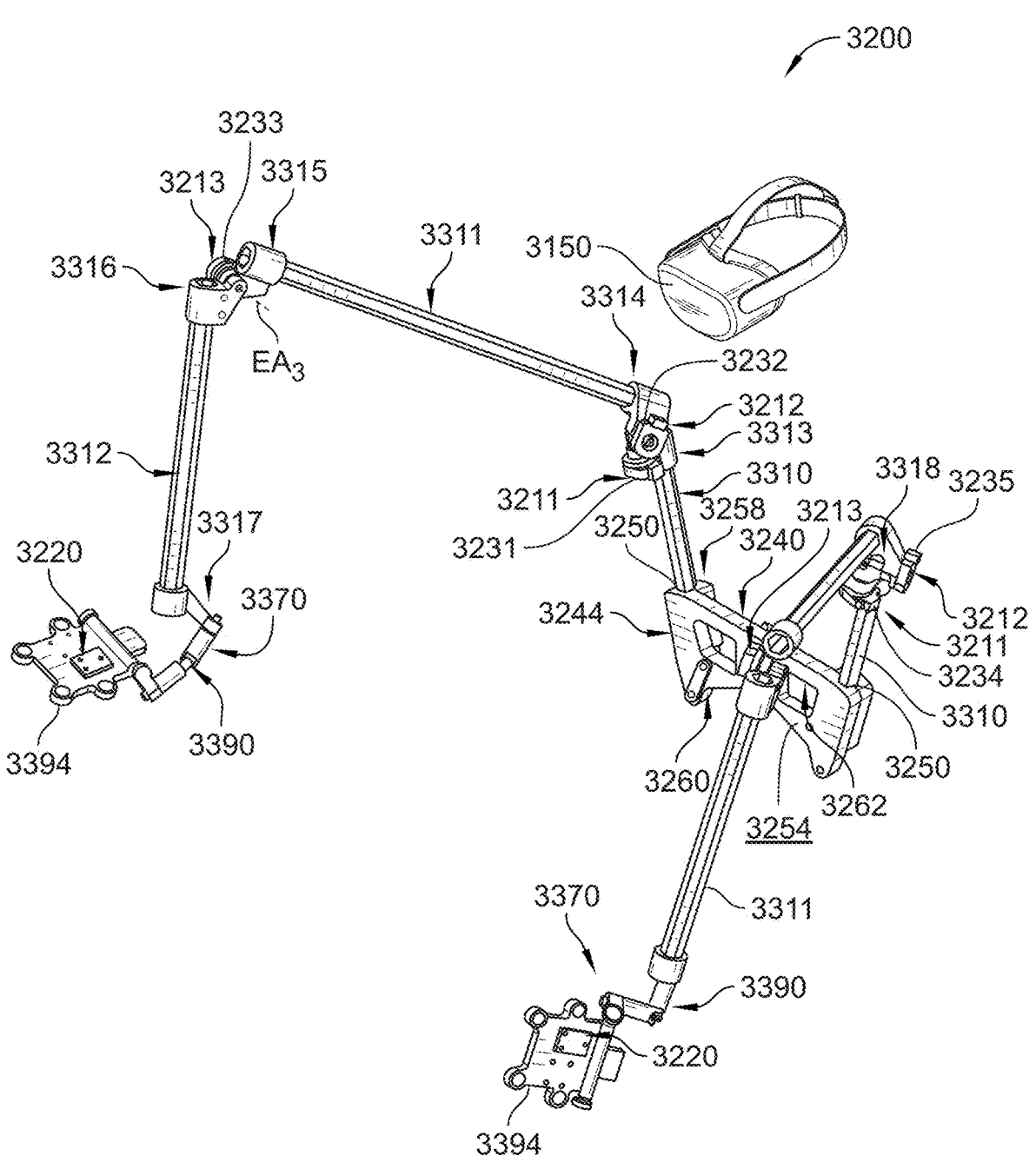
FIG. 7B is another perspective view of the wearable data collection apparatus of FIG. 6.
Figures 8, 9:
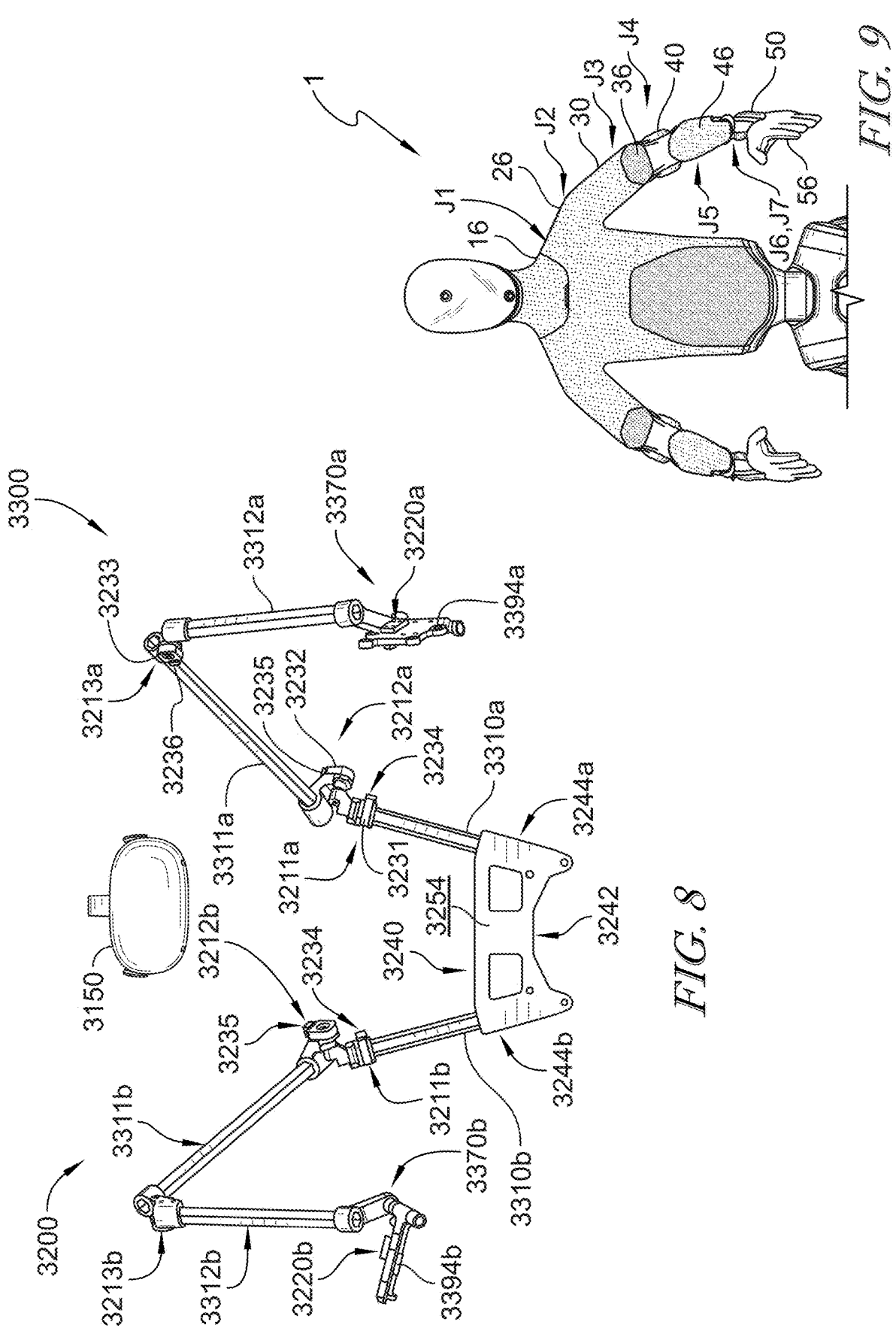
FIG. 8 is a front view of the wearable data collection apparatus of FIG. 7B.
FIG. 9 is a front view of the robot of FIG. 3A.
Figures 10, 11:
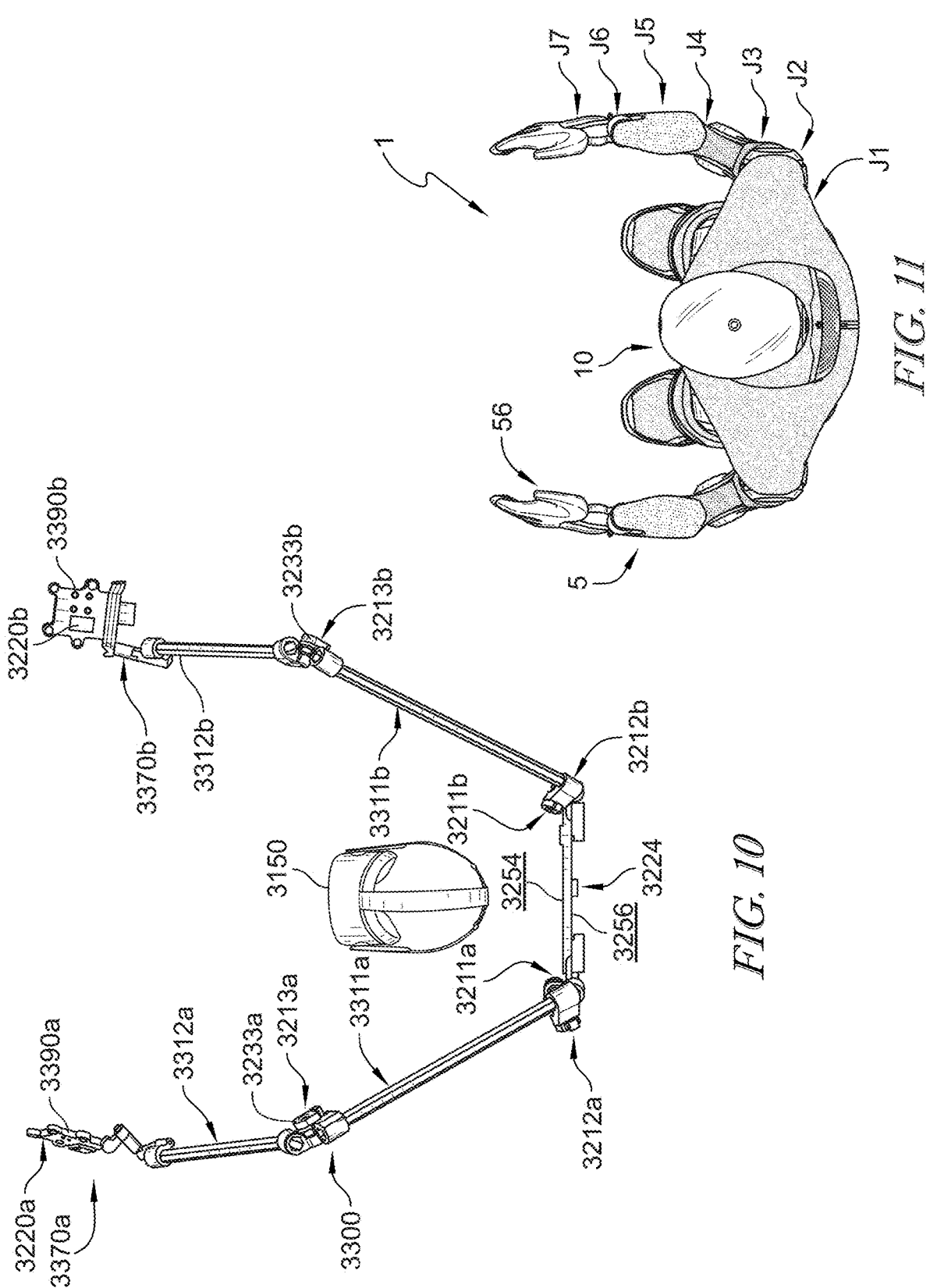
FIG. 10 is a top view of the wearable data collection apparatus of FIG. 8.
FIG. 11 is a top view of the robot of FIG. 9.
Figure 13:
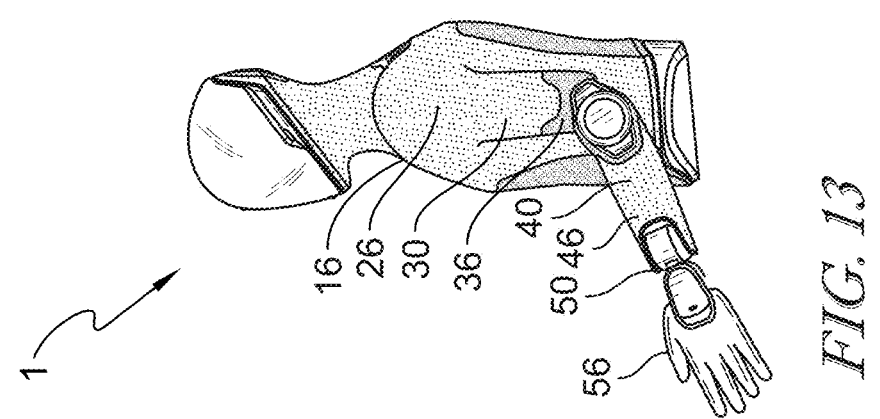
FIG. 13 is a side view of the robot of FIG. 9.
Figure 14:
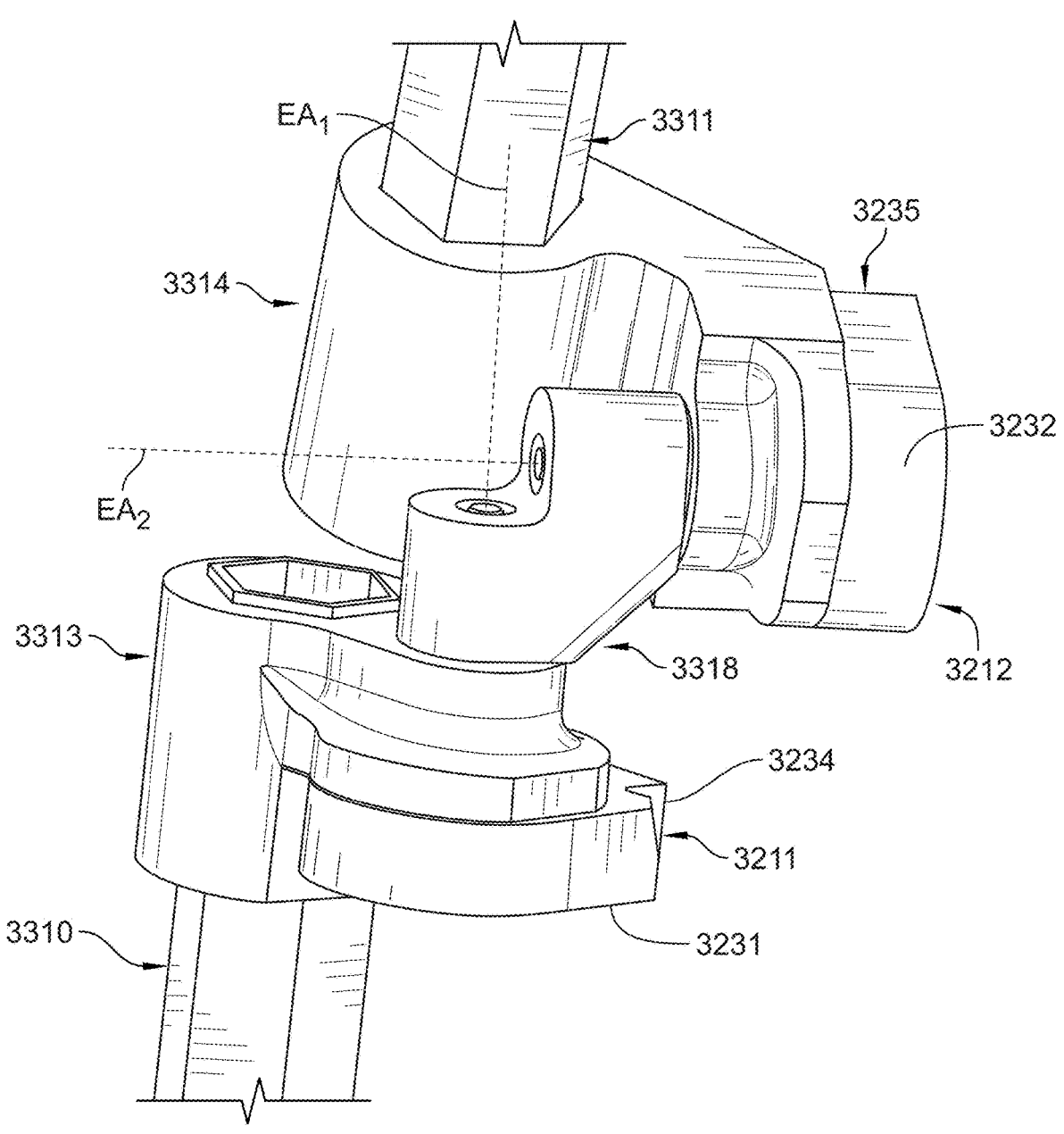
FIG. 14 is a detailed view of an extent of the wearable data collection apparatus of FIG. 8, showing a joint of an articulated arm and two encoders to determine the direction and height of an operator's arm.

Referring to FIGS. 7A, 7B, 8, 10, and 12, left and right articulated arms 3300 extend from the attachment portions 3244 of the base mount 3240 to the wrist assembly 3370. As best shown in FIG. 7B, each articulated arm 3300 includes three (3) individual rigid frame links 3310-3312 and five (5) joint couplers 3313-3317 interconnecting the individual rigid frame links 3310-3312 and the third individual rigid frame link 3312 to the wrist assembly 3370. Each articulated arm 3300 also includes a joint rotator 3318 interconnecting the first joint coupler 3313 and the second joint coupler 3314 (FIG. 14). The first four joint couplers 3313-3316 and the joint rotator 3318 cooperate to define joint connections between the individual rigid frame links 3310-3312 and the fifth joint coupler 3317 defines a joint connection between the third individual rigid frame link 3312 and the wrist assembly 3370. The wearable data collection apparatus 3200 includes joint sensors, such as encoders 3211-3213, at some of the joint connections, wherein the encoders may be absolute encoders or incremental encoders. The left and right articulated arms 3300 substantially mirror each other in size, position, and configuration. The rigid frame links 3310-3312 may have a fixed length or adjustable lengths. In embodiments where the rigid frame links 3310-3312 have adjustable lengths, each rigid frame link 3310-3312 may have two or more telescopic adjustable segments configured to be secured together at different positions, thereby providing for an adjustable length of the rigid frame link to accommodate the size of the operator's arms and upper torso.

The first individual rigid frame link 3310 of each articulated arm 3300 is fixed to the base mount 3240 at a proximal end between the second surface 3256 of the main support portion 3242 and the respective left or right attachment portion 3244. The first individual rigid frame link 3310 extends upwardly away and gradually outward from the upper end portion 3258 of the main support portion 3242 to couple to the first joint coupler 3313 at a distal end. In other words, the first individual rigid frame link 3310 is not perpendicular to the upper edge of the base mount 3240 or the support surface that the user is standing on; instead, said first individual rigid frame link 3310 is angled (between 1 degree and 70 degrees, preferably between 30 degrees and 55 degrees) relative to the upper edge of the base mount 3240 or the support surface that the operator is standing on. The angle of the first individual rigid frame link 3310 allows the base mount 3240 to have a minimized footprint. The first individual rigid frame link 3310 is configured to extend upwardly along the operator's upper back to at or above the operator's scapula and/or shoulder.

The first joint coupler 3313 is fixed to the first individual rigid frame link 3310 and coupled to the joint rotator 3318. A first encoder 3211 is coupled to the first joint coupler 3313 to determine the direction of the operator's arm. In the illustrative embodiment, the first encoder 3211 may be coupled to or contained within a first limiting member 3231 coupled to the first joint coupler 3313. Accordingly, the first encoder 3211 is arranged at or above the operator's scapula and/or shoulder. As such, the upper edge of the first individual rigid frame link 3310, the first joint coupler 3313, and/or the first encoder 3211 may be positioned below the operator's clavicle. In other embodiments, the upper edge of the first individual rigid frame link 3310, the first joint coupler 3313, and/or the first encoder 3211 may be positioned below the operator's scapula or shoulder, or positioned above the operator's clavicle.

The joint rotator 3318 is rotatably coupled to the first joint coupler 3313 and the second joint coupler 3314. The joint rotator 3318 cooperates with the first joint coupler 3313 to define a yaw axis $EA_1$ about which the joint rotator 3318 rotates. The yaw axis $EA_1$ is parallel to the first individual rigid frame link 3310. The joint rotator 3318 also cooperates with the second joint coupler 3314 and/or a second encoder 3212 to define a first pitch axis $EA_2$ about which the second joint coupler 3314 and/or the second encoder 3212 rotates to determine the height of the operator's arm. The first pitch axis $EA_2$ is orthogonal to the yaw axis $EA_1$. The second encoder 3212 is coupled to the second joint coupler 3314. In the illustrative embodiment, the second encoder 3212 may be coupled to or contained within a second limiting member 3232 coupled to the second joint coupler 3314. Due to the positional relationship of the first joint coupler 3313 and the second joint coupler 3314, said the second joint coupler 3314 may be positioned below the operator's clavicle and/or at or above the operator's scapula and/or shoulder. In other embodiments, the second joint coupler 3314 may be positioned below the operator's scapula or shoulder or positioned above the operator's clavicle.

Referring to FIG. 14, the first and second limiting members 3231, 3232 are arranged to prevent over rotation, such that the movements of the operator (H) do not exceed the range of motion of the robot 1. The first and second limiting members 3231, 3232 include hard stops 3234, 3235 configured to limit the rotational motion of the second individual rigid frame link 3311 with respect to the first individual rigid frame link 3310. In the illustrative embodiment, the first limiting member 3231 coupled to the first joint coupler 3313 may include a hard stop 3234 with a limit face 3237 positioned to engage with a second limiting member 3232 coupled to the second joint coupler 3314. Similarly, the second joint coupler 3314 may include a hard stop 3235 with a limit face 3238 positioned to engage with a first limiting member 3231 coupled to the first joint coupler 3313.

The second individual rigid frame link 3311 of each articulated arm 3300 is fixed to the second joint coupler 3314 at a proximal end and extends outwardly away from the operator's torso to couple to the third joint coupler 3315 at a distal end. The second individual rigid frame link 3311 rotates with the second joint coupler 3314 and/or the second encoder 3212 about the first pitch axis $EA_2$. A third encoder 3213 is coupled to the third joint coupler 3315 to determine the reach of the operator's arm. In the illustrative embodiment, the third encoder 3213 may be coupled to or contained within a third limiting member 3233 coupled to the third joint coupler 3315, where the third limiting member 3233 may include a hard stop 3236 with a limit face 3239 positioned to engage with a fourth joint coupler 3316. The fourth joint coupler 3316 is rotatably coupled to the third joint coupler 3315 and/or the third encoder 3213. The fourth joint coupler 3316 cooperates with the third joint coupler 3315 and/or the third encoder 3213 to define a second pitch axis $EA_3$ about which the fourth joint coupler 3316. The second pitch axis $EA_3$ is orthogonal to the yaw axis $EA_1$ and parallel to the first pitch axis $EA_2$. The second pitch axis $EA_3$ and first pitch axis $EA_1$ being parallel allows for more accurate determinations of the height and reach of the arm.

The third individual rigid frame link 3312 of each articulated arm 3300 is fixed to the fourth joint coupler 3316 at a proximal end and is fixed to the fifth joint coupler 3317 at a distal end. The third individual rigid frame link 3312 rotates with the fourth joint coupler 3316 about the second pitch axis $EA_3$. The yaw axis $EA_1$, the first pitch axis $EA_2$, and the second pitch axis $EA_3$ cooperate to define three degrees of freedom of each of the left and right articulated arms 3300. The fifth joint coupler 3317 is coupled to the third individual rigid frame link 3312 and the wrist assembly 3370.

iii. Wrist Assembly

Figure 15:
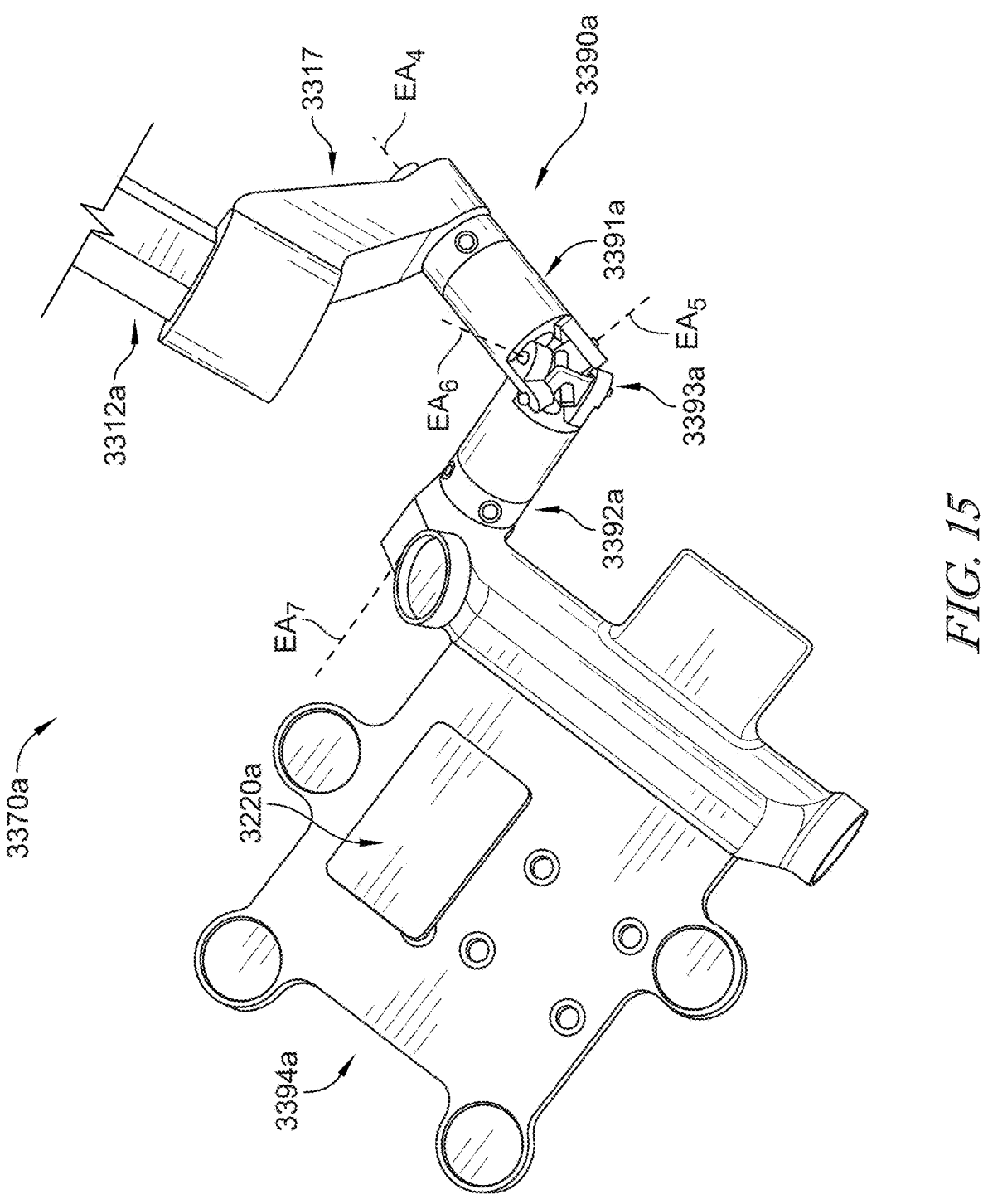
FIG. 15 is a detailed view of an extent of the wearable data collection apparatus of FIG. 8, showing a wrist component of the wearable data collection apparatus to determine the orientation of an operator's wrist.

Referring to FIG. 15, the wrist assembly 3370 includes a wrist component 3390 and a glove mount 3394, where the glove mount 3394 is further configured to couple with the glove 3400. Optionally, an IMU 3220 may be coupled to the glove mount 3394 and/or the glove 3400. The wrist assembly 3370 is coupled to the fifth joint coupler 3317 at the distal end of the third rigid frame link 3312, where joint coupler 3317 is configured to position the wrist component 3390 away from the third rigid frame link 3312 to reduce interference. In the illustrative embodiment, the wrist component 3390 comprises a first joint member 3391 and a second joint member 3392 interconnected by a joint coupling member 3393 and having rotational axes oriented at 900 to each other. This arrangement provides four degrees of freedom (DoF), enabling a wide range of complex movements for positioning the operator's hand in the glove 3400.

In particular, the proximal end of the first joint member 3391 is pivotably coupled to the fifth joint coupler 3317, establishing a pivotal connection that defines a fourth apparatus axis $EA_4$. The distal end of the first joint member 3391 connects to the second joint member 3392 via the joint coupling member 3393. Specifically, the distal end of the first joint member 3391 pivotably couples with the joint coupling member 3393, defining a fifth apparatus axis $EA_5$, and a proximal end of the second joint member 3392 couples with the joint coupling member 3393, defining a sixth apparatus axis $EA_6$, where axis $EA_6$ and axis $EA_5$ are perpendicular to each other. The distal end of the second joint member 3392 pivotably couples to the glove mount 3394, establishing a seventh apparatus axis $EA_7$. Accordingly, the wrist component 3390 provides four (4) degrees of freedom about axes $EA_4$-$EA_7$.

Although the apparatus axes $EA_1$-$EA_7$ may provide a range of motion similar to the robot 1, there is not a direct correlation between the apparatus axes $EA_1$-$EA_7$ and rotational axes $A_1$-$A_7$ of the robot 1. Instead, using the known geometry of the articulated arms and positioning sensors 3208, the collected pilot movement data may be converted to robot control data, based at least in part on the geometric relationship of the sensors 3208. In some examples, the fourth axis $EA_4$ may represent a roll axis analogous to the pronation and supination of the human forearm. The fifth axis $EA_5$ may represent a pitch axis (flexion-extension) of the wrist and the sixth axis $EA_6$ may represent a yaw axis (abduction-adduction) of the wrist. Finally, seventh axis $EA_7$ may represent a further roll axis for rotation of the hand about its longitudinal axis.

In the illustrative embodiment, the wrist component 3390 may include a Cardan joint or universal joint pivotably coupled between the fifth joint coupler 3317 and the glove mount 3394. The cardan joint may be formed from a combination of U-joints. In other embodiments, the wrist component 3390 may include a triple cardan joint that is formed by adding a third universal joint in series with a double U-joint to provide an additional rotational axis or translational movement. In another embodiment, the joint coupling member 3393 may be a spherical or ball-and-socket joint with a prismatic joint. The spherical joint allows for rotation in all directions around a single point where the joint members 3371, 3372 meet, while a prismatic joint allows for linear movement along an axis.

In some embodiments, the joint coupling member 3393 may be a gimbal mechanism with a prismatic joint. The gimbal mechanism may include three nested rings, each allowing rotation along a different axis, and may be combined with a prismatic joint to achieve 4 degrees of freedom. In other embodiments, the joint coupling member 3393 may be a Stewart platform (Hexapod) having limited actuation. Traditional Stewart platforms provide 6 degrees of freedom (3 translational+3 rotational) using actuators in parallel. However, the disclosed Steward platform may be designed or constrained to move in 4 degrees of freedom by limiting its actuation, providing both rotational and translational capabilities similar to a double U-joint but with more freedom. In another embodiment, the joint coupling member 3393 may be a spherical parallel mechanism with an additional prismatic joint.

In other embodiments, the joint coupling member 3393 may be a modified spherical joint with helical motion where rotation along one axis also generates linear movement. This adds a fourth degree of freedom to a spherical joint. In some embodiments, the joint coupling member 3393 may be a four-bar linkage with additional rotation, such as a rotary joint, to provide four degrees of freedom. In some embodiments, the joint coupling member 3393 may be a cylindrical joint with an additional rotational joint. The cylindrical joint may provide rotational movement around a single axis and a sliding motion along the same axis. In another embodiment, the joint coupling member 3393 may be a Watt's linkage with a rotational or prismatic joint. The Watt's linkage is a parallel mechanism used to constrain motion in a particular direction while allowing some flexibility. A rotational or prismatic joint is added to the Watt's linkage to provide 4 degrees of freedom, mimicking the function of a double U-joint but with added flexibility. In other embodiments, the joint coupling member 3393 may be a spherical parallel mechanism with an additional prismatic joint. The spherical parallel mechanism may include multiple parallel arms that control the movement of an end-effector. They may provide multi-axis rotational freedom (3 degrees of freedom), and the addition of a prismatic joint allows for 4 degrees of freedom.

iv. Glove

The robot data collection system 3010 may include a glove 3400 coupled to the glove mount 3394 of the articulated arms 3300 through mechanical interfaces designed for quick attachment and removal. The glove 3400 is configured to be worn on the hands of an operator (H) to capture the location data of the operator's hand, palm, and/or fingers with sufficient resolution for dexterous manipulation tasks. To achieve this, the glove 3400 may include a plurality of hand position sensors 3410 arranged to capture comprehensive hand kinematics. In some embodiments, the IMU 3220 may be coupled to the glove mount 3394 near the glove 3400, maintaining proximity to the hand for accurate measurements. In certain embodiments, the glove 3400 may include an IMU 3220, for example, located on the dorsal side of the hand at the connection of the glove 3400 to the glove mount 3394, providing six-axis motion sensing.

Figure 16:
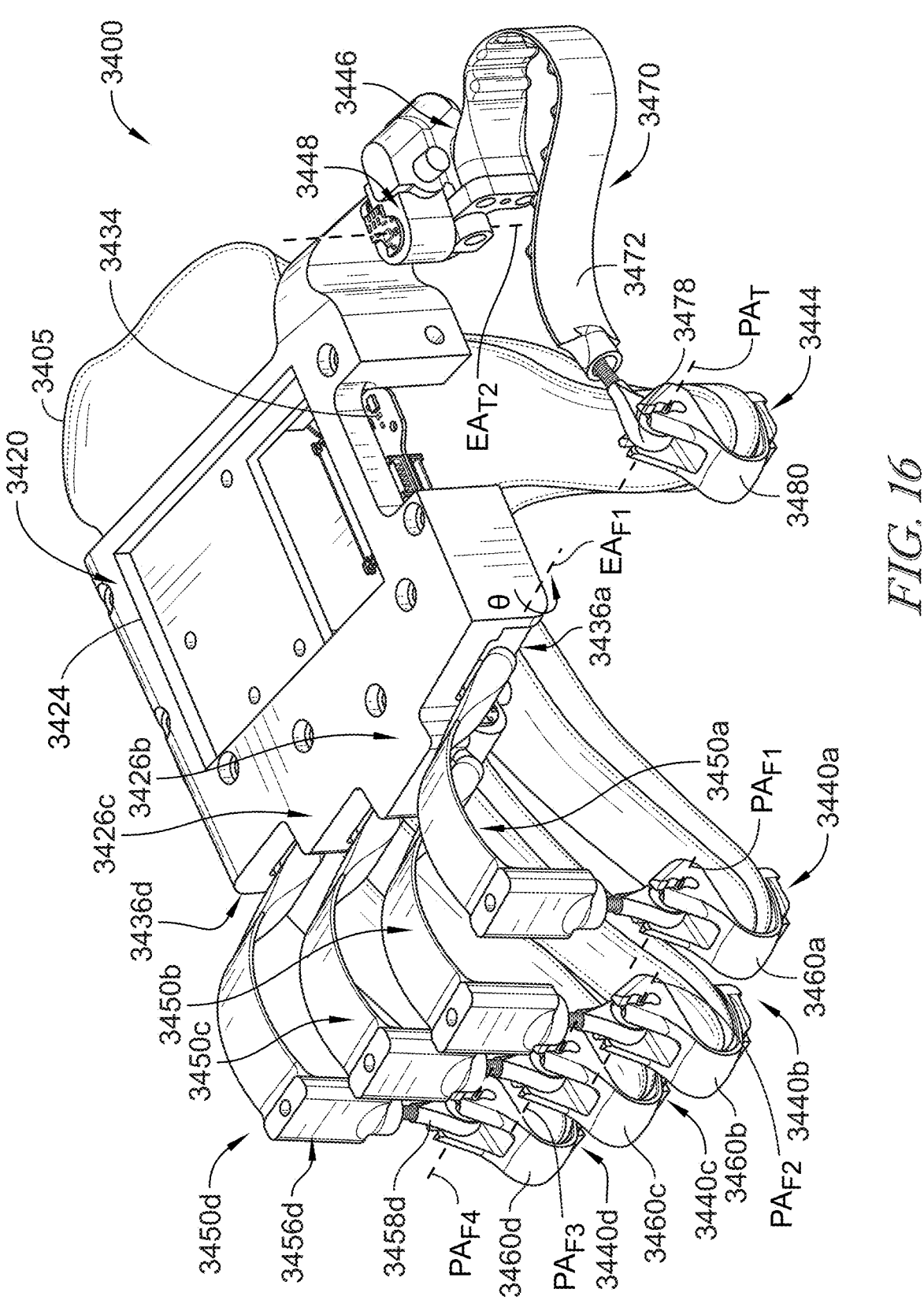
FIG. 16 is a perspective view of a first embodiment glove to be used with the wearable data collection apparatus of FIG. 7B, where the glove includes a haptic feedback controlled mechanism, an encoder, and a deformable member that extends between said haptic feedback mechanism and the encoder.
Figure 17:
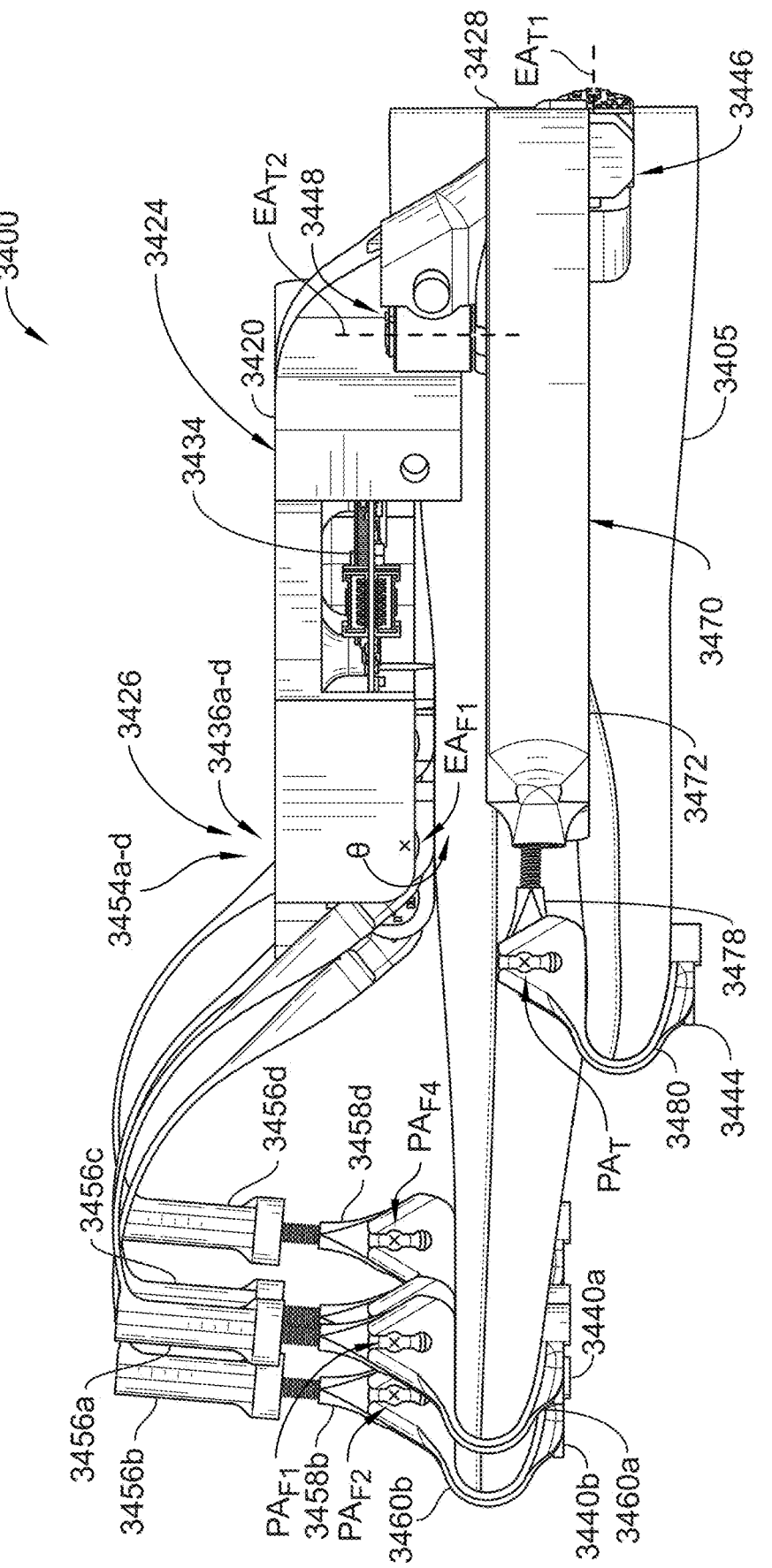
FIG. 17 is a side view of the glove of FIG. 16.
Figure 18:
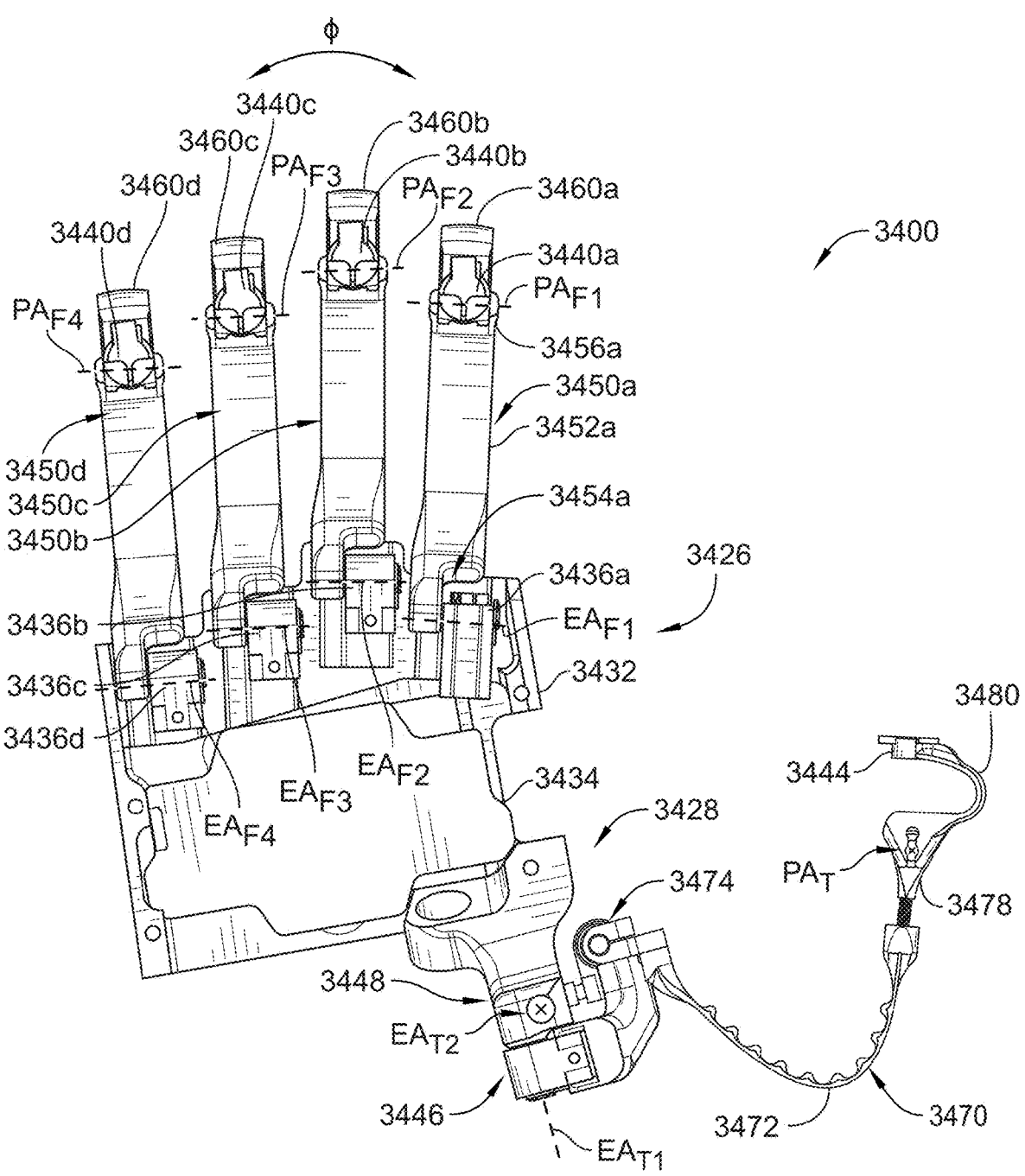
FIG. 18 is a top view of the haptic feedback controlled mechanism, the encoder, and the deformable member of FIG. 16, shown without the hand receptacle.

As best shown in FIGS. 16-18, the gloves 3400 of the wearable data collection apparatus 3200 utilize mechanical linkages to determine the location of the operator's hands and fingers. The glove 3400 includes a hand receptacle 3405 constructed from a flexible textile, such as breathable fabric, with a sensor assembly 3420 coupled to it through secure mounting interfaces. The sensor assembly includes a plurality of hand position sensors 3410 including encoders 3436a-d, 3446, 3448 and haptic buttons 3440a-d and 3444. In particular, the glove sensor assembly 3420 includes: (i) a housing 3424 configured to couple to the glove mount 3394, (ii) a multi-layer PCB 3434 for signal routing, (iii) finger encoders 3436a-d with of 12-14 bit resolution, (iv) thumb encoders 3446, 3448 providing two axis-tracking, (v) haptic buttons (e.g., a vibrating motor) 3440a-d and 3444 with force thresholds of 2-5 N, and (vi) deformable connectors 3450a-d and 3470 constructed from flexible polymer materials. In various embodiments, the glove 3400 may also include an IMU 3220 providing 6-DOF hand orientation data. Each of the finger encoders 3436a-d, thumb encoders 3446, 3448, haptic buttons 3440a-d, 3444 are communicatively coupled to the hand PCB 3434 contained in the housing 3432 through flexible circuit connections.

The glove sensor assembly 3420 is coupled to hand receptacle 3405, which may be made from a textile material and formed to fit a human hand with sizes from XS to XL, where the housing 3424 of the glove sensor assembly 3420 includes a mounting surface 3422 configured to couple with the glove mount 3394 using quick-release mechanisms. The housing 3424 is shaped and sized with a width that is substantially similar to the width of the hand at the metacarpophalangeal (MCP) joints of the hand, where the operator's fingers extend. A distal portion 3426 of the housing 3424 is configured with apertures from which the deformable connectors 3450a-3450d extend with minimal friction. A proximal portion 3428 of the housing 3424 includes a mounting structure 3430 for the first and second thumb encoders 3446, 3448 and the deformable connector 3470, positioned to align with natural thumb motion arcs.

As best shown in FIG. 18, the housing 3424 includes finger encoders 3436a-d positioned within a distal portion 3426 of the housing 3424 with center-to-center spacing of 18-22 mm. The finger encoders 3436a-d are (i) positioned to align with the finger portion of the hand receptacle 3405 maintaining anatomical correspondence, (ii) configured to couple with deformable connectors 3450a-3450d through precision bearings, and (iii) are substantially parallel in orientation with alignment tolerances under 2 degrees. In some embodiments, the finger encoders 3436a-d may be angularly offset by a slight angle (e.g., angle less than about 5 degrees) to ensure the operator's finger may move within the hand receptacle 3405 without interfering with the adjacent finger during full flexion.

The deformable connector 3450 includes a deformable member 3452 with a proximal end 3454 configured to pivotably couple to a finger encoder 3436 (e.g., move about encoder axes $EA_{F1}$-$EA_{F4}$) positioned within the housing 3424 and a distal portion 3456 configured to couple to the haptic button 3440, which is coupled to a tip of the finger portion on a palmar side of the glove. The deformable member maintains consistent force transmission while allowing 3D finger motion. In the illustrative embodiment, the distal end 3456 is coupled to an eyelet 3458 with an inner diameter of 3-5 mm and tip guard 3460 that couples with the tip of the finger of the glove 3405. By positioning an axis portion (e.g., pivot axes $PA_{F1}$-$PA_{F4}$) of the tip guard 3460 within the eyelet 3458, the movement of the operator's fingers are less restricted and may curl to grasp objects with grip apertures from 0-150 mm.

The distal portion 3456 may be more rigid with a stiffness 2-3 times greater than a deformable mid-section of the deformable member 3452. The shape of the distal portion 3456 may be configured to hold the eyelet 3458 in a substantially perpendicular orientation, extending upward with respect to the haptic button 3440 when the hand is placed with the palm on a flat support surface. This orientation holds the pivot axis ($PA_{F1}$-$PA_{F4}$) portion of the tip guard 3460 in a substantially parallel arrangement with respect to the encoder axis ($EA_{F1}$-$EA_{F4}$) of the finger encoder 3436 maintaining alignment within 5 degrees. This parallel arrangement reduces error in the measurements to a single-direction for rotation with angular errors under 1 degree.

To make the gloves 3400 more comfortable to wear and use, the deformable member 3452 is configured to: (i) bend or deform in a first inward or flexion/extension direction (θ) in order to allow the user to curl their fingers towards the palm after the finger encoders 3436a-d have reached their minimum curled position, and (ii) bend or deform in a second lateral direction (φ) in order to allow the user to abduct/deduct their fingers. However, a significantly greater lateral force (e.g., any value between 1× and 30×) must be applied on the deformable member 3452 to move said deformable member 3452 a predetermined distance (e.g., 1 mm) in the lateral direction in comparison to the curling force that is applied on the deformable member 3452 to move said deformable member 3452 the predetermined distance in the curling direction. In other words, the deformable member 3452 will move or deform along an arched or curved curling direction a greater amount in comparison to the amount said deformable member 3452 will move or deform in the lateral direction when the same amount of force is applied to the deformable member 3452 in both directions. As such, the deformable member 3452 will move or deform along an arched or curved curling direction with less force than the deformable member 3452 will move or deform along the lateral direction.

The deformable connector 3470 is coupled to the first and second thumb encoders 3446, 3448 coupled to the mounting structure 3430 at the proximal portion 3428 of the housing 3424. In the illustrative embodiment, the first and second thumb encoders 3446, 3448 are positioned with substantially perpendicular axes (90°±2°), shown in FIG. 17 as encoder axes ($EA_{T1}$, $EA_{T2}$), and generally correspond to the position of the first and second thumb actuators located in the hand 56 of the robot. Including two thumb encoders 3446, 3448 in the glove 3400 facilitates the kinematic mapping of the measured positions to control functions for the robot 1. The deformable member 3472 includes a proximal end 3474 that couples to the first thumb encoder 3446 and pivots therewith through ranges of ±45 degrees. The distal end 3476 of the deformable member 3472 includes a structure to couple an eyelet 3478 and a tip guard 3480 (e.g., having a pivot axis PAT) that are substantially similar to the eyelet 3458 and tip guard 3460 of the deformable connectors 3450 for the fingers. The deformable member 3472 may be configured with ribs protruding from at least one surface with rib heights of 1-2 mm, where the ribs help maintain the orientation of the deformable member 3472 with respect to the two thumb encoders 3446, 3448 as the thumb changes position through its range of motion.

This alternative glove 3400 provides substantial advantages over the glove 3400 described above because it is less expensive to manufacture with cost reductions of 40-60% and does not use a magnetic field to determine calculations eliminating electromagnetic interference issues, but instead utilizes only a single-direction encoder for each finger and two single-direction encoders for the thumb. The use of said single-direction encoder for each finger and thumb allows the data generated by the gloves to better align with the movements of the robot 1 with correspondence errors under 3% and minimizes the mathematical calculations needed to determine the location of a finger in space reducing computational load by 70%. By reducing the mathematical calculations, the glove 3400 can produce more consistent results. In other words, the operator can learn how to use the gloves and achieve proficiency in under 30 minutes and can obtain better control over the robot 1 with task success rates improving by 15-25%.

v. Sensors of the Wearable Apparatus

The wearable data collection apparatus 3200 can include a plurality of sensors 3208 and other circuitry 3209. The plurality of sensors 3208 include encoders 3211-3213 (e.g., actuator encoders), wrist inertial measurement units (IMUs) 3220 and a torso IMU 3224, and hand position sensors 3410. The wearable data collection apparatus 3200 may also include additional sensors (e.g., IMU, GPS, etc.) to capture other sensor data while the operator (H) is performing data collection tasks while wearing the apparatus 3200. The wearable data collection apparatus 3200 is designed to collect sensor data and communicate the position of one or more of the operator's wrists relative to their torso. The IMUs 3220, 3224 may include one or more accelerometers, gyroscopes, and one or more magnetometers.

The wearable apparatus 3200 may include a comprehensive array of sensors 3208 providing multi-modal data capture capabilities. In addition to the encoders 3211-3213 (e.g., optical encoders with resolutions of 12-16 bits or magnetic encoders with absolute position capabilities) located at the joints of the articulated arms 3300 and hand position sensors 3410 in the gloves 3400, the wearable apparatus 3200 may include accelerometers with ranges of ±2 g to ±16 g, gyroscopes with ranges of ±250 to ±2000 degrees/second, and inertial measurement units (IMUs) combining both sensor types with additional magnetometers.

The torso IMU 3224 may be located on base mount 3240 to measure the relative position of the operator's (H) torso and may provide or establish a distance from the ground or a support surface using barometric pressure sensors with altitude resolutions of 10-50 cm. For example, the torso IMU 3224 may be coupled separately or included in electronics and other circuitry 3209 coupled with the piloting control system 3202 on the base mount 3240, maintaining thermal isolation from heat-generating components. Additional IMUs 3220 may be positioned at a distal portion of the articulated arms 3300 (e.g., the glove mount 3394 and/or glove 3400) to measure the relative position of the operator's (H) wrist with 6-DOF tracking capabilities. Further, the torso IMU 3224 may be used to determine the orientation of the operator's torso with accuracies better than 1 degree and establish a reference point for the wrist IMUs 3220 through coordinate transformation matrices. In some cases, the sensor data collected from IMUs 3220 positioned at the wrist of the operator (H) from the apparatus 3200 for wrist pose estimation might rely on the change in position and orientation as determined from the IMUs 3220 and/or other sensors 3208 used for minimizing drift through zero-velocity updates and magnetic heading correction, which is then fused with the kinematic chain data derived from the encoders 3211-3213 at the joints 3311-3313 of the articulated arms 3300 using extended Kalman filtering or complementary filtering approaches.

Advantageously, these sensors 3208 are an integral part of the structure of the apparatus 3200 and are not placed manually by the human operator (H) or other operators each time the device is used, ensuring consistent sensor placement within 1-2 mm across sessions. This fixed placement methodology eliminates the variability that can arise due to the misplacement of sensors 3208 by the operator (H) and reduces substantial changes in relative sensor locations between different operators or different sessions, thereby aiding in the consistency and reliability of the collected data with repeatability better than 95%.

Moreover, in some embodiments, the sensors 3208 utilized in the wearable apparatus 3200 may employ the same or similar underlying sensor technology as the sensor technology used in the corresponding parts of the robot 1, maintaining measurement consistency across platforms. This could include, for example, using specific types of optical encoders (e.g., encoders 3211-3213) with identical line counts and interpolation factors or the exact same model of IMU chip such as the Bosch BMI088 or InvenSense ICM-42688 in both the apparatus 3200 and the robot 1. The use of such similar or identical sensor technology provides a technical advantage by reducing or eliminating the need to perform complex translation, manipulation, or alteration of the sensor data collected from the wearable apparatus 3200, reducing computational overhead by 50-70%. As a result, this data can be more directly and meaningfully used to control the robot 1 or to serve as high-quality training data with minimal preprocessing requirements. Additionally, using the same or similar sensor technology can help to mitigate problems that are commonly associated with comparing data from sensors 3208 that exhibit different drift characteristics (typically 0.1-1 degree/hour for gyroscopes), noise profiles (with noise densities of 0.01-0.1 degrees/second/√Hz), or sensitivities to various environmental factors such as temperature coefficients of 0.01-0.05%/° C. In particular, when subjecting two significantly different sensor technologies (e.g., an IMU vs. an optical encoder, or two IMU models from different manufacturers with different Allan variance characteristics) to the same environmental noise sources (e.g., electromagnetic interference (EMI) noise commonly found on a factory floor with field strengths of 1-10 V/m, or mechanical vibrations at frequencies of 10-1000 Hz), the resulting drift or noise patterns associated with these different sensor technologies might be sufficiently different that combining or comparing their data becomes a significant challenge, potentially rendering the collected human data less usable for direct robot control or for imitation learning without extensive calibration and compensation. Thus, the disclosed apparatus 3200, by using the same sensor technology and sometimes even the exact same sensor components as the robot 1 for corresponding measurements (like joint angles), aims to overcome some of these long-standing challenges in cross-platform data consistency.

In addition to these specifically mentioned sensors 3208, the wearable data collection apparatus 3200 may incorporate a variety of additional sensors 3208, or it may obtain data from other external sensors (such as those found in a VR system), to enhance the quality of data collection and to improve the accuracy of training or control with sensor fusion improving overall system accuracy by 20-40%. For clarity, These additional sensors 3208 may be grouped by category:

Motion and Position: This category includes accelerometers with measurement ranges from ±2 g to ±200 g and bandwidths up to 5 kHz, gyroscopes with drift rates better than 10 degrees/hour, and magnetometers with resolutions of 1-10 nT (which are often combined within IMU packages 3220, 3224), flex sensors for measuring bending with resistance changes of 10-100% over their range, GPS modules for absolute outdoor positioning with accuracies of 1-10 meters, 3D cameras or depth sensors for tracking limb position relative to the body or the environment with depth resolutions of 1-10 mm, optical encoders (such as 3211-3213) with resolutions up to 20 bits, tilt sensors with accuracies of 0.01-0.1 degrees, inclinometers with measurement ranges of ±180 degrees, absolute or relative position sensors with resolutions down to nanometers, velocity sensors measuring speeds from 0.01-100 m/s, displacement sensors with ranges from micrometers to meters, vibration sensors detecting frequencies from 0.1 Hz to 10 kHz, angular rate sensors, linear accelerometers, rotary encoders, potentiometers for measuring rotation angle with linearities better than 0.1%, vision-based tracking systems that use markers placed on the operator (H) or apparatus 3200 viewed by external cameras achieving sub-millimeter tracking accuracy, or Ultra-Wideband (UWB) tags for achieving precise relative positioning with accuracies of 10-30 cm.

Biometric: This category includes Electromyography (EMG) sensors for measuring muscle electrical activity with signal amplitudes of 50 μV to 30 mV, which can be used for control input or for fatigue monitoring, and eye-tracking sensors with gaze accuracies of 0.5-1 degree, which may be integrated into the apparatus 3200. Other biometric sensors such as Electroencephalography (EEG) for brain activity monitoring with 8-256 channels, Galvanic Skin Response (GSR) for stress levels detecting conductance changes of 0.01-100 μS, or heart rate monitors measuring 30-250 BPM could also be integrated into or interfaced with the system. Skin temperature sensors with accuracies of 0.1-0.5° C. may also be included to monitor the physiological state of the operator (H).

Environmental: This category includes acoustic sensors such as microphones with frequency responses from 20 Hz to 20 kHz, which can be used for voice commands or for ambient noise awareness, proximity sensors for detecting nearby objects at ranges of 1 mm to 10 m, temperature sensors with ranges from −40° C. to +125° C., barometric pressure sensors with resolutions of 0.1 Pa, humidity sensors measuring 0-100% RH, and ambient light sensors detecting 0.01-100,000 lux.

Force and Pressure: This category includes force-sensitive resistors (FSRs) with force ranges of 0.1-100N, pressure sensors for measuring applied pressure over an area from 1-1000 kPa, piezoelectric sensors that generate voltages of 1-1000V under stress, piezoresistive sensors that change resistance by 1-10% under stress, strain gauges for measuring deformation with gauge factors of 2-200, load cells for measuring force, torque sensors (which include types like strain gauge-based with accuracies of 0.1-1%, piezoresistive with response times under 1 ms, magnetoelastic with non-contact measurement, capacitive with resolutions of 0.01%, fiber-optic with immunity to EMI, and rotary transformers for continuous rotation), tactile sensor arrays that provide distributed pressure information similar to artificial skin with spatial resolutions of 1-5 mm, shear force sensors measuring tangential forces of 0.01-100N, bending moment sensors, compression sensors, tension sensors, and impact sensors detecting accelerations up to 10,000 g.

Other: A wide variety of other sensor types might be included based on specific application needs. These can include photodiodes for light detection with spectral responses from UV to IR, Hall effect sensors for magnetic field detection with sensitivities of 1-100 mV/mT, capacitive sensors for proximity or touch detection with sensing distances of 0-50 mm, inductive sensors for metal detection or positioning with ranges of 0.5-80 mm, ultrasonic sensors for distance measurement with ranges of 2 cm to 10 m, thermal sensors for non-contact temperature measurement from $-70°$ C. to $+380°$ C., radar sensors operating at 24-77 GHz, or LiDAR sensors with range resolutions of 1-5 cm, though the latter are less common on a wearable apparatus 3200 compared to their use on robots.

It should be understood that other similar sensors or sensor technologies, including emerging sensor types not listed here such as quantum sensors or neuromorphic sensors, may be utilized by the wearable data collection apparatus 3200. This includes sensor types or specific sensor technologies that might be disclosed in other sections of this application or are otherwise known in the art. Sensor fusion strategies that are specific to the wearable apparatus 3200, employing algorithms such as complementary filters with time constants of 0.5-5 seconds, Kalman filters (including variants like the EKF with 15-30 state variables or UKF with sigma point selections), or machine learning-based approaches using neural networks with $10^3$ to $10^6$ parameters, may be implemented within the piloting control system 3202 or the computer 3110. The goal of these strategies is to combine data from multiple sensors 3208 in an effective manner, aiming to achieve more accurate and robust estimates of the pose, motion, and intent of the operator (H) with position accuracies better than 5 mm and orientation accuracies better than 2 degrees.

In addition to the sensors already mentioned, the wearable data collection apparatus 3200 may incorporate additional sensors to enhance data collection and improve training accuracy. These may include:

Electromyography (EMG) Sensors (e.g., Delsys Trigno Wireless EMG System, Advancer Technologies MyoWare Muscle Sensor, Otto Bock MyoBock System)

Force-Sensitive Resistors (FSR) or Pressure Sensors (e.g., Interlink Electronics FSR 400 Series, Tekscan FlexiForce Sensors, Honeywell FSS-SMT Series Force Sensors)

Haptic Feedback Devices (e.g., Precision Microdrives Vibration Motors, Tactile Labs Haptics Actuators, Ultrahaptics (Ultraleap))

Flex Sensors (e.g., Spectra Symbol Flex Sensor, Adafruit Flex Sensor, Flexpoint Bend Sensors)

Acoustic Sensors (e.g., Knowles MEMS Microphones (e.g., SPH0645LM4H-B), Audio Analytic's ai3 Acoustic Sensor, MaxBotix MB1000 LV-MaxSonar-EZ1)

Eye-Tracking Sensors (e.g., Tobii Eye Trackers, Pupil Labs Eye Tracking Headsets, SR Research EyeLink Systems)

Proximity Sensors (e.g., Sharp GP2Y0A21YK0F Infrared Proximity Sensor, STMicroelectronics VL53L0X ToF Sensor, Pepperl+Fuchs Ultrasonic Proximity Sensors)

GPS Modules (e.g., u-blox NEO-M8N GPS Module, Adafruit Ultimate GPS Breakout v3, SparkFun GPS Dead Reckoning Breakout (NEO-M8U))

Temperature Sensors (e.g., Maxim Integrated DS18B20, Texas Instruments LM35, Sensirion STS3x Series)

3D Cameras or Depth Sensors (e.g., Intel RealSense Depth Cameras (D435, D455), Microsoft Azure Kinect DK, Structure Sensor by Occipital)

vi. Piloting Control System

The piloting control system 3202 is coupled to data storage 3204, a battery 3206, other circuitry 3209 including power management and signal conditioning, multiple sensors 3208 including encoders 3211-3213, hand sensors 3410 detecting finger positions, and IMUs 3220, 3224 of the wearable data collection apparatus 3200. The piloting control system 3202 includes a processor, a memory, and instructions stored in the memory configured to be executed on the processor, where the instructions include applications to facilitate the collection of sensor data using the wearable data collection apparatus 3200 at sampling rates of 100-10,000 Hz. Additionally, the piloting control system 3202 may be in data communication with the robot 1, as well as the computer 3110, the data storage database 2900, the clutch 3140, and/or the optional display 3150 via a network 2999A-X supporting bandwidths of 1-1000 Mbps.

The piloting control system 3202 may be attached directly to the main support portion 3242 in a mounting region that is designed to receive electronics with appropriate thermal dissipation capabilities. In some embodiments, both the battery 3206 and the piloting control system 3202 are carried by the base mount. In other embodiments, the piloting control system may be remotely located from the base mount, and the base mount may be coupled to a power source that is also remotely located from the mobile wearable data collection apparatus. Said electronics may include sensors operating at various sampling rates from 10 Hz to 10 kHz, communication interfaces supporting protocols such as USB 3.0, Ethernet, Wi-Fi 6, and Bluetooth 5.0, processors including ARM Cortex-A series or Intel Atom processors, data storage devices using solid-state drives or eMMC storage, or any other electronic component that is needed to facilitate obtaining and transmitting sensor data from the wearable data collection apparatus 3200 to the computer 3110, the data storage 3204, and/or the robot 1 with end-to-end latencies under 20 ms. In some embodiments, the battery 3206 or power source for the piloting control system 3202 may reside with the piloting control system 3202 in a housing or be coupled separately to the main support portion 3242 and electrically connected to the piloting control system 3202 through power cables rated for 5-50 W. In some embodiments, the main support portion 3242 is configured to support at least the battery 3206 and/or piloting control system 3202 with vibration isolation providing 20-40 dB attenuation at critical frequencies.

The piloting control system 3202 may also be configured to integrate various software applications or functionalities (e.g., running on embedded Linux or real-time operating systems). These applications may include a sensor tracking application operating at 500-1000 Hz update rates, which may incorporate a drift correction algorithm to enhance tracking accuracy to sub-degree levels. For example, the sensor tracking application is tasked with the real-time acquisition of data from the array of sensors 3208 that are distributed across the wearable apparatus 3200, managing data streams totaling 10-100 MB/s. The sensor tracking application communicates this collected sensor data to the computer 3110 for further processing through TCP/IP or UDP protocols, or it may process the data locally within the piloting control system 3202 using edge computing capabilities. The computer 3110 and/or the on-board processors that are located within the piloting control system 3202 then operate to refine the raw sensor data through filtering, calibration, and fusion algorithms. This refined sensor data can then be utilized, in connection with robot control data received from the robot 1, to dynamically adjust the data that is provided to generate the robot control data that is sent to the robot 1 with control loop frequencies of 100-1000 Hz.

Advanced algorithms, including various machine learning models such as recurrent neural networks with $10^4$ to $10^6$ parameters, can be employed to analyze the various data streams, such as the raw sensor data sampled at native rates, the refined sensor data after processing, and/or the received robot control data, in order to identify patterns with recognition accuracies above 95%, perform sensor fusion reducing uncertainty by 30-50%, correct for sensor drift maintaining errors below 1 degree/hour, and optimize control strategies improving task success rates by 20-40%. This comprehensive feedback loop, which incorporates data from the operator (H), the apparatus 3200, and the robot 1 with round-trip latencies under 50 ms, not only improves the performance of the apparatus 3200 in real-time but also contributes to the iterative development of more sophisticated control algorithms (or AI models) that can be tailored to operator-specific training regimens or particular task requirements through transfer learning and fine-tuning approaches. This overall system architecture facilitates an adaptive training or teleoperation environment where the wearable data collection apparatus 3200 can continuously adjust its behavior based on accumulated interaction data from the operator (H) and feedback from the robot 1, thereby maximizing both task efficacy achieving success rates above 90% and the immersion of the operator (H) with presence ratings above 4 on a 5-point scale.

b. Computing Environment

As shown in FIG. 6, the humanoid robot data collection system 3010 includes a wearable data collection apparatus 3200, a computer 3110, a data storage database 2900, 3204, a clutch 3140, and the robot 1, which are in data communication with each other via a network 2999A-X. The wearable data collection apparatus 3200 is configured to be worn by a human operator (H) to collect and send sensor data to be received and processed by computer 3110. The processed control data is sent from the computer 3110 to the robot 1 via the network 2999A-X. The wearable data collection apparatus 3200 can communicate with the computer 3110 via the network 2999A-X. In some embodiments, the wearable data collection apparatus 3200 can communicate directly with the robot 1 via the network 2999A-X. In this embodiment, the computer 3110 may be integrated into: (i) the wearable data collection apparatus 3200 and/or (ii) robot 1.

The robot 1 includes a whole body controller (WBC) 1550 that is configured to receive and process control data derived from the wearable data collection apparatus 3200. The WBC 1550 also generates torque targets and current signals for selected actuators (J1)-(J7) for movement of the actuators (J1)-(J7). The WBC 1550 further collects robot data from the movement of the actuators (J1)-(J7) and communicates the robot data to the data storage database 3204. The WBC 1550 of the robot 1 can communicate with the computer 3110 via the network 2999A-X to receive and process the control data the is derived from the sensor data that was obtained from the wearable data collection apparatus 3200. The WBC 1550 of the robot 1 can also communicate with the data storage database 3204 collected robot data for training a neural network model and/or running a data collection application to train a neural network.

i. Computer

The computer 3110 may comprise, for example, a server computer, a secondary computer, or any other system providing computing capability. Alternatively, the computer 3110 may comprise a plurality of computing devices that may be arranged, for example, in one or more server banks or computer banks or other arrangements. Such computing devices may be located in a single installation or may be distributed among many different geographical locations. The computer 3110 can include technology that trains a neural network model and/or run a data collection application to train a neural network.

The data collection system 3010 may also include a computer system 3110 that is designed to process the sensor data at rates of 100-1000 Hz in order to generate robot data that can be sent to the robot's whole body controller 1550 in order to allow for the wearable data collection apparatus 3200 to control the robot 1 or cause the robot 1 to mimic the movements of operator (H) with latencies under 50 ms. In addition to performing this data generation function with computational throughputs of 1-10 GFLOPS, the computer system 3110 may perform additional functionalities associated with data collection and storage, some of which may include using filtering algorithms such as Butterworth or Chebyshev filters with cutoff frequencies of 10-100 Hz, compression algorithms achieving compression ratios of 10:1 to 100:1, or other data manipulation methods or algorithms including outlier detection and removal.

The computer system 3110 may comprise various computing architectures to perform its intended functions with appropriate performance characteristics. Examples of such architectures include a server computer with multi-core processors, a secondary computer with GPU acceleration, or any other system that provides suitable computing capability of 10-100 TFLOPS for real-time processing. In some implementations, the computer system 3110 may comprise a distributed computing environment, which incorporates a plurality of interconnected computing devices communicating through high-speed networks. These computing devices may be arranged in various configurations, such as in server banks with blade servers, computer banks with rack-mounted systems, or other suitable distributed architectures supporting horizontal scaling. The computing devices may be co-located in a single physical installation with dedicated cooling and power infrastructure, or they may be distributed across multiple geographical locations connected through wide-area networks. This architecture might be implemented as an edge compute node with processors such as NVIDIA Jetson or Intel NUC that is situated geographically close to the robot 1 and the operator (H) in order to minimize network latency to under 5 ms. Alternatively, it could be integrated partially or wholly within the robot 1 itself using the robot's onboard computing resources or within the wearable apparatus 3200, depending on the chosen processing architecture and power constraints. Sometimes, the computer system 3110 may be deployed on the edge, for instance, as part of the processor and computing architecture of the robot 1 with shared memory architectures. In yet other embodiments, one or more of the operations and/or processes that are performed by the computer system 3110 may be performed by processors and/or an edge computing architecture of the robot 1, thereby improving processing efficiency by 30-50% and the use of computational resources across the disclosed technology as a whole through load balancing and task distribution.

ii. Clutch

Figure 12:
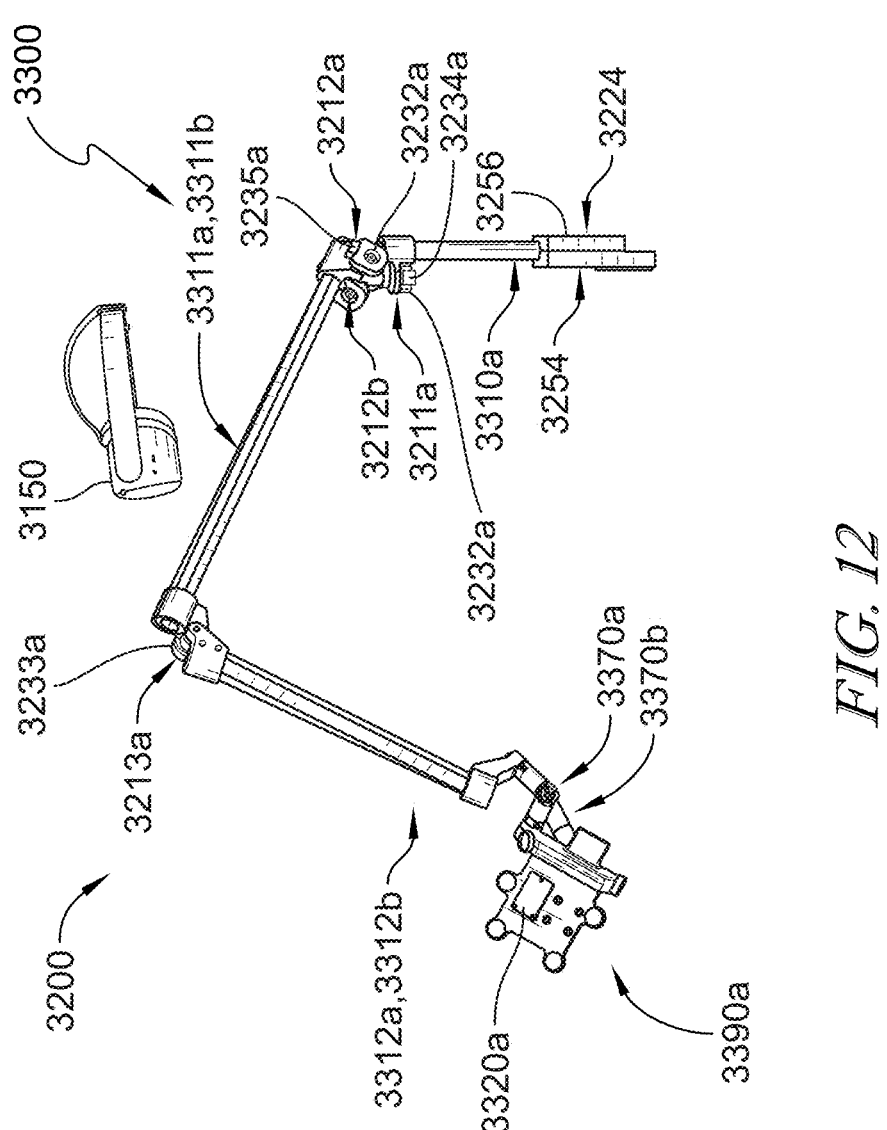
FIG. 12 is a side view of the wearable data collection apparatus of FIG. 8.
Figures 21, 22:
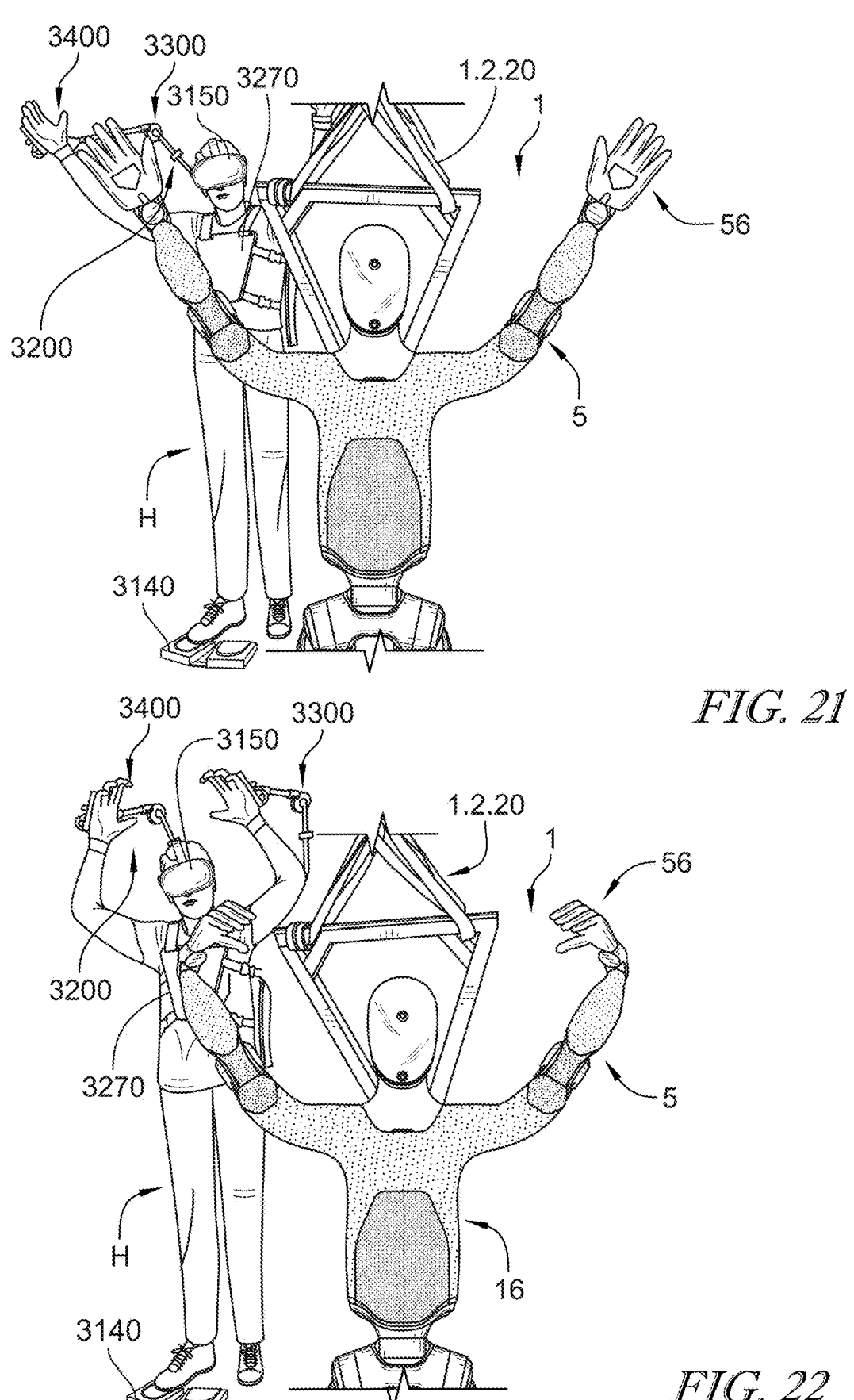
FIG. 21 is a front view of the robot data collection system showing the humanoid robot and a user wearing the wearable data collection apparatus, with both the user and robot shown in a first position.
FIG. 22 is a front view of the robot data collection system showing the humanoid robot and a user wearing the wearable data collection apparatus, with both the user and robot shown in a second position.

Referring to FIGS. 12, 21, and 22, the data collection system 3010 may include a clutch 3140 that is designed to allow the operator (H) to selectively pause the transmission of robot control data from the computer 3110 to the robot 1. This robot control data is derived from sensor data, which in turn was derived from the collected human data processed through the kinematic mapping algorithms. This feature may allow the operator (H) to reposition their hands or body to a more ergonomic or natural position without causing unintended movements of the robot 1, preventing potential collisions or task errors, before they resume operation of the wearable data collection apparatus 3200. By implementing this pause functionality with software and hardware interlocks, the system 3010 may prevent the unintended hand motions of the operator (H), which can occur during such repositioning over periods of 1-10 seconds, from being translated into corresponding movements of the hands 56 or other parts of the robot 1.

The operator (H) may activate the clutch 3140, for example, by using their hand to press a button with actuation forces of 2-10 N, to temporarily suspend the transmission of the robot control data that is related to certain degrees of freedom. In some configurations, the clutch 3140 may be configured to suspend transmission for all degrees of freedom simultaneously through a master enable/disable signal. In other configurations, it may be set to suspend transmission for only a predefined subset of degrees of freedom, such as only the arm movements (suspending joints J1-J7), while leaving the head tracking active to maintain the situational awareness of the operator through continuous visual feedback. Upon the release or deactivation of the clutch 3140, the wearable data collection apparatus 3200 and the computer 3110 may resume the process of generating and transmitting the robot control data with smooth trajectory blending. The resumption of this control data transmission may be immediate with latencies under 50 ms, or it may incorporate a brief ramping period of 0.5-2 seconds to ensure the smooth re-engagement of the motion of the robot 1 using velocity and acceleration limits.

The clutch 3140 may be implemented in various physical forms, such as a button with tactile feedback, a switch with definitive positions, a trigger mechanism with proportional control, or another type of operator-actuated device that is integrated directly into the wearable data collection apparatus 3200, for example, on a hand-held component with ergonomic placement or on the main body of the wearable data collection apparatus 3200 within easy reach. This integration may allow the operator (H) to selectively engage and disengage the clutch 3140 with one or both hands as needed during the performance of a task. For instance, a pressure-sensitive grip on a handheld controller with force thresholds of 5-20 N could be configured to function as the clutch 3140, disengaging control whenever the operator (H) relaxes their grip below the threshold.

In alternative embodiments, the clutch 3140 may be implemented as a separate, discrete device with wireless or wired connectivity. For example, as shown in FIGS. 21-22, the clutch 3140 could take the form of a foot pedal with adjustable resistance that is coupled to the computer 3110 and positioned on the floor for foot activation by the operator (H), or it could be made accessible to another supervising operator through a control panel. A supervising operator might utilize such a separate clutch 3140 to intervene in the operation for safety with emergency stop capabilities or for training purposes during skill transfer sessions. Alternative methods for clutch activation could involve the use of voice commands that are recognized by the system 3010 with recognition accuracies above 95%, gesture recognition that is performed using the sensors 3208 on the wearable apparatus 3200 with gesture libraries of 10-50 commands, or even a predictive clutch engagement system using machine learning models. For example, a specific spoken phrase like "Pause robot" processed through speech recognition could activate the clutch 3140, and the phrase "Resume robot" could deactivate it with voice activation latencies under 500 ms.

Predictive engagement of the clutch 3140 might function based on detecting movement patterns that are indicative of non-task-related actions through anomaly detection algorithms, for example, large, rapid repositioning movements of the operator (H) that fall outside the typical workspace (exceeding 1 meter) or velocity profile (exceeding 2 m/s) of the task being performed. A software-based clutch interface, which could be presented on the display 3150 or on an auxiliary screen with touch or gaze interaction, could also allow for activation through gaze control with dwell times of 0.5-2 seconds or through interaction with a tracked controller that is associated with the VR headset. The display 3150 could present a virtual button with visual feedback that the operator (H) selects either via gaze dwell time or by pointing at it with a controller tracked at 90-120 Hz.

The clutch 3140, whether it is implemented as a physical or a virtual device, may incorporate advanced haptic feedback technologies providing multi-modal sensory confirmation. This haptic feedback could provide the operator (H) with a tactile confirmation, such as a click with forces of 2-5 N, a vibration at frequencies of 100-300 Hz, or a change in resistance from 10 N to 30 N, that indicates the successful engagement and disengagement of the clutch 3140. Such feedback enhances the confidence of the operator (H) and improves the overall usability of the system 3010 with user satisfaction scores improving by 15-25%. Additionally, the system 3010 may implement an intelligent clutch behavior, which could be managed by a dedicated intelligent clutch module running at 100-500 Hz. This intelligent clutch module might use machine learning algorithms trained on datasets of $10^3$ to $10^5$ operator interactions to analyze the movements of the operator (H) and the current task context, thereby learning to predict and automatically engage the clutch 3140 during natural pauses lasting 2-10 seconds or transitions in the operator's workflow. This would further enhance the ergonomics and usability of the wearable data collection apparatus 3200, reducing operator fatigue by 20-30%. For example, if the system 3010 detects that the operator (H) is looking away from the primary task area for an extended period exceeding 3 seconds, the intelligent clutch module might infer that a pause is intended and automatically engage the clutch 3140 with predictive accuracies above 90%.

iii. Display

The robot data collection system 3010 may include a display 3150 that provides visual feedback to the operator (H) from the robot 1 and/or from the operator's viewpoint with refresh rates of 60-144 Hz and resolutions from Full HD to 8K. To provide this visual feedback with minimal latency, the display 3150 can be incorporated into one or more types of devices, including but not limited to: standard computer monitors that use technologies like liquid crystal display (LCD) with response times of 1-5 ms, organic light-emitting diode (OLED) with infinite contrast ratios, microLED with brightness exceeding 1000 nits, or quantum dot displays with color gamuts covering 100% of DCI-P3; virtual reality (VR) or augmented reality (AR) headsets (e.g., Sony PlayStation VR with 120 Hz refresh rate, the HTC Vive with 2K per eye resolution, the Apple Vision Pro with micro-OLED displays, and the Meta Quest series with inside-out tracking), which may function as the headset device; and other head-mounted display (HMD) configurations, including those where a mobile device is positioned within a headset frame (e.g., Google Cardboard-style viewers supporting phones with 5-7 inch displays, Merge VR Goggles with adjustable lenses, Carl Zeiss VR One Plus with 100-degree field of view, Xiaomi Play2 with focus adjustment, and similar models, as well as projected displays with lumens ratings of 3000-10000). A headset device may include a head position sensor, such as an internal IMU, configured to determine a position of a head of the operator and provide head positional data to the piloting control system.

Additionally, the display 3150 may be alternatively implemented using technologies such as transparent displays with 50-80% transparency, holographic projectors creating 3D images without glasses, electronic ink (e-ink) panels with power consumption under 10 mW, laser projection systems with 4K resolution, multi-panel display arrays creating wrap-around views, curved monitors with 1000R-1800R curvature, flexible displays that can be rolled or folded, retinal projection systems directly imaging onto the retina, and/or any other known display or display system technology that is suitable for presenting the visual feed of the robot 1. Projection mapping systems with 10,000+ lumens could serve as an alternative for the display 3150, projecting the view of the robot 1 or related information onto surfaces within the environment of the operator (H), an approach which offers a different form of immersion or situational awareness when compared to head-mounted displays.

In some embodiments, the display 3150 may further include advanced optical components with specific optical characteristics. Examples of such components include Fresnel lenses with focal lengths of 40-50 mm, pancake lenses reducing thickness by 50%, waveguide optics with efficiency above 85%, or diffractive optical elements with sub-wavelength features, which can be used, particularly in HMDs, to enhance visual clarity to 20/20 vision equivalent, widen the field of view to 110-200 degrees, and minimize optical distortion to less than 2% across the field in augmented and virtual reality environments. Additional implementations may integrate adaptive optics that are capable of adjusting their focal lengths in real-time from 0.5 to 3 meters, in order to accommodate the specific vision conditions of the operator (H) or to simulate focus changes that correspond to the sensor focus of the robot 1. Tunable polarization filters with extinction ratios of 1000:1 might also be included to improve contrast and reduce glare under the varying environmental lighting conditions from 10 to 100,000 lux that are reported by the robot 1. Furthermore, high-refresh-rate displays, such as those operating at 120 Hz, 144 Hz, 240 Hz or higher, may be utilized in conjunction with motion prediction algorithms predicting 16-33 ms ahead to further reduce the perceived latency to under 20 ms and improve the real-time responsiveness of the visual feedback. Variable Refresh Rate (VRR) technologies supporting ranges of 48-144 Hz, adapted for VR use cases, could also help to smooth the visual performance by allowing the display 3150 refresh rate to synchronize with the rendering rate of the graphics pipeline, although fixed high refresh rates combined with latency compensation techniques like Asynchronous Timewarp (ATW) reducing latency by 20-40 ms and ASW maintaining smooth motion at 45 fps input are common strategies in VR. VRR can reduce screen tearing and stutter by 90%. These collective enhancements all contribute to creating a more immersive and accurate visual representation of the operational environment of the humanoid robot 1 for the operator (H) with presence scores above 4.5 on a 5-point scale. The overall goal is to achieve a seamless and realistic operator experience with motion-to-photon latencies under 20 ms.

In order to transform visual data that is received from the robot 1, which may be captured in a vertical stereo vision format using vertically separated cameras with baselines of 50-200 mm, into a horizontally oriented stereo image that is suitable for human viewing (e.g., a VR headset with horizontal IPD of 58-72 mm), specialized software methods may be implemented achieving transformation latencies under 10 ms. These methods may include geometric rectification using homography transformations with 3×3 matrices, disparity re-projection techniques maintaining depth accuracy within 1%, convolutional neural networks (CNNs) with $10^6$ to $10^8$ parameters specifically trained for stereo image conversion tasks, and adaptive warping techniques with per-pixel displacement maps. Algorithms such as those that are based on epipolar geometry transformation can be applied to remap the vertically aligned depth or image data into a horizontal stereo pair while attempting to maintain accurate depth perception for the viewer with depth estimation errors under 5%. This category of methods broadly covers various view synthesis and image rectification techniques, such as Depth Image Based Rendering (DIBR) with depth map resolutions of 1080p, Neural Radiance Fields (NeRF) with $10^5$ to $10^6$ sample rays, 3D Gaussian Splatting (3DGS) with $10^4$ to $10^6$ Gaussians, Multi-Plane Images (MPI) with 32-128 depth planes, or direct learned transformations that are executed on the appropriate processing hardware capable of 1-10 TFLOPS, which could be located on the robot 1, on an edge computer 3110, or distributed between them with task allocation based on available compute.

Alternative transformation methods may involve the use of light field rendering techniques with 5×5 to 15×15 view arrays, where the system captures or synthesizes a richer representation of the light rays in the scene. This allows for view generation from different perspectives with angular resolution of 0.5-2 degrees, which can offer more comfortable viewing experiences or enable features like variable focus from 30 cm to infinity. The choice between these different transformation methods may involve trade-offs concerning computational cost (GFLOPS required), the quality of the output image (PSNR above 30 dB), the amount of introduced latency (target under 10 ms), and the robustness of the method to different scene types or camera configurations. Additionally, interpolation methods that use optical flow estimation with sub-pixel accuracy can further enhance the alignment between the transformed left and right eye images in order to reduce visual distortion to under 1% and provide a more natural viewing experience for the operator (H). Optical flow information can also be utilized in techniques like Asynchronous Spacewarp (ASW) or similar frame interpolation methods generating intermediate frames at 90-120 Hz. These methods can be used to synthesize intermediate frames when the system cannot consistently maintain the target frame rate of the display 3150, thereby improving the perceived smoothness of the motion by maintaining apparent frame rates above 90 fps.

The display 3150 and/or the humanoid robot data collection system 3010 may also include capabilities for integrating additional sensor modalities to provide an enriched interaction experience for the operator (H) with multi-modal feedback improving task performance by 15-30%. Multi-modal interaction serves to enhance the level of control precision and situational awareness. These modalities may include eye-tracking sensors with accuracies of 0.5-1 degree and sampling rates of 120-250 Hz, gesture recognition systems which may use cameras or other sensors detecting 20-50 distinct gestures, capacitive or resistive touch interfaces with response times under 10 ms which may be on associated controllers or on the display 3150 itself, voice control systems with vocabulary sizes of 1000-10000 words, or biometric sensors like heart rate monitors (30-250 BPM) or galvanic skin response sensors (0.01-100 μS) providing physiological feedback. These additional sensors provide alternative input channels for the operator with recognition accuracies above 95%.

Eye-tracking technology that is integrated into a VR headset is particularly relevant in this context with calibration times under 30 seconds. Eye-tracking has several applications in VR enhancing both performance and user experience. It enables gaze-contingent rendering, which involves rendering higher detail only in the area where the operator (H) is currently looking (typically 20-30 degrees), and it also enables foveated encoding, which involves compressing the video stream more aggressively in the peripheral vision areas with compression ratios of 10:1. These techniques serve to optimize both rendering performance and bandwidth usage by 40-60%. Both of these techniques can significantly reduce the computational load and the network bandwidth requirements from for rendering and transmitting the high-resolution video stream from the robot 1. The resulting efficiency gains are substantial, enabling higher resolution displays or reduced hardware requirements.

Furthermore, other sensor modalities, beyond those related to the interaction of the operator (H), may be incorporated to enhance the ability of the display 3150 to interpret and present the perception of the robot 1 of its surroundings with enhanced environmental awareness. These may include depth-sensing cameras that provide depth maps with 1-10 mm accuracy at 30-60 fps, infrared sensors for enhanced vision in low-light conditions down to 0.001 lux, electromagnetic motion tracking systems for providing precise positional awareness of tracked objects or controllers with sub-millimeter accuracy, environmental microphones that are integrated into the display 3150 device for spatial audio processing with 360-degree sound localization, thermal imaging sensors for detecting heat signatures, and/or any other sensors that are disclosed elsewhere herein as being part of the robot 1 or the system 3010.

Integrating spatial audio rendering with 7.1 or Atmos support, which is synchronized accurately with the visual feed presented on the display 3150 with audio-visual sync within 40 ms, can further enhance the immersion and situational awareness of the operator (H) for teleoperation tasks improving task completion rates by 10-20%. Haptic feedback mechanisms that are integrated into the display 3150 device or its associated controllers, such as vibrating motors operating at 20-1000 Hz or force feedback elements providing up to 40N, could provide tactile cues that correspond to events in the environment of the robot 1 or provide feedback related to the actions of robot 1, thereby complementing the visual and audio information with response times under 20 ms.

Separate and apart from the calibration procedures for the wearable data collection apparatus 3200, the display 3150 itself may also utilize its own calibration procedures requiring 2-5 minutes. These procedures, which may employ image processing techniques and corrective transformation matrices updated at 60-120 Hz, may be implemented to ensure color accuracy within $\Delta E < 2$, geometric fidelity with distortion under 1%, and depth perception consistency within 5% in the visuals that are presented to the operator. These display calibrations may include machine learning-based error correction algorithms with neural networks of $10^4$ to $10^6$ parameters that dynamically adjust for image distortions based on real-time feedback or the known hardware characteristics of the display 3150. This can help to compensate for issues like lens aberrations in HMDs (typically 1-5% distortion), motion blur effects with 1-10 ms persistence, and to adapt to the different environmental lighting conditions from 10 to 100,000 lux that are being experienced by the robot 1. The calibration processes might utilize standardized reference targets, such as color checker patterns with 24 color patches that are viewed by the cameras of the robot 1, structured light scans of known geometries with patterns projected at 30-120 Hz, or pre-computed depth maps with resolutions matching the display, in order to derive calibration equations or lookup tables that are able to mitigate distortion and ensure visual consistency across varying operational conditions with calibration accuracies better than 1%. Operator-specific calibration profiles for the operator (H) could also be stored and applied, which would account for individual operator preferences or visual characteristics, such as their interpupillary distance (IPD) ranging from 52-78 mm. This Personalization improves both comfort reducing eye strain by 30-50% and accuracy for the operator improving depth perception accuracy by 10-20%.

Ensuring an accurate calibration between the cameras of the robot 1, including their intrinsic parameters like focal length (typically 3-50 mm) and distortion coefficients (k1, k2, p1, p2, k3), and their extrinsic parameters like their relative position (accurate to 1 mm) and orientation (accurate to 0.1 degrees), especially the vertical baseline separation if applicable (typically 50-200 mm), and then correctly mapping the resulting stereo view to the measured IPD of the operator (H) in the VR headset is an essential process. This accurate mapping helps to provide a comfortable and accurate stereoscopic viewing experience with vergence-accommodation conflicts minimized, preventing eye strain for the operator (H) during sessions lasting 2-8 hours and avoiding misperceptions of depth or scale in the presented view with depth accuracy maintained within 5%. Furthermore, advanced computational imaging techniques, such as multi-view stereo reconstruction using 2-8 camera views, photometric calibration to ensure consistent brightness and color response across 0.1-100,000 lux, and adaptive exposure correction algorithms with dynamic ranges of 120 dB, may be employed on the image data before it is displayed, in order to enhance the accuracy and reliability of the visual data being presented. Real-time optimization algorithms running at 60-120 Hz may also be implemented to compensate for minor discrepancies in the stereo vision alignment that might occur during operation, which ensures that the depth information remains reasonably accurate within 2-3% error and dynamically responsive to any environmental changes. Techniques for online camera calibration updating every 10-60 seconds or adaptive rectification with sub-pixel accuracy could also be employed for this purpose. These techniques could be configured to run periodically or continuously to maintain the alignment accuracy within 1-2 pixels, even if minor mechanical shifts occur in the camera rig of robot 1 over time due to factors such as vibration at 10-100 Hz or temperature changes of ±20° C.

Operationally, the display 3150 can be physically configured in multiple ways to accommodate different use cases and operator preferences. It might be designed to be worn by the operator (H) with head strap tensions of 10-30N, as is the case with an HMD weighing 300-800 grams, it might be mounted directly on the wearable data collection apparatus 3200 at eye level, or it could be positioned in a stationary manner, like a desktop monitor at viewing distances of 50-100 cm, in front of the operator (H) during the operation of the apparatus 3200. Additionally and/or alternatively, the display 3150 system or the broader humanoid robot data collection system 3010 may include the capability to process image data through real-time rendering engines achieving 60-120 fps and sensor fusion algorithms with latencies under 5 ms. These algorithms are designed to integrate inputs from various sensors, including inertial measurement units (IMUs) that are located within the display 3150 device itself with update rates of 500-1000 Hz, LiDAR sensors on the robot 1 with 300,000-2,000,000 points per second, infrared depth cameras on the robot 1 operating at 30-90 fps, electromagnetic motion tracking systems with update rates of 240-360 Hz, environmental microphones for spatial audio processing with 48-192 kHz sampling, and other vision-based tracking systems, such as SLAM running on the headset cameras achieving 6-DOF tracking. Specifically for a VR headset implementation of the display 3150, the rendering engine may use inputs from the headset's own IMU updating at 1000 Hz and its tracking system, which could be, for example, inside-out tracking using the headset's cameras with 4-6 cameras or outside-in tracking using external sensors with sub-millimeter precision.

Additionally or alternatively, the display 3150 may include capabilities to provide augmented reality (AR) overlays with registration accuracies of 1-5 mm. These overlays would utilize environmental mapping techniques, such as simultaneous localization and mapping (SLAM) algorithms processing 30-60 fps, which could run either on the robot 1 or on the AR display device itself with dedicated processors. This would enable the dynamic alignment of virtual information or graphics with the view of the operator (H) of their physical surroundings with update rates of 60-90 Hz, as seen either directly or through the cameras of the robot 1. Further, machine learning-based predictive tracking algorithms with prediction horizons of 20-100 ms may be implemented to anticipate the head movements of the operator (H) more accurately and preemptively begin rendering the corresponding visuals, which further contributes to the reduction of perceived latency by 30-50%.

Moreover, the display 3150 system may also include features like diagnostic modes showing system metrics updated at 10-30 Hz, which could show raw sensor data or system status, playback functionalities for reviewing recorded sessions at variable speeds from 0.25× to 4×, or immersive simulation modes for training or testing with physics simulations at 1000 Hz. In these modes, latency minimization may be achieved through techniques such as variable refresh rate (VRR) supporting 48-240 Hz and adaptive sync technologies with response times under 1 ms, which help to ensure that the effective frame update interval remains consistent even under rapid motion conditions exceeding 180 degrees/second, although techniques like ATW/ASW are generally considered for maintaining smooth visual perception during frame rate fluctuations in VR environments. Ensuring low latency under 20 ms and smooth visuals above 90 fps is a constant focus of the system design achieving user comfort ratings above 4/5. For instance, an alternative diagnostic mode may overlay the predicted trajectories or planned paths of the robot 1 onto the view of the operator (H) with trajectory updates at 30 Hz, which would allow for an intuitive assessment of the intentions of the robot 1. The Playback functionalities may also incorporate the synchronized playback of multiple sensor data streams alongside the visual feed with synchronization accuracy within 1 ms, a feature which facilitates a detailed post-session analysis of the performance of both the robot 1 and the inputs of the operator (H) with analysis tools supporting frame-by-frame review.

iv. Data Storage

The data storage database 3204 collects and stores robot data generated by the actuators (J1-J7). The robot data collected and stored by the data storage database 3204 can be filtered, labeled, refined, and/or modified to generate training data that can be used for training of networks that will run on one or more robots 1. The data storage database 3204 may be a server, a hard drive, a computer, or other device or devices suitable to collect and store data. Similar to the discussion regarding the location of the computer 3110, the data store 3204 may be local to the robot 1 with direct bus connections, the wearable data collection apparatus 3200 (e.g., integrated with piloting control system 3202), or the computer 3110 with high-speed interfaces. In other examples, the data store 3204 may not be local and instead may be remote relative to one or more of the robot 1, the wearable data collection apparatus 3200, or the computer 3110, connected through network links.

c. Operation of the Robot Data Collection System

A method for operating the robot data collection system 3010 to train robot 1 and neural networks running on one or more robots begins by linking the wearable data collection apparatus 3200 to the computer 3110 via the network 2999A-X. The operator (H) then dons the wearable data collection apparatus 3200, as illustrated in FIGS. 21-22. While worn by the operator, the apparatus collects sensor data from the plurality of sensors 3208 at frequencies ranging from 50 Hz to 200 kHz. This sensor data is transmitted to the computer 3110 over the network 2999A-X. Upon receiving the data, the computer 3110 processes it to extract pilot movement data relevant to the training of robot 1. The computer 3110 uses the sensor data to determine the six degrees of freedom (DOF) pose of each wrist of operator (H) relative to the operator's torso. Notably, the computer calculates the difference, or delta, between the last known location of each wrist and their current positions, rather than determining the absolute positions. However, in alternative embodiments, the system may be designed to compute the absolute six DOF pose of the operator's wrists. In various embodiments, the pilot movement data may be extracted, processed, and/or calculated on the processor of the piloting control system 3202 and transmitted to the robot 1.

Specifically, the delta location for the left wrist is determined using data from encoders 3211a-3213a, wrist IMU 3220a, and torso IMU 3224. Similarly, the delta for the right wrist is determined from encoders 3211*b*-3213*b*, wrist IMU 3220*b*, and torso IMU 3224. The IMUs 3220*a*, 3220*b*, and 3224 are primarily used to determine the orientation of the operator's wrists, not their positions. In cases where each IMU includes only a 3-axis gyroscope and a 3-axis accel-erometer, the computer implements a Mahony algorithm to combine these sensors into an orientation signal. The gyro-scope signal is integrated to obtain wrist orientation, while the accelerometer provides a measurement of the gravity vector. The Mahony algorithm effectively removes any bias due to gyroscope signal integration along the pitch and roll axes. When the IMUs also include a magnetometer, an absolute heading signal is provided, and the computer uses a Madgwick algorithm to determine an absolute orientation. The data from encoders 3211-3213 is then fused with the absolute orientation and heading signals to correct drift in the IMU data, as the encoders are less susceptible to magnetic interference and exhibit less drift.

To correct drift from the IMUs or to provide a more accurate six DOF delta pose, the computer 3110 may employ various methods, including algorithms (e.g., filtering), sen-sor fusion, calibration, or any combination thereof. Algo-rithms that may be used include the Kalman Filter, Extended Kalman Filter, Unscented Kalman Filter, Error-State Kal-man Filter, Particle Filter, complementary filter, or combi-nations thereof to process the sensor data. Additionally, advanced drift correction models may be utilized, such as zero-velocity updates (ZUPT), zero-angular rate updates (ZARU), machine learning-based drift correction, dead reckoning, factor graph optimization, information filtering, recursive least squares, Bayesian estimation techniques, simultaneous localization and mapping algorithms (e.g., F. Nobre, M. Kasper and C. Heckman, "Drift-correcting self-calibration for visual-inertial SLAM," 2017 *IEEE Interna-tional Conference on Robotics and Automation (ICRA)*, Singapore, 2017, pp. 6525-6532, doi: 10.1109/ ICRA.2017.7989771), and constraints that limit the IMU's estimated movements to feasible ones.

In further embodiments, the system may obtain a mag-netic field map of the training environment. This map can help users avoid areas with high magnetic interference, adjust the environment to minimize disturbances, or allow advanced models on the computer 3110 to correct drift based on the magnetic field map. For instance, if a high magnetic field is detected, the model may apply a specific set of weights to compensate, while a different set may be used in low magnetic field areas. Additionally or alternatively, the IMUs may be enclosed within shielding materials to reduce exposure to external magnetic fields, mitigating drift in measurements.

The magnetometers within each IMU may also be manu-ally recalibrated or recalibrated over the network 2999A-X. Calibration can occur upon startup, at predefined intervals (e.g., every 30 minutes, 10 minutes, 1 minute, 30 seconds, 15 seconds, every second, or fractions of a second), or continuously through automatic processes. Calibration tech-niques may include:

Static calibration: Using stationary measurements to determine sensor biases; Rate table calibration: Rotat-ing the sensor at known rates to calibrate gyroscopes.
Allan variance analysis: Characterizing and modeling sensor noise.
Dynamic calibration: Adjusting outputs based on com-parisons with ground truth data from motion capture or optical tracking systems.
Multi-position calibration: Collecting data at various ori-entations to improve accuracy.

In-field calibration methods: Allowing calibration during normal operation without special equipment.
Machine learning-based calibration: Using algorithms to adaptively correct sensor errors.
Temperature compensation calibration: Adjusting for per-formance changes due to temperature variations.
Cross-calibration with redundant sensors: Using multiple sensors to correct each other.
Other known calibration types: Such as network-based or user-assisted procedures.

Based on processing data from the sensors 3208, the computer 3110 generates control data at frequencies between 10 Hz and 10 kHz. This control data is sent to robot 1 via the network 2999A-X. The Whole-Body Controller (WBC) 1550 in robot 1 receives and processes this data. After processing the control data, the WBC 1550 generates torque targets and current signals for actuators (J1)-(J7) at frequencies ranging from 50 Hz to 200 kHz. The torque targets and current signals are then sent to the one or more actuators (J1)-(J7) of the robot to cause the one or more actuators (J1)-(J7) to move in accordance with the torque targets and current signals. In response to the movement of the one or more actuators (J1)-(J7), robot data is collected. For example, the robot data may include forces and signals sent to the actuators (torques, current, video, other sensor data, etc.).

As the actuators move, robot data is collected, including forces, torques, currents, position data, velocity data, accel-eration data, video feeds from onboard cameras, and other sensor data. This data is sent to the data storage database 2900 for storage. The robot data can then be filtered, annotated, analyzed, and modified to generate training data, which is used to train models like Machine Learning or Bipedal Action Models (MLLM or BAM). These models may run on one or more robots, in the cloud, or both.

i. Software Applications of the Wearable Data Collection Apparatus

The piloting control system 3202 may also be configured to integrate various software applications or functionalities running on embedded Linux or real-time operating systems. These applications may include, for example, a sensor tracking application operating at 500-1000 Hz update rates, which may incorporate a drift correction algorithm to enhance tracking accuracy to sub-degree levels.

For example, the sensor tracking application is tasked with the real-time acquisition of data from the array of sensors 3208 that are distributed across the wearable appa-ratus 3200, managing data streams totaling 10-100 MB/s. The sensor tracking application communicates this collected sensor data to the computer 3110 for further processing through TCP/IP or UDP protocols, or it may process the data locally within the piloting control system 3202 using edge computing capabilities. The computer 3110 and/or the on-board processors that are located within the piloting control system 3202 then operate to refine the raw sensor data through filtering, calibration, and fusion algorithms. This refined sensor data can then be utilized, in connection with robot control data received from the robot 1, to dynamically adjust the data that is provided to generate the robot control data that is sent to the robot 1 with control loop frequencies of 100-1000 Hz.

Advanced algorithms, including various machine learning models such as recurrent neural networks with $10^4$ to $10^6$ parameters, can be employed to analyze the various data streams, such as the raw sensor data sampled at native rates, the refined sensor data after processing, and/or the received robot control data, in order to identify patterns with recognition accuracies above 95%, perform sensor fusion reducing uncertainty by 30-50%, correct for sensor drift maintaining errors below 1 degree/hour, and optimize control strategies improving task success rates by 20-40%. This comprehensive feedback loop, which incorporates data from the operator (H), the apparatus 3200, and the robot 1 with round-trip latencies under 50 ms, not only improves the performance of the apparatus 3200 in real-time but also contributes to the iterative development of more sophisticated control algorithms (or AI models) that can be tailored to operator-specific training regimens or particular task requirements through transfer learning and fine-tuning approaches. This overall system architecture facilitates an adaptive training or teleoperation environment where the wearable data collection apparatus 3200 can continuously adjust its behavior based on accumulated interaction data from the operator (H) and feedback from the robot 1, thereby maximizing both task efficacy achieving success rates above 90% and the immersion of the operator (H) with presence ratings above 4 on a 5-point scale.

In cases where each IMU (e.g., IMU 3224) includes only a 3-axis gyroscope for measuring angular velocity with noise densities of 0.01-0.1 degrees/second/$\sqrt{Hz}$ and a 3-axis accelerometer for measuring linear acceleration with noise densities of 100-500 µg/$\sqrt{Hz}$, including gravity, the computer 3110 or the piloting control system 3202 may implement an algorithm such as the Mahony filter with proportional gains of 0.5-2.0, the Madgwick filter with convergence rates of 0.01-0.5, or a complementary filter with time constants of 0.5-5 seconds, or similar sensor fusion techniques achieving orientation accuracies of 1-3 degrees RMS. The purpose of these techniques is to combine the readings from these sensors 3208 into a stable orientation estimate, which can be represented, for example, as a quaternion with four components or a rotation matrix with nine elements. Generally, the gyroscope signal is integrated over time using numerical integration methods to estimate the changes in orientation, while the accelerometer provides a measurement of the direction of the gravity vector (when motion is not causing high linear acceleration above 0.5 g). This gravity vector measurement helps to correct for the drift that accumulates in the integrated gyroscope signal at rates of 0.1-1 degree per minute, particularly in the pitch and roll angles. The Mahony algorithm, for example, effectively uses the accelerometer data to remove the bias or drift that results from the integration of the gyroscope signal along the pitch and roll axes relative to the force of gravity, achieving steady-state errors below 1 degree.

When the IMUs (e.g., IMU 3224) also include a 3-axis magnetometer that measures the local magnetic field with resolutions of 1-10 nT, an absolute heading or yaw orientation, relative to magnetic north with declination corrections applied, can be determined. In such cases, the computer 3110 might use an algorithm like the Madgwick filter, which is capable of incorporating magnetometer data with adaptive gain parameters, or similar techniques to determine an absolute orientation estimate in all three axes of rotation with accuracies of 2-5 degrees. If the wearable apparatus 3200 includes encoders (3211-3213) in its articulated arms 3300, the position data that is derived from these encoders using forward kinematics with Denavit-Hartenberg parameters can then be fused or combined with the absolute orientation and heading signals that are obtained from the IMUs (such as 3224) through sensor fusion algorithms. This fusion process can be instrumental in correcting for drift in the position estimates that are derived purely from integrating IMU (e.g., IMU 3224) data over time, reducing position errors from meters to centimeters over typical operation periods.

To correct for the drift that is inherent in IMU (such as 3220, 3224) measurements (both orientation drift at rates of 1-10 degrees/hour and position drift at rates of 1-10 cm/minute, if the latter is derived from IMU integration), or more generally to provide a more accurate 6-DOF delta pose or absolute pose with position accuracies of 1-10 mm and orientation accuracies of 1-3 degrees, the computer 3110 or the piloting control system 3202 may employ a variety of methods. These methods include applying advanced filtering algorithms with computational complexities of $O(n^2)$ to $O(n^3)$, implementing sophisticated sensor fusion techniques that combine multiple sensor types with different error characteristics, performing periodic calibration routines every 10-60 minutes, or using any combination of these approaches to achieve the desired accuracy.

Specific algorithms that may be used for this purpose of sensor fusion and state estimation include variants of the Kalman Filter (e.g., the standard Kalman Filter for linear systems, the Extended Kalman Filter (EKF) for nonlinear systems with 15-30 state variables, the Unscented Kalman Filter (UKF) with 2n+1 sigma points, or the Error-State Kalman Filter (ESKF) for improved numerical stability), Particle Filters with 100-10000 particles, complementary filters with adjustable time constants, or combinations thereof, which must be configured appropriately to process the available sensor data from the array of sensors 3208 at update rates matching sensor sampling frequencies.

Additionally, the magnetometer component of each IMU (such as 3224) may require periodic manual re-calibration every 1-7 days, or the system may employ automatic online calibration techniques to maintain its accuracy within 5-10 degrees. Such calibration techniques may include: (i) static calibration procedures, which involve collecting data while the sensor is held stationary in various orientations for 30-60 seconds per position; (ii) rate table calibration, which uses specialized equipment to rotate the sensor at precisely known rates from 1-1000 degrees/second; (iii) Allan variance analysis, which is a method used to characterize noise and stability over different time scales from 0.01 seconds to 10000 seconds; (iv) dynamically adjusting sensor outputs based on a comparison of IMU data with ground truth data provided by a more accurate system, such as an external motion capture or optical tracking system with accuracies better than 1 mm, if one is available during a calibration phase; and/or (v) any other known type of sensor calibration method that is suitable for IMUs including temperature compensation and magnetic field mapping.

Further, a range of advanced drift correction models or techniques may be utilized by the system achieving drift rates below 0.1 degrees/minute. Examples of such techniques include exploiting periods of known motion constraints, such as applying zero-velocity updates (ZUPT) when a hand or foot is detected to be stationary for more than 0.5 seconds, or applying zero-angular rate updates (ZARU) when rotation is detected to have stopped based on thresholds of 0.1 degrees/second. Other advanced techniques include the use of machine learning-based drift prediction and correction models trained on datasets of $10^4$ to $10^6$ samples, dead reckoning combined with map-based localization if a map of the environment is available with resolutions of 1-10 cm, factor graph optimization methods with $10^2$ to $10^4$ variables, information filtering with information matrices, recursive least squares estimation with forgetting factors of 0.95-0.99, various Bayesian estimation techniques including maximum a posteriori estimation, adapting SLAM algorithms for this purpose achieving loop closure errors under 1%, and applying kinematic constraints that limit the estimated movements to those that are physically feasible based on the structure of the human operator (H) or the apparatus 3200 itself such as joint angle limits and maximum velocities. Adaptive calibration routines, which could run periodically every 100-1000 measurements or continuously during operation to estimate and compensate for changing sensor biases (typical rates of 0.01-0.1 degrees/second/hour) or scale factors (drift rates of 0.01-0.1%/hour), could also be employed to enhance long-term accuracy over multi-hour sessions.

As described, the system may use sensor fusion to correct for IMU (3220, 3224) drift or to provide a more accurate 6-DOF delta pose or absolute pose. This fusion process may involve combining data from the primary IMUs (e.g., torso IMU 3224) and encoders (3211-3213) with data obtained from any of the following additional sensors or systems, if they are available to the system:

Ultra-wideband (UWB) positioning systems: Utilizing UWB tags on the operator (H) and anchors in the environment for precise relative positioning with accuracies of 10-30 cm and update rates of 10-100 Hz (e.g., as discussed in T. H. Nguyen, T.-M. Nguyen and L. Xie, "Range-Focused Fusion of Camera-IMU-UWB for Accurate and Drift-Reduced Localization," IEEE Robotics and Automation Letters, vol. 6, no. 2, pp. 1678-1685, April 2021, doi: 10.1109/LRA.2021.3057838, which is incorporated herein by reference).

Visual-Inertial Odometry (VIO): Integrating visual data from cameras mounted on the wearable apparatus 3200 or the head of the operator (H) (e.g., from a VR headset) with IMU (3220, 3224) data can significantly improve pose accuracy to centimeter-level precision, especially for position tracking. Examples of VIO systems include integrated devices like the (now discontinued) Intel RealSense T265 Tracking Camera with dual fisheye cameras, software libraries like VINS-Mono achieving 0.1-0.5% trajectory error, or platform features like Apple's ARKit with world tracking capabilities.

LiDAR Sensors: (e.g., Velodyne VLP-16 Puck with 16 channels and 100 m range, Ouster OS1 LiDAR with 64-128 channels, Hokuyo UTM-30LX with 270-degree field of view and 30 m range).

Optical Tracking Systems: Using external cameras (like Vicon Motion Capture Systems with sub-millimeter accuracy, OptiTrack Systems achieving 0.1 mm precision, ART Tracking Systems with latencies under 5 ms) to track reflective markers placed on the wearable apparatus 3200 or the operator (H) can provide highly accurate ground truth pose information with update rates of 100-360 Hz.

Additional Gyroscopes: High-performance gyroscopes beyond those in standard IMUs (such as 3220, 3224) might offer lower noise or drift (e.g., STMicroelectronics L3GD20H with 0.03 dps/NHz noise density, Analog Devices ADXRS290 with 0.004 degrees/second/NHz, Bosch BMG250 with bias stability of 2 degrees/hour).

Pressure Sensors: Barometric pressure sensors can provide altitude information with resolutions of 10-20 cm, which is useful for correcting vertical drift (e.g., Bosch BMP388 with 0.08 Pa resolution, Honeywell ABP Series with 0.03% accuracy, TE Connectivity MS5803-14BA with 24-bit ADC).

Magnetic Field Sensors (Magnetometers): Used for heading estimation with accuracies of 1-2 degrees, as discussed earlier (e.g., Honeywell HMC5883L with 2 milligauss resolution, Asahi Kasei AK8963 with 0.6 µT sensitivity, STMicroelectronics LIS3MDL with ±4/8/12/16 gauss range).

Acoustic Sensors: (e.g., Knowles MEMS Microphones with SNR>65 dB, Audio Analytic's ai3™ Sensor for sound event detection, Microflown Technologies Acoustic Sensors for sound source localization).

Time-of-Flight (ToF) Sensors: ToF cameras or sensors could provide depth information relative to the environment with millimeter precision (e.g., STMicroelectronics VL53L1X with 4 m range, Texas Instruments OPT8241 with QVGA resolution, Basler blaze ToF Camera with 30 fps frame rate).

Ultrasonic Sensors: Can provide range measurements to nearby surfaces with centimeter accuracy (e.g., MaxBotix LV-MaxSonar-EZ Series with 1 mm resolution, HC-SR04 Ultrasonic Sensor with 2-400 cm range, Pepperl Ultrasonic Sensors with response times under 100 ms).

Capacitance Sensors: Primarily used for proximity or touch sensing with detection distances of 0-50 mm (e.g., Microchip CAP12xx Series with 12 channels, Cypress CapSense Controllers with water tolerance, Analog Devices AD7746 with 24-bit resolution).

Infrared Sensors: Can be used for ranging, proximity, or thermal imaging applications (e.g., Sharp GP2Y0A21YK0F with 10-80 cm range, FLIR Lepton Thermal Camera Module with 160×120 resolution, Omron D6T Thermal Sensor with 4×4 or 16×4 pixel arrays).

ii. Use of the Wearable Data Collection Apparatus

In order to collect the human data, the system 3010 uses its sensors, such as sensors 3208, to collect sensor data at sampling rates of 100-1000 Hz. Said sensor data includes data about the human teleoperator, who is the operator (H), and their various movements in space captured with six degrees of freedom per tracked segment. It should be understood that the said sensor data is a proxy for the underlying human data, because the said sensors 3208 are naturally offset from the body of the operator (H) by distances of 10-50 mm and are not directly integrated into the human operator (H). The mismatch between the human data and the sensor data may be minimal in certain designs of the wearable data collection apparatus 3200 achieving correspondence within 2-3 mm, or it may be more significant in others reaching 10-20 mm offsets. However, to reduce the delta that exists between the sensor data and the true human data, raw data may be collected from multiple sources and then combined by the computer 3110 to form the final sensor data through sensor fusion algorithms running at 500-1000 Hz. These sources may include: (i) sensors that are associated with any joints in the wearable data collection apparatus 3200, such as position encoders 3211-3213 measuring joint angles with resolutions of 0.02-0.09 degrees; (ii) wrist-mounted inertial measurement units (IMUs), one for each wrist 3220 providing 6-DOF motion data; (iii) a torso-mounted IMU 3224 establishing the base reference frame; (iv) additional body-worn IMUs, for example, placed on the upper arms or head of the operator (H) for redundant tracking; (v) physiological sensors that are integrated into the wearable data collection apparatus 3200 or an associated headset, such as eye-tracking sensors providing gaze direction data with 1-degree accuracy which may be indicative of the intent of the operator (H), or EEG/EMG sensors providing data related to the cognitive state or refined motor commands of the operator (H) with signal processing at 256-1024 Hz; and (vi) any of the other types of sensors 3208 that were discussed previously or any other known suitable sensors meeting performance specifications. Other suitable sensors could include flex sensors for detecting finger movement with bend angles from 0-90 degrees or pressure sensors located in the gloves 3400 for measuring grip force from 0.1-100 N.

iii. Generation of the Control Algorithm or Model

Any aspect of the disclosed environment, systems, and/or assemblies may be used to generate a control algorithm or model, wherein said algorithm or model is configured to obtain sensor data sampled at 100-1000 Hz, which is derived from the human data of the operator (H) and output robot control data for consumption and control of the robot 1. For example, said control algorithm or model may output control information that contains the desired positions with millimeter precision, velocities up to 5 m/s, torque targets ranging from 1-500 Nm, or current signals from 0.1-50 A for the actuators of the robot 1, for example, for the selected arm actuators J1-J7, or for all actuators J1-J16 of the robot 1 for more coordinated movements including whole-body control. This control information can be generated at frequencies that are suitable for stable joint control of the robot 1, which can range from 50 Hz to 200 kHz depending on the control architecture, while the higher-level updates might run at rates such as 500 Hz to 2 kHz for trajectory planning and coordination.

The control algorithm or model may be generated using control methodologies including PID control with tuned gains, model predictive control with prediction horizons of 10-100 ms, or may be generated using advanced learning techniques that are unique to machine learning models or AI models with network architectures containing $10^6$ to $10^9$ parameters. A reinforcement learning method along with a desirable reward system providing shaped rewards may be used to leverage trial and error in simulations running at 1000× real-time to teach the robot 1 how to properly respond to the sensor data from said wearable data collection apparatus 3200. These robots are then exposed to a wide range of scenarios that they might encounter in the real world, including over 10,000 different environment configurations, and a single neural network policy learns to operate all of them with success rates exceeding 95%. This training includes encountering various terrains with friction coefficients from 0.1 to 1.5, dealing with changes in actuator dynamics including wear and temperature effects, and learning responses to trips, slips, shoves applying forces up to 100 N, and other perturbations. By combining the technique of domain randomization in the simulations with parameter variations of ±30% and high-frequency torque feedback on the real robot 1 at rates of 1-10 kHz, the policies that are trained in the simulation may be able to transfer with zero-shot capability to the real hardware without requiring any additional tuning achieving sim-to-real success rates above 90%. This thereby provides for a fast, efficient, and lightweight deployment of the policy to the edge, on the computer 3110 with inference times under 5 ms, the piloting control system 3202, and/or the whole body controller 1550 of the robot 1 using model compression techniques reducing size by 10-100×.

More specifically, a policy that is learned using only RL might converge to sub-optimal control strategies that do not capture the proper response to the provided sensor data, achieving only 60-70% task success rates. To address this issue, the said preference for robot control can be injected into the learning framework by providing a reward to the robot 1 for mimicking proper positioning of the robot based on the provided sensor data with position matching rewards weighted at 0.3-0.7. Furthermore, as was indicated above, a combination of domain randomization in the simulation with randomization ranges of ±20-50% and a kHz-rate torque feedback control loop on the robot 1 with control frequencies of 1-10 kHz may be used to bridge the reality gap that exists between the robot 1 in a simulation and the robot in real-time. Domain randomization helps to bridge this gap by randomizing the physical properties of each simulated robot, including mass variations of ±15%, friction changes of ±40%, and sensor noise levels of 1-5%, which simulates a breadth of systems that the policy may have to run on in the real world. This helps the policy to generalize with zero-shot capability to a physical robot without the need for additional fine-tuning reducing deployment time from weeks to hours. The output of the policy can also be run through a kHz-rate closed-loop torque control system with gains tuned for each actuator to compensate for any errors in the actuator modeling typically within 5% of commanded values. The resulting policy is robust to robot-to-robot variations of ±10% in parameters, to changes in surface friction from 0.3 to 1.2, and to external pushes up to 200 N, and it produces a repeatable control of the robot across the entire fleet of robots with consistency ratings above 95%. As a result, the disclosed technology can scale in an effective manner without requiring any additional engineering effort per robot, thereby supporting broad commercial operations across thousands of units.

iv. Use of the Control Algorithm or Model and Sensor Data

This raw sensor data can then be filtered using Butterworth or Kalman filters, modified through calibration matrices, altered via outlier removal, or changed by the computer 3110 to generate the combined sensor data with noise reduced by 60-80%. The combined sensor data can then be processed by a control algorithm or model that is running on the computer 3110 with computational loads of 1-10 GFLOPS, the piloting control system 3202, and/or the whole body controller 1550 of the robot 1. The processing of said sensor data by the control algorithm or model will generate control information that is designed to be sent to the motor controllers operating at PWM frequencies of 10-50 kHz that govern the one or more actuators (J1-J7) of the arm of the robot 1, or other controlled parts of the robot 1, causing these actuators to move in accordance with the desired motion that was derived from the input of the operator (H) with motion fidelity above 95%. For example, the raw sensor data from the wearable data collection apparatus 3200 may be transformed to control information for consumption by the robot 1 in real time with end-to-end latencies under 50 ms.

v. Collection and Use of the Training Data

Once the robot 1 has received and moved according to the robot data, such as the joint commands with position accuracies of 0.1-1 mm, the WBC 1550, or other subsystems on the robot 1, collects the training data that results from the actuator movements and the sensor readings from the sensors of the robot 1 at rates of 100-1000 Hz. This training data can then be communicated to the central data storage database 2900 for the purpose of logging and later analysis or model training with data throughputs of 10-100 MB/s. It may also be communicated back to the wearable data collection apparatus 3200, specifically to the piloting control system 3202, to enable a closed-loop haptic feedback experience for the operator (H) with feedback latencies under 20 ms. For example, the collected training data may include: measured forces and torques from sensors located in the joints or end-effectors of the robot 1 with force ranges of 0.1-1000 N and torque ranges of 0.01-500 Nm, control signals that were sent to and/or received from the actuators of the robot 1, such as commanded vs. actual currents differing by less than 5%, torques with tracking errors under 2%, or positions with errors under 0.5 mm, measured actuator position data from encoders on the robot 1 with resolutions of 12-20 bits, velocity data which may be derived or measured for the robot 1 ranging from 0.01-10 m/s, acceleration data from IMUs on the robot 1 or derived with ranges of ±20 g, video feeds from the onboard cameras of the robot 1, such as a stereo pair or head cameras at 30-120 fps with resolutions from 720p to 4K, data from other onboard sensors of the robot 1, such as LiDAR providing 300,000 points/second or tactile sensors with spatial resolutions of 1-5 mm, and internal state information from the WBC 1550 of the robot 1 including joint states, end-effector poses, and balance metrics updated at 500-1000 Hz.

This collected training data, along with the corresponding sensor data from the wearable data collection apparatus 3200, and the robot control data from the wearable apparatus 3200, may undergo various processing steps which are performed by the computer 3110, either offline or online. These steps might include filtering out noise using digital filters with 20-40 dB noise reduction, synchronizing the timestamps across the various data streams to within 1 ms accuracy, labeling segments of data according to the task that was performed with over 100 task categories, refining the pose estimates of both the operator (H) and the robot 1 to sub-centimeter accuracy, and modifying or augmenting the data with techniques such as time warping, noise injection, or trajectory perturbation, in order to generate structured training data that is suitable for training machine learning models with dataset sizes ranging from $10^4$ to $10^7$ samples.

These models could include general Machine Learning (ML) models for specific tasks, like object recognition by the robot 1 achieving mAP scores above 0.8, or they could be comprehensive policies like Bipedal Action Models (BAMs) with $10^8$ to $10^9$ parameters or Large Language Models (LLMs) that have been adapted for robotic control with context windows of 4096-32768 tokens, which are sometimes referred to as MLLMs. These trained models may subsequently be run on one or more robots, like the robot 1, for autonomous operation achieving task success rates above 90%, in the cloud for large-scale analysis or simulation with thousands of parallel instances, or in a hybrid fashion balancing edge and cloud compute. The structured training data may also be used for the performance analysis of the operator (H) generating metrics such as task completion time, movement efficiency, and error rates, or for refining the control algorithms of the system 3010 through iterative optimization achieving performance improvements of 10-30% per iteration.

In further embodiments, the system 3010 may obtain a magnetic field map of the training environment with spatial resolutions of 10-50 cm and field strength measurements accurate to 1 μT. This map can help operators avoid areas with high magnetic interference exceeding 100 μT, adjust the environment to minimize disturbances by relocating ferromagnetic objects, or allow advanced models on the computer 3110 to correct drift based on the magnetic field map reducing heading errors by 50-70%. For instance, if a high magnetic field exceeding 50 μT is detected, the model may apply a specific set of weights to compensate with correction factors of 1.2-2.0, while a different set may be used in low magnetic field areas below 10 μT. Additionally or alternatively, the IMUs may be enclosed within shielding materials such as mu-metal or soft iron providing 20-40 dB attenuation to reduce exposure to external magnetic fields, mitigating drift in measurements to rates below 1 degree/hour.

The magnetometers within each IMU may also be manually recalibrated requiring 30-60 seconds or recalibrated over the network 2999A-X with remote calibration protocols. Calibration can occur upon startup taking 5-10 seconds, at predefined intervals (e.g., every 30 minutes, 10 minutes, 1 minute, 30 seconds, 15 seconds, every second, or fractions of a second), or continuously through automatic processes updating every 100 ms. Calibration techniques may include hard-iron and soft-iron compensation, temperature coefficient correction, and eight-figure calibration patterns.

F. Alternative Embodiment

In alternative embodiments, the data collection system 3010 may be adapted for alternative glove embodiments 13400, 23400, and other variations detailed below. In each embodiment, the data collection system and wearable data collection apparatus remain substantially similar to the illustrative data collection system 3010, where the wearable data collection apparatus 3200 is adapted to include an alternative glove and/or hand sensors and the piloting control system 3202 is adapted to receive and process sensor data from said alternative glove. It should also be understood that the additional embodiments may be contemplated as discussed herein and said embodiments may be partially or fully combined with any of the above-described embodiments data collection system 3010, 13010, 23010. For example, the alternative glove 13400 may be coupled to alternative articulated arms creating hybrid configurations.

In summary, each of the disclosed systems 3010, 13010, 23010 may be worn by a human operator to collect data for training humanoid robots with data collection rates of 10-100 GB per hour. The collection of this data may be: (i) directly from the wearable data collection apparatus 3200, 13200, 23200 with onboard storage capabilities, (ii) directly from the robot 1 based on teleoperation with real-time streaming, or (iii) based on a combination of data collected from the wearable data collection apparatus 3200, 13200, 23200 and data collected from a robot 1 during teleoperation enabling multi-modal learning. Further, the apparatus 3200, 13200, 23200 may: (i) omit links for simplified configurations, (ii) include links that are adjustable with 10-20 mm increments, (iii) include rigid links that are not adjusted for fixed anthropometry, (iv) be custom built or printed for a specific operator using additive manufacturing, or (v) include alternative gloves embodiment and/or sensors as described achieving various performance specifications.

i. Glove—Second Embodiment

Figure 19:
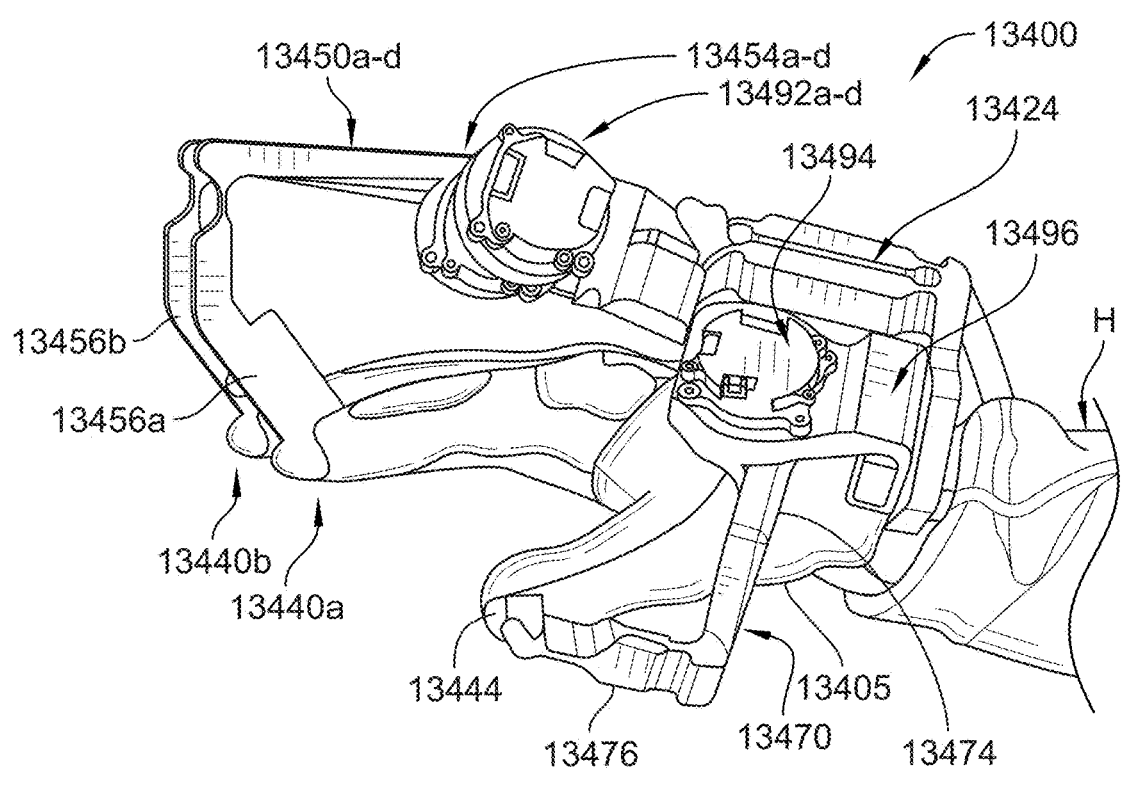
FIG. 19 is a perspective view of a second embodiment of a glove to be used with the wearable data collection apparatus of FIG. 7B.

Referring to FIG. 19, a second embodiment glove 13400 may be utilized with the robot data collection system 13010. In this second embodiment, the data collection system 13010 is substantially similar to the illustrative data collection system 3010, where the wearable data collection apparatus 13200 includes an alternative glove 13400, and the piloting control system 13202 is adapted to receive sensor data from glove 13400. For sake of brevity, the above disclosure in connection with the wearable data collection apparatus 3200 will not be repeated below, but it should be understood that across embodiments like numbers represent like structures. The primary difference in the wearable data collection apparatus 3200 and the alternative wearable data collection apparatus 13200 relates to alternative gloves 13400 that are coupled to the articulated arms 13300.

The primary difference between the gloves 3400 of the first embodiment and the gloves 13400 is the addition of motors 13490 positioned at each finger and thumb. The gloves 13400 include deformable members 13450 that extend forward from electric motors 13492a-13492d to a haptic button (e.g., a vibrating motor) 13444a-d. Similarly, for the thumb, gloves 13400 include deformable members 13470 that extends forward from electric motors 13494, 13496 to a haptic button 13444. This enables the gloves 13400 to provide forces on the hand that the robot 1 may experience, wherein said forces that can be exerted on the hand of the operator (H) as haptic feedback. Said haptic feedback to the operator (H) is beneficial because it allows the operator to feel or experience the forces that the robot 1 is experiencing during completion of a task. For example, this may help ensure that operator (H) does not apply too much pressure to the robot's hands 56 during a teleoperation session, which could cause the robot 1 to fall over or damage its fingers.

Referring to FIG. 19, the motors 13492a-d are positioned at a distal portion 13426 of the sensor assembly housing 13424. The motors 13492a-d are (i) positioned to align with the finger portion of the hand receptacle 13405 maintaining anatomical correspondence, (ii) configured to couple with deformable connectors 13450a-d, and (iii) are substantially parallel in orientation. In some embodiments, the motors 13492a-d may be angularly offset by a slight angle (e.g., angle less than about 5 degrees) to ensure the operator's finger may move within the hand receptacle 13405 without interfering with the adjacent finger during full flexion. A proximal portion 13428 of the housing 13424 includes a mounting structure 13430 for the first and second thumb motors 13494, 13496 and the deformable connector 13470, positioned to align with natural thumb motion arcs. The motors 13494, 13496 are positioned perpendicular to each other to provide two degrees of freedom. In various embodiments, the finger encoders 13436a-d and thumb encoders 13446, 13448 reside with the motors 13492a-d and thumb motors 13494, 13496.

The piloting control system 13202 may also be configured to integrate various software applications or functionalities. These applications may include, for example: (i) an actuator control application for managing haptic feedback, and (ii) a sensor tracking application, which may incorporate a drift correction algorithm to enhance tracking accuracy.

The actuator control application is designed to precisely modulate the torque output or other control signals that are sent to each actuator, such as motors 13492a-d, 13494, 13496 of the glove 13400 to provide haptic feedback. This application may leverage data from multiple diverse sources, including: (i) simulated data that is generated via computational models which predict dynamic interactions and expected loads based on a virtual environment or a task model, (ii) simulated data that is informed by the state of the robot 1, allowing adaptive learning algorithms to refine actuation patterns based on real-world conditions encountered by the robot 1, and/or (iii) direct data that is received from the robot 1, sourced from its own sensors positioned across the joints, limbs, or end-effectors of the robot 1. This sophisticated integration of data sources allows the actuator control application to deliver haptic feedback to the operator (H) that corresponds to environmental stimuli being experienced by the robot 1. This capability thereby enhances the realism of the training or teleoperation experience by accurately simulating physical interactions and resistances that are encountered during operational scenarios.

In parallel, the sensor tracking application is tasked with the real-time acquisition of data from the array of sensors 13208 that are distributed across the wearable apparatus 13200. The sensor tracking application communicates this collected sensor data to the computer 13110 for further processing, or it may process the data locally within the piloting control system 13202. The computer 13110 and/or the on-board processors that are located within the piloting control system 13202 then operate to refine the raw sensor data. This refined sensor data can then be utilized, in connection with robot control data received from the robot 1, to dynamically adjust the data that is provided to the actuator control application (for the purpose of haptic feedback) and to generate the robot control data that is sent to the robot 1. As will be described in greater detail below, advanced algorithms, including various machine learning models, can be employed to analyze the various data streams, such as the raw sensor data, the refined sensor data, and/or the received robot control data, in order to identify patterns, perform sensor fusion, correct for sensor drift, and optimize control strategies. This comprehensive feedback loop, which incorporates data from the operator (H), the apparatus 13200, and the robot 1, not only improves the performance of the apparatus 13200 in real-time but also contributes to the iterative development of more sophisticated control algorithms (or AI models) that can be tailored to operator-specific training regimens or particular task requirements. This overall system architecture facilitates an adaptive training or teleoperation environment where the wearable data generation apparatus 13200 can continuously adjust its behavior based on accumulated interaction data from the operator (H) and feedback from the robot 1, thereby maximizing both task efficacy and the immersion of the operator.

ii. Glove—Third Embodiment

Figure 20:
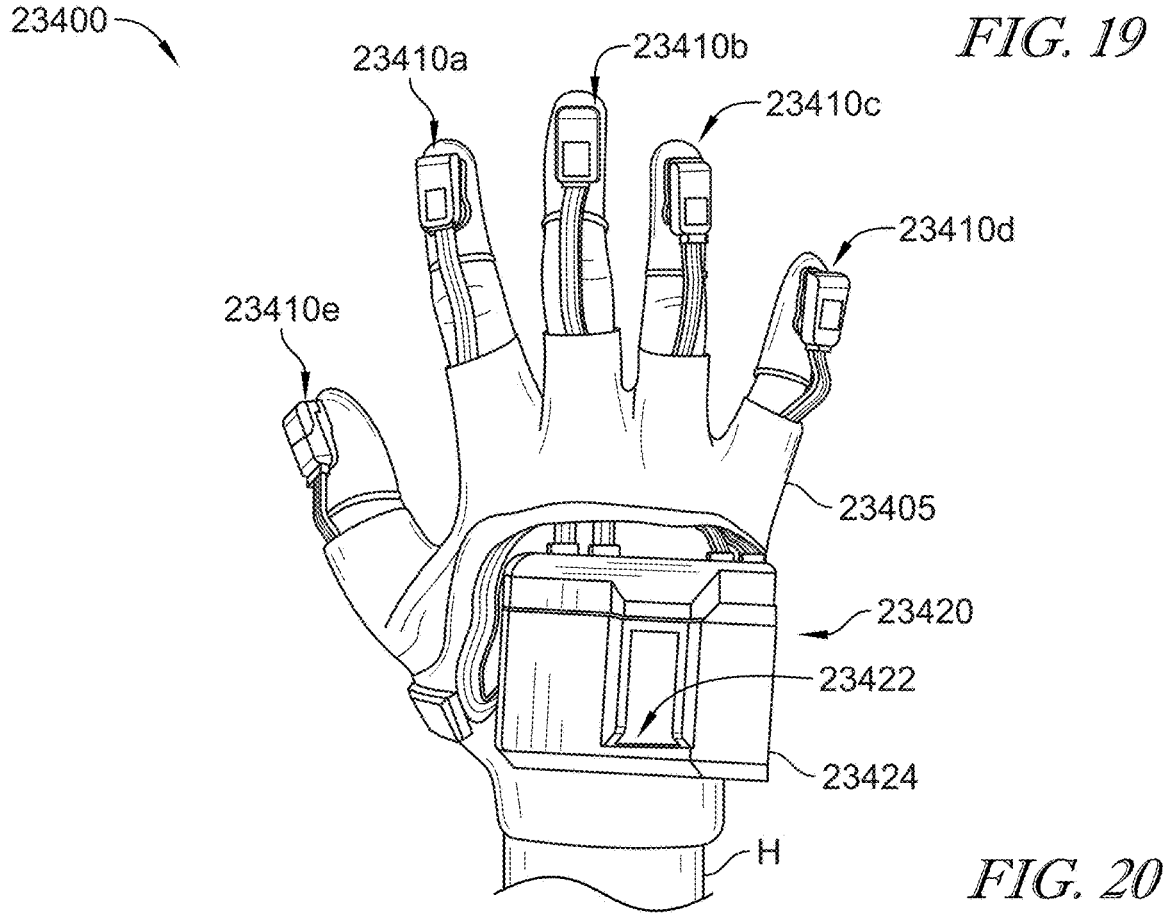
FIG. 20 shows a top view a third embodiment of the glove to be used with the wearable data collection apparatus of FIG. 7B.

Referring to FIG. 20, the robot data collection system 23010 may include a glove 23400 coupled to the articulated arms 23300 through mechanical interfaces designed for quick attachment and removal at the to the glove mount 23394. The glove 23400 is configured with a hand receptacle 23405 to be worn on the hands of an operator to capture the location data of the operator's hand, palm, and/or fingers with sufficient resolution for dexterous manipulation tasks. To achieve this, the glove 23400 may include sensor assembly 23420 including a plurality of hand position sensors 23410 arranged to capture comprehensive hand kinematics. A first set of hand position sensors 23410 may be positioned at the tips of the fingers and thumb (e.g., 23410a-23410e) for capturing fine motor movements with sub-millimeter precision. In the illustrative embodiment, the hand receptacle 23405 is fingerless, and the sensors 23410a-23410e are positioned on fingertip receptacles 23406 to conform more closely with the hand of the operator (H). In other embodiments, the sensors 23410a-23410e may be coupled directly to a hand receptacle that extends to include the fingers and thumb of the operator (H). In some embodiments, the glove 23400 may also include one or more palm sensors 23414 located at the palm of the glove to provide additional data on hand orientation or alternative sensors for additional positional information, such as grip force or contact pressure. In certain embodiments, the glove 23400 may also include an IMU 23220 contained in the housing 23424, for example, located on the dorsal side of the hand at the connection of the glove 23400 to the glove mount 23394, providing six-axis motion sensing. In other examples, the IMU 23220 may be coupled to the glove mount 23394 near the glove 23400, maintaining proximity to the hand for accurate measurements.

The gloves 23400 may include a magnetic field-generating apparatus designed to collect training material by accurately tracking the position and rotation of a human operator's wrist and fingers in three-dimensional space with millimeter-level position accuracy and degree-level orientation accuracy. The apparatus may include a first component that generates a magnetic field with controlled characteristics and a second component (or set of components) that may be positioned on or over the operator's hands and fingers for field detection.

The first component, which is an electromagnetic field (EMF) source, emits controlled EMF signals over a defined space around the operator's hand, typically encompassing a volume of 30×30×30 centimeters. These EMF signals are generated continuously or at predetermined intervals, utilizing specific frequencies and modulation schemes optimized to minimize interference and maximize detection accuracy while maintaining compliance with electromagnetic compatibility standards. For example, the EMF source may operate within a low-frequency range between 10 kHz and 200 kHz, allowing adequate field penetration through biological tissue and reducing susceptibility to environmental noise from common electronic devices. Modulation schemes, such as frequency modulation (FM) with deviation ratios of 5-10, amplitude modulation (AM) with modulation indices of 0.5-0.9, or phase-shift keying (PSK) with phase shifts of 90-180 degrees, may be used to encode synchronization information and unique identifiers within the EMF signals. The EMF source contains an integrated processor with computational capabilities of 100-1000 MIPS and memory of 256 KB-4 MB that manage operational instructions, control signal generation parameters (e.g., frequency stability within ±0.01%, amplitude control within ±1%, and waveform shape with harmonic distortion less than 1%), and analyze data received from the sensors with latencies under 1 millisecond.

The second component consists of sensors 23410 coupled to the operator's hands and wrists that detect EMF signals from the EMF source with high sensitivity and selectivity. These sensors may include magnetic flux density sensors with sensitivities of 1-100 nT, magnetic field strength sensors measuring fields from 0.1-100 μT, Hall effect sensors with voltage sensitivities of 1-5 mV/mT, and inertial measurement units (IMUs) with gyroscope ranges of ±2000 degrees/second and accelerometer ranges of ±16 g, all operating at a high sampling frequency—at least six times, preferably eight times, and most preferably ten times the highest frequency component of the EMF signals—to capture rapid movements accurately without aliasing. For instance, if the highest frequency component of the EMF signal is 100 kHz, the sensors may sample at 600 kHz to 1 MHz to ensure Nyquist criteria are exceeded. The sensors are strategically placed on the fingers, back of the hands, and wrists to capture precise movement and orientation data, with typical sensor spacing of 20-30 mm, and may include magnetometers capable of measuring the amplitude, phase, and frequency of the EMF signals with high precision including amplitude resolution of 12-16 bits and phase resolution better than 0.1 degrees. These sensors may employ technologies such as anisotropic magnetoresistance (AMR) with resistance changes of 2-3% per applied field or giant magnetoresistance (GMR) with resistance changes of 10-20% for enhanced sensitivity. Integrated IMUs provide additional data on angular velocity with resolution better than 0.01 degrees/second and linear acceleration with resolution better than 0.001 m/s$^2$, enhancing the overall accuracy of tracking through sensor fusion algorithms.

Communication between the sensors and the EMF source may occur via wired connections transmitting analog signals with bandwidths of 1-10 MHz or digital signals at data rates of 1-100 Mbps, or through wireless communication protocols, such as Bluetooth Low Energy (BLE) with data rates of 1-2 Mbps, Wi-Fi Direct supporting 250 Mbps, Zigbee at 250 kbps, or other suitable wireless technologies providing adequate bandwidth and low latency. Wired connections are typically designed with lightweight, flexible cables weighing less than 50 grams to minimize user encumbrance, while wireless connections use low-power transceivers consuming 10-100 mW to conserve battery life and extend operation to 8-12 hours. The choice of communication method is based on factors such as data bandwidth requirements (typically 100 kbps to 10 Mbps per sensor), power consumption constraints (total system power under 5 W), latency requirements (end-to-end latency under 10 ms), and environmental considerations including electromagnetic interference levels.

To determine the position of the operator's hands and wrists, the system analyzes detected EMF signals in conjunction with known properties of the emitted field using specialized algorithms and models implemented in real-time processing hardware. The system measures signal strength attenuation, where the intensity of the EMF signal decreases with distance from the source according to known physical laws, such as the inverse-square law in far-field conditions (distances greater than $\lambda/2\pi$) or more complex near-field equations for distances less than one wavelength of the EMF signal. By measuring the amplitude of the received EMF signals at each sensor with dynamic ranges of 60-80 dB, the system can calculate the approximate distance d between the EMF source and each sensor using calibration curves or mathematical models with accuracies better than 1 mm. Additionally and/or alternatively, phase difference measurement calculates precise distances by analyzing the phase shift between the emitted and received continuous-wave EMF signals with phase measurement accuracies of 0.1-1 degree. The phase difference φ is related to the distance d by $\varphi=(2\pi d)/\lambda$, where λ is the wavelength of the EMF signal, typically 1.5-30 meters for the operating frequency range. Measuring the phase difference allows for precise distance calculations with millimeter-level accuracy, especially when combined with multiple frequency signals to resolve ambiguity through techniques such as dual-frequency phase unwrapping.

The system may combine magnetic field vector analysis with IMU data to further refine or specify the rotation of the human's wrist and/or finger through complementary filtering techniques. Magnetic field vector measurements reveal the field's direction in three-dimensional components (Bx, By, Bz) at each sensor location with vector magnitude accuracies of 1-2% and direction accuracies of 1-2 degrees, which provides information about the sensor's orientation relative to the EMF source. IMUs add real-time data on angular velocity (gyroscope) with bias stability better than 1 degree/hour and linear acceleration (accelerometer) with bias stability better than 1 mg, enabling tracking of rotational movements (roll, pitch, yaw) with update rates of 100-1000 Hz and correcting for drift over time through zero-velocity updates when stationary conditions are detected. Advanced sensor fusion algorithms, such as Extended Kalman Filters (EKF) with 15-21 state variables or Complementary Filters with tunable time constants of 0.5-5 seconds, integrate data from magnetometers and IMUs, refining and stabilizing orientation estimates of the hands and fingers to achieve accuracies better than 2 degrees RMS. Further, it should be understood that the system may use a combination of the above described algorithms, models, and/or techniques, and/or any one of the above described algorithms, models, and/or techniques in connection with any other known algorithm, model, and/or technique such as Madgwick filters, Mahony filters, or neural network-based sensor fusion. It should be understood that other algorithm(s), model(s) and/or technique(s) that enable said system to determine the rotation and/or pose of the operator's body parts (e.g., wrist and/or fingers) based on the data collected from the wearable magnetic field-generating apparatus may be utilized by said system, including machine learning models trained on labeled motion capture data.

The algorithm(s), model(s) and/or technique(s) may run on a processor within the EMF source or an external computing architecture (e.g., computer 3110) with computational capabilities of 1-10 GFLOPS in order to process the collected sensor data in real time or near real time with latencies under 5 milliseconds. The system may also implement digital signal processing techniques, including filtering (e.g., low-pass filters with cutoff frequencies of 10-100 Hz, high-pass filters at 0.1-1 Hz, band-pass filters centered on signal frequencies) with filter orders of 2-8 and calibration procedures performed every 100-1000 measurements, remove noise with SNR improvements of 10-20 dB, correct sensor biases with residual errors under 1% of full scale, and adapt to environmental changes such as temperature fluctuations of ±20° C. or electromagnetic interference from nearby electronics operating at various frequencies. Further, the system may also use sensor fusion algorithms to further refine position and orientation estimates by accounting for sensor noise characteristics (white noise, flicker noise, random walk) and real-time dynamic conditions including accelerations up to 10 g. Finally, machine learning models with $10^4$ to $10^6$ parameters may also be used by the system to recognize specific movement patterns or gestures from a library of 50-500 trained gestures, enhancing tracking accuracy to 95-99% recognition rates and responsiveness with recognition latencies under 50 milliseconds.

The system may perform environmental mapping to record variations in field strength and direction within the operational volume, creating a baseline reference with spatial resolutions of 10-50 mm to adapt the system dynamically to changing conditions. For example, environmental mapping can account for metallic objects causing field distortions of 10-50%, magnetic interference from power lines at 50/60 Hz, or structural anomalies that may distort the EMF field by up to 30% in localized regions. Additional stationary sensors may be placed in the operator's environment at distances of 0.5-2 meters to extend coverage to larger workspaces and provide spatial orientation references, improving error correction capabilities by supplying extra data points for the algorithms to process, reducing position errors by 30-50%. The environmental mapping may be performed prior to using the system with calibration times of 1-5 minutes or may be used to actively adjust for changing conditions that may occur as the human is walking around their environment, with adaptive updates every 10-100 milliseconds.

The Apparatus provides accurate, real-time tracking of wrist and finger positions and rotations with update rates of 100-1000 Hz and latencies under 10 milliseconds, making it suitable for applications such as training data collection for humanoid robots requiring precise manipulation data, interactive control systems demanding responsive feedback, and immersive virtual and augmented reality environments needing natural hand interaction. This system leverages controlled EMF signal generation with field uniformity better than ±5%, high-frequency sensing at rates exceeding Nyquist requirements, sophisticated processing algorithms achieving sub-millimeter accuracies, and adaptive environmental mapping compensating for field distortions, overcoming limitations of conventional tracking methods that rely on external cameras or markers and are vulnerable to occlusions affecting 10-30% of the capture volume or lighting conditions requiring illumination levels above 500 lux. In one implementation, the apparatus complies with regulatory standards for electromagnetic emissions, as set by the Federal Communications Commission (FCC) Part 15 regulations or the International Commission on Non-Ionizing Radiation Protection (ICNIRP) guidelines, maintaining emissions below −50 dBm in restricted bands.

Designed to minimize interference with other devices through frequency selection and shielding, the EMF source operates within safe exposure limits for human use, maintaining specific absorption rates (SAR) below 1.6 W/kg. The apparatus's ergonomic design ensures user comfort during extended use sessions of 4-8 hours, with lightweight materials totaling less than 200 grams per glove and adjustable fittings that conform to various user sizes from 5th to 95th percentile hand dimensions and preferences including adjustable strap tensions and padding thicknesses. The components are embedded in gloves constructed from breathable fabrics or wearable straps with moisture-wicking properties that attach securely to the hands and wrists, and the apparatus is powered by rechargeable lithium polymer batteries with capacities of 1000-3000 mAh and efficient power management achieving consumption rates under 2 W to extend operational duration to 6-12 hours. The apparatus also includes quick-release mechanisms with release forces of 20-50 N for easy donning and removal in under 30 seconds, making it adaptable for continuous or extended use in diverse environments including indoor laboratories, outdoor training areas, and industrial settings, providing a comprehensive solution for precise motion tracking in three-dimensional space with position accuracies of 1-3 mm and orientation accuracies of 1-3 degrees.

iii. Alternative EMF Glove

In another alternative embodiment, a glove may be implemented as a commercially available device adapted to couple with the wearable data collection apparatus of FIG. 7B. For example, an EMF sensing glove, such as a Manus™ Prime 3 Haptic XR glove with force feedback capabilities up to 40N, or another similar glove that is designed and used to track the motion and position of an operator's hand with finger joint angle accuracies of 1-2 degrees. The glove may also be a glove of the type shown and described in patent publications WO2023223194, WO2023170631, US20230152076, and/or WO2023037289, the disclosures of which are fully incorporated herein by reference for any purpose.

As such, the glove may be a glove that includes an EMF source coupled to the glove structure operating at frequencies of 10-200 kHz and one or more sensors coupled to the glove fingers with sensor densities of 2-5 sensors per finger. The EMF source is configured to create an alternating magnetic field in the vicinity of the hand with field strengths of 1-100 μT. The one or more sensors are configured to detect the magnetic field that is generated by the EMF source with sensitivities better than 100 nT. The location of each of the operator's fingers is then tracked with the one or more sensors achieving position accuracies of 1-3 mm, and the location of all the sensors is tracked with respect to the EMF source using the triangulation and sensor fusion techniques described above. The glove may incorporate various sensor technologies, including but not limited to resistive bend sensors with resistance changes of 10-100% over their range, inertial measurement units (IMUs) with 6 or 9 degrees of freedom, optical fiber sensors detecting bend radii from 10-100 mm, or capacitive touch sensors with sensitivities of 1-10 pF, to enhance the accuracy and granularity of hand motion tracking to achieve comprehensive capture of hand kinematics.

iv. Additional Tactile Sensors

In various embodiments, the glove 3400, 13400, 23400, or another alternative glove may include additional tactile sensors providing force and pressure feedback capabilities. Said sensors may include one or more strain gauges with gauge factors of 2-200, wherein said strain gauges are positioned on a strain gauge bridge (e.g., spring bridge) with bridge completion resistors matched to within 0.1%, or may be formed in an L-shaped array covering 20-50 square millimeters. The bridge member may have any suitable shape to enable a plurality of strain gauges to be mounted thereto (e.g., rectangular with aspect ratios of 1:1 to 3:1, triangular for three-point sensing, circular for uniform stress distribution, oval for ergonomic considerations, square for simplified mounting, pentagonal, hexagonal, or octagonal for multi-directional sensing, trapezoidal for graduated sensitivity, rhombus for shear measurement, parallelogram for parallel force detection, ellipsoid for reduced stress concentration, crescent for conformal mounting, star-shaped for radial measurements, heart-shaped, diamond-shaped for point loading, heptagonal, decagonal for high-resolution arrays, semicircular for partial coverage, sphere for omni-directional sensing, cylinder for axial loads, cone for force concentration, pyramid for multi-axis detection, torus for distributed loading, dodecagon for fine angular resolution, scalene triangle for asymmetric loading, isosceles triangle for balanced sensing, equilateral triangle for uniform response, oblong for extended coverage, kite-shaped for specific force vectors, and prism-shaped for three-dimensional force measurement, etc.). The strain gauges may be of any type, which includes: (i) linear strain gauges with active lengths of 1-20 mm, (ii) double linear strain gauges for temperature compensation, (iii) shear or torsional strain gauges with 45-degree grid orientations, (iv) rosette strain gauges (T (or Tee) shaped with 0-45-90 degree orientations, rectangular shaped with 0-45-90 degree arrangements, delta shaped with 0-60-120 degree configurations, stacked for reduced footprint), (v) diaphragm strain gauges for pressure sensing, (vi) biaxial strain gauges for plane stress measurement, (vii) bi-directional strain gauges for orthogonal measurements, (viii) stacked strain gauges for increased sensitivity, (ix) cross strain gauges for multi-axis detection, (x) double shear strain gauges for pure shear measurement, (xi) circular strain gauges for radial stress, (xii) any hybrid or combination thereof achieving combined functionality, and (xiii) any other suitable strain gauge type that is known to one of skill in the art meeting application requirements. The strain gauges may be arranged in different configurations including: (i) quarter-bridge configurations with single active gauges, (ii) half-bridge configurations with two active gauges for temperature compensation, and (iii) full-bridge configurations with four active gauges for maximum sensitivity and temperature compensation.

It should be understood that other sensors and technology may be used instead of or in combination with the sensor assemblies discussed above to achieve comprehensive force and tactile feedback. Other strain gauge technology that may be used includes: (i) mems-based strain gauges with dimensions under 1 mm$^2$, (ii) nanocomposite strain gauges with gauge factors exceeding 1000, (iii) thin-film or thick-film strain gauges (e.g., C4A Series with 350Ω resistance or EA Series with 120Ω resistance from Vishay Precision Group, RF9 Series with 0.02% linearity or Y Series with 0.01% accuracy from Hottinger Brüel & Kjær, KFG Series with 2 mm gauge length or KFR Series with 1 mm gauge length from Kyowa Electronic Instruments, TFSG Series with response times under 1 microsecond from BCM Sensor Technologies, SGT Series with operating temperatures to 200° C. or KFH Series with weldable tabs from Omega Engineering, ELF Series with fatigue life exceeding 10$^7$ cycles or EPL Series with environmental sealing from Meggitt Sensing Systems, or any other known manufacturer meeting performance specifications), (iv) inductive strain gauges with inductance changes of 1-10%, (v) capacitive strain gauges with capacitance changes of 0.1-1 pF, (vi) piezoelectric strain gauges with charge sensitivities of 1-100 pC/N, (vii) optical fiber strain gauges with Bragg grating wavelength shifts of 1-10 nm, (viii) semiconductor strain gauges with gauge factors of 50-200, (ix) foil strain gauges with thicknesses of 3-5 micrometers, (x) ink-based strain gauges printed with resolutions of 50-200 micrometers, and/or (xi) a hybrid or combination thereof optimizing multiple parameters. The foil strain gauges may be made from or include: (i) foils that may be or may include constantan (copper-nickel alloy with 45% nickel), karma (nickel-chromium alloy with 74% nickel and 20% chromium), isoelastic (nickel-iron alloy with 36% nickel), evanohm (nickel-chromium alloy with 75% nickel, 20% chromium, and 2.5% aluminum), nichrome v (nickel-chromium alloy with 80% nickel and 20% chromium), and (ii) a carrier that may be or may include polyimide film with thickness of 25-50 micrometers, epoxy or phenolic resin with glass transition temperatures above 150° C., glass-fiber reinforced epoxy with elastic moduli of 20-30 GPa, ceramic backing for high-temperature applications above 500° C., and polyurethane for flexible applications with elongations exceeding 100%. Finally, the strain gauges may be any gauge that meets, uses, and was tested with at least one of the following standards: ASTM E251-13(2018), *Standard Test Methods for Performance Characteristics of Metallic Bonded Resistance Strain Gages*, ASTM International, ISO 376:2011, *Metallic materials—Calibration of force-proving instruments used for the verification of uniaxial testing machines*, ISO 9513:2012, *Metallic materials—Calibration of extensometer systems used in uniaxial testing*, VDI/VDE 2635 Blatt 2, *Experimental structural analysis—Recommendation on the implementation of strain measurements at high temperatures*, IEC 61298-3:1998, *Process measurement and control devices—General methods and procedures for evaluating performance—Part 3: Tests for the effects of influence quantities*, and DIN 51301, which is hereby incorporated by reference for all purposes. The strain gauges may be used in combination with other sensors in the sensing assembly or at alternate locations in the robot 1 to provide comprehensive force feedback data. Other sensors or technology may replace or be added to the tactile sensor assemblies as discussed below, including piezoelectric sensors, capacitive arrays, or optical tactile sensors.

G. Industrial Application

While the present disclosure shows several illustrative embodiments of a robot (in particular, a humanoid robot), it should be understood that these embodiments are designed to be examples of the principles of the disclosed assemblies, methods, and systems. They are not intended to limit the broad aspects of the disclosed concepts solely to the specific embodiments that have been illustrated. As will be realized by one skilled in the art, the disclosed robot, and its associated functionality and methods of operation, are capable of other and different configurations. Furthermore, several of its details are capable of being modified in various respects, all without departing from the fundamental scope of the disclosed methods and systems. For example, one or more of the disclosed embodiments, either in part or in whole, may be combined with another disclosed assembly, method, and system to create hybrid implementations. As such, one or more steps from the diagrams or components in the Figures may be selectively omitted or combined in a manner that is consistent with the principles of the disclosed assemblies, methods, and systems. Additionally, the order of one or more steps from the arrangement of components may be omitted or performed in a different order than what is explicitly described. Accordingly, the drawings, diagrams, and the detailed description provided herein are to be regarded as illustrative in nature, and not as restrictive or limiting, of the said humanoid robot. It should be understood that the use of the word "or" when separating element names in connection with a single reference number indicates that the same structure can have two or more different names. For example, the phrase "end effector or hand assembly 56" indicates that the structure that is referenced by the number 56 can be referred to or claimed as either an "end effector" or a "hand assembly."

While the above-described methods and systems are primarily designed for use with a general-purpose humanoid robot, it should be understood that the disclosed assemblies, components, learning capabilities, or kinematic capabilities may be adapted for use with other types of robots. Examples of other such robots include, but are not limited to: an articulated robot (e.g., an arm having two, six, or ten degrees of freedom, etc.), a cartesian robot (e.g., rectilinear or gantry robots, robots having three prismatic joints, etc.), a Selective Compliance Assembly Robot Arm (SCARA) robot (e.g., a robot with a donut-shaped work envelope, with two parallel joints that provide compliance in one selected plane, with rotary shafts positioned vertically, with an end effector attached to an arm, etc.), a delta robot (e.g., a parallel link robot with parallel joint linkages connected with a common base, having direct control of each joint over the end effector, which may be used for pick-and-place or product transfer applications, etc.), a polar robot (e.g., a robot with a twisting joint connecting the arm with the base and a combination of two rotary joints and one linear joint connecting the links, having a centrally pivoting shaft and an extendable rotating arm, a spherical robot, etc.), a cylindrical robot (e.g., a robot with at least one rotary joint at the base and at least one prismatic joint connecting the links, with a pivoting shaft and an extendable arm that moves vertically and by sliding, with a cylindrical configuration that offers vertical and horizontal linear movement along with rotary movement about the vertical axis, etc.), a self-driving car, a kitchen appliance, construction equipment, or a variety of other types of robot systems. The robot system may include one or more sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art and is used in connection with robot systems. Likewise, the robot system may omit one or more of the aforementioned sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art to be used in connection with robot systems. In other embodiments, other configurations or components may be utilized.

As is well known in the data processing and communications arts, a general-purpose computer typically comprises a central processor or other processing device, an internal communication bus, various types of memory or storage media (e.g., RAM, ROM, EEPROM, cache memory, disk drives, etc.) for code and data storage, and one or more network interface cards or ports for communication purposes. The software functionalities that are described herein involve programming, which includes executable code as well as associated stored data. This software code is executable by the general-purpose computer. In operation, the code is stored within the memory of the general-purpose computer platform. At other times, however, the software may be stored at other locations or transported for loading into the appropriate general-purpose computer system.

A server, for example, typically includes a data communication interface for engaging in packet data communication over a network. The server also includes a central processing unit (CPU), which may be in the form of one or more processors, for executing the program instructions. The server platform typically includes an internal communication bus, program storage, and data storage for the various data files that are to be processed or communicated by the server, although the server often receives its programming and data via network communications. The hardware elements, operating systems, and programming languages of such servers are conventional in nature, and it is presumed that those who are skilled in the art are adequately familiar therewith. The server functions may be implemented in a distributed fashion on a number of similar platforms to distribute the processing load.

Hence, aspects of the disclosed methods and systems that are outlined above may be embodied in the form of computer programming. Program aspects of the technology may be thought of as "products" or "articles of manufacture," which are typically in the form of executable code or associated data that is carried on or embodied in a type of machine-readable medium. "Storage" type media includes any or all of the tangible memory of the computers, processors, or the like, or any associated modules thereof. This may include various semiconductor memories, tape drives, disk drives, and the like, which may provide non-transitory storage at any time for the software programming. All or portions of the software may at times be communicated through the Internet or various other telecommunication networks. Thus, another type of media that may bear the software elements includes optical, electrical, and electromagnetic waves, such as those that are used across physical interfaces between local devices, through wired and optical landline networks, and over various air-links. The physical elements that carry such waves, such as wired or wireless links, optical links, or the like, also may be considered as media that bear the software. As used herein, unless specifically restricted to non-transitory, tangible "storage" media, terms such as computer or machine "readable medium" refer to any medium that participates in the process of providing instructions to a processor for execution.

A machine-readable medium may take many forms, including but not limited to, a tangible storage medium, a carrier wave medium, or a physical transmission medium. Non-volatile storage media include, for example, optical or magnetic disks, such as any of the storage devices in any computer or computers or the like, such as may be used to implement the disclosed methods and systems. Volatile storage media include dynamic memory, such as the main memory of such a computer platform. Tangible transmission media include components such as coaxial cables, copper wire, and fiber optics, including the wires that comprise a bus within a computer system. Carrier-wave transmission media can take the form of electric or electromagnetic signals, or acoustic or light waves, such as those that are generated during radio frequency (RF) and infrared (IR) data communications. Common forms of computer-readable media therefore include, for example: a floppy disk, a flexible disk, a hard disk, magnetic tape, any other magnetic medium, a CD-ROM, a DVD or DVD-ROM, any other optical medium, punch cards, paper tape, any other physical storage medium with patterns of holes, a RAM, a PROM and EPROM, a FLASH-EPROM, any other memory chip or cartridge, a carrier wave that is transporting data or instructions, cables or links that are transporting such a carrier wave, or any other medium from which a computer can read programming code or data. Many of these forms of computer-readable media may be involved in carrying one or more sequences of one or more instructions to a processor for execution.

It is to be understood that the invention is not limited to the exact details of construction, operation, exact materials, or specific embodiments shown and described herein, as obvious modifications and equivalents will be apparent to one who is skilled in the art. While the specific embodiments have been illustrated and described in detail, numerous modifications may come to mind without significantly departing from the spirit of the invention, and the scope of protection is only limited by the scope of the accompanying Claims. In the drawings, some structural or method features may be shown in specific arrangements or orderings. However, it should be appreciated that such specific arrangements or orderings may not be required. Rather, in some embodiments, such features may be arranged in a different manner or order than shown in the illustrative figures. Additionally, the inclusion of a structural or method feature in a particular figure is not meant to imply that such a feature is required in all embodiments and, in some embodiments, may not be included or may be combined with other features.

It should also be understood that the term "substantially" as utilized herein means a deviation of less than 15% and preferably less than 5%. It should also be understood that the term "near" means within 10 cm, the term "proximate" means within 5 cm, and the term "adjacent" means within 1 cm. It should also be understood that other configurations or arrangements of the above-described components are contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

The following applications are hereby incorporated by reference for any purpose: (i) PCT Application Nos. PCT/US25/10425, PCT/US25/11450, PCT/US25/12544, PCT/US25/16930, PCT/US25/19793, PCT/US25/23064, PCT/US25/23325, PCT/US25/24817, and PCT/US25/25005; (ii) U.S. patent application Ser. Nos. 18/919,263, 18/919,274, 18/922,334, 19/000,626, 19/006,191, 19/033,973, 19/038, 657, 19/064,596, 19/066,122, 19/180,106, 19/223,945, 19/224,109, 19/224,252, 19/249,517, 19/252,392, 19/252, 708, 19/306,591, 19/319,712, 19/324,392, 19/323,751, 19/325,486, 19/325,415, 19/324,342, 19/329,008, 19/329, 474, 19/329,485, 19/329,559, 19/337,845, 19/337,852, 19/337,899, and 19/347,690; and (iii) U.S. Design patent application Ser. Nos. 29/889,764, 29/928,748, 29/935,680, 29/954,572, 29/967,462, 29/993,115, 29/998,761, 30/024, 341, and 30/024,351; (iv) U.S. Provisional Patent Application Nos. 63/556,102, 63/557,874, 63/558,373, 63/561,307, 63/561,311, 63/561,313, 63/561,315, 63/561,317, 63/561, 318, 63/564,741, 63/565,077, 63/573,226, 63/573,528, 63/573,543, 63/574,349, 63/614,499, 63/615,766, 63/617, 762, 63/620,633, 63/625,362, 63/625,370, 63/625,381, 63/625,384, 63/625,389, 63/625,405, 63/625,423, 63/625, 431, 63/626,028, 63/626,030, 63/626,034, 63/626,035, 63/626,037, 63/626,039, 63/626,040, 63/626,105, 63/632, 630, 63/632,683, 63/633,113, 63/633,405, 63/633,920, 63/633,931, 63/633,941, 63/634,042, 63/634,599, 63/634, 697, 63/635,152, 63/677,087, 63/685,856, 63/690,334, 63/692,747, 63/692,765, 63/694,253, 63/694,304, 63/696, 507, 63/696,533, 63/697,793, 63/697,816, 63/700,749, 63/702,185, 63/705,715, 63/706,768, 63/707,547, 63/707, 897, 63/707,949, 63/708,003, 63/715,117, 63/715,270, 63/720,222, 63/722,057, 63/753,670, 63/757,440, 63/759, 665, 63/760,617, 63/763,209, 63/766,911, 63/770,620, 63/770,654, 63/772,440, 63/773,078, 63/776,429, 63/792, 520, 63/819,533, 63/837,511, 63/837,536, 63/839,386, 63/839,517, 63/839,612, 63/839,880, 63/839,918, and 63/841,314, each of which is expressly incorporated by reference herein in its entirety.

In this application, to the extent any U.S. patents, U.S. patent applications, or other materials (e.g., articles) have been incorporated by reference, the text of such materials is only incorporated by reference to the extent that it does not conflict with the materials, statements, and drawings set forth herein. In the event of such a conflict, the text of the present document controls, and terms in this document should not be given a narrower reading in virtue of the way in which those terms are used in other materials incorporated by reference. It should also be understood that structures or features not directly associated with a robot cannot be adopted or implemented into the disclosed humanoid robot without careful analysis and verification of the complex realities of designing, testing, manufacturing, and certifying a robot for the completion of usable work nearby or around humans. Theoretical designs that attempt to implement such modifications from non-robotic structures or features are insufficient, and in some instances, woefully insufficient, because they amount to mere design exercises that are not tethered to the complex realities of successfully designing, manufacturing, and testing a robot.

The invention claimed is:

1. A mobile wearable data collection apparatus for use with a humanoid robot, and wherein said mobile wearable data collection apparatus comprises:

a headset configured to be worn by the operator and that includes a display providing virtual reality and/or augmented reality visual feedback to the operator;

a glove having a flexible textile and a finger portion, wherein the glove is configured to be worn by an operator and provide haptic feedback to the operator;

a rigid housing coupled to a dorsal side of the glove;

a finger encoder mounted at the rigid housing and configured to detect a finger movement of the operator; and a first deformable connector pivotably coupled to the finger encoder at a proximal end of the first deformable connector and coupled to a tip of the finger portion of the glove at a distal end of the first deformable connector, wherein the deformable connector is configured to flex in a flexion/extension direction with the finger movement of the operator.

2. The mobile wearable data collection apparatus of claim 1, wherein the distal end of the first deformable connector is pivotably coupled to the tip of the finger portion of the glove.

3. The mobile wearable data collection apparatus of claim 2, wherein the pivotable coupling of the first deformable connector to the tip of the finger portion permits pivoting of the tip of the finger portion of the glove about a pivot axis that is substantially parallel to an encoder axis about which the first deformable connector is pivotably coupled to the first finger encoder, and wherein said pivotable coupling of the first deformable connector to the tip of the finger portion resists rotation of the tip of the finger portion of the glove about any other axis that is not substantially parallel to the encoder axis.

4. The mobile wearable data collection apparatus of claim 1, further comprising a haptic button coupled to the tip of the finger portion of a palmar side of the glove.

5. The mobile wearable data collection apparatus of claim 1, further comprising:

a first thumb encoder;

a second deformable connector pivotably coupled to both:
(i) the first thumb encoder and (ii) a thumb portion of the glove; and a second thumb encoder pivotably coupled to the rigid housing and coupled to the first thumb encoder, wherein each of the first thumb encoder and the second thumb encoder are configured to detect a thumb movement of the operator.

6. The mobile wearable data collection apparatus of claim 1, further comprising:

an articulating arm configured to be removably worn by the operator and extending from a torso of the operator at a proximal end of the articulating arm to a hand of the operator at a distal end of the articulating arm, and wherein the distal end of the articulating arm includes a glove mount that is configured to be detachably coupled to the rigid housing coupled to the dorsal side of the glove.

7. The mobile wearable data collection apparatus of claim 1, further comprising:

a base mount configured to be worn by the operator and an articulated arm coupled to the base mount and to the operator, and wherein the base mount and the articulated arm are configured to be carried by the operator without external support as the operator walks through the environment.

8. The mobile wearable data collection apparatus of claim 7, wherein the articulated arm comprises a glove mount and a plurality of rigid frame links pivotably coupled between the base mount and the glove mount via a plurality of joints.

9. The mobile wearable data collection apparatus of claim 1, further comprising:

a head position sensor; and a piloting control system configured to be carried by the operator and to obtain positional data of the finger from the finger encoder and positional data of the head from the head position sensor.

10. The mobile wearable data collection apparatus of claim 1, wherein the mobile wearable data collection apparatus is configured to:

further collect robot data generated by the humanoid robot, relate the collected robot data to at least data generated by the finger encoder, and provide the collected robot data for training an artificial intelligence model.

* * * * *